United States Patent
Zhang et al.

(10) Patent No.: US 12,549,324 B2
(45) Date of Patent: Feb. 10, 2026

(54) CONFIGURATION COMMON SIGNALING FOR FULL DUPLEX OPERATION

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Kapil Gulati, Belle Mead, NJ (US); Junyi Li, Fairless Hills, PA (US); Tao Luo, San Diego, CA (US); Jelena Damnjanovic, Del Mar, CA (US); Peter Gaal, San Diego, CA (US); Jing Sun, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 571 days.

(21) Appl. No.: 17/482,691

(22) Filed: Sep. 23, 2021

(65) Prior Publication Data

US 2023/0090758 A1    Mar. 23, 2023

(51) Int. Cl.
*H04L 5/16* (2006.01)
*H04L 5/14* (2006.01)
(Continued)

(52) U.S. Cl.
CPC .............. *H04L 5/16* (2013.01); *H04L 5/1469* (2013.01); *H04B 17/318* (2015.01); *H04W 74/0833* (2013.01)

(58) Field of Classification Search
None
See application file for complete search history.

(56) References Cited

U.S. PATENT DOCUMENTS 10,484,838 B2 * 11/2019 Kim .................. H04W 4/08
11,252,229 B2 *  2/2022 Kim .................. H04W 76/14
(Continued)

FOREIGN PATENT DOCUMENTS

EP    1920626 A1    5/2008
EP    2595339 A2    5/2013
(Continued)

OTHER PUBLICATIONS

Partial International Search Report—PCT/US2022/041001—ISA/EPO—Dec. 8, 2022.
(Continued)

*Primary Examiner* — Faiyazkhan Ghafoerkhan
(74) *Attorney, Agent, or Firm* — Holland & Hart LLP

(57) ABSTRACT

Methods, systems, and devices for wireless communications are described. In some wireless communications systems, a base station may transmit first control signaling to a first set of user equipments (UEs) which identifies a first common configuration information element indicating a first slot format pattern for use by the first set of UEs. The base station may also transmit second control signaling to a second set of UEs which identifies a second common configuration information element indicating a second slot format pattern for the second set of UEs. The first information element and the second information element may be the same or different based on full-duplexing or half-duplexing capabilities of the UEs. In some other cases, the base station may identify a grouping configuration for assigning respective UEs to first or second UE groups which are either associated with uplink or downlink communications with the full-duplex base station.

30 Claims, 26 Drawing Sheets

(51) Int. Cl.
*H04B 17/318* (2015.01)
*H04W 74/0833* (2024.01)

(56) References Cited

U.S. PATENT DOCUMENTS

| | | | | |
|---|---|---|---|---|
| 2004/0057407 | A1* | 3/2004 | Balachandran | H04W 72/0446 370/336 |
| 2006/0153101 | A1* | 7/2006 | Raisanen | H04W 4/06 370/260 |
| 2007/0060182 | A1* | 3/2007 | Chen | H04W 76/45 455/518 |
| 2007/0066333 | A1* | 3/2007 | Chen | H04W 72/30 455/518 |
| 2008/0175169 | A1* | 7/2008 | Deb | H04L 45/46 370/255 |
| 2009/0092066 | A1* | 4/2009 | Chindapol | H04W 76/45 370/277 |
| 2009/0092067 | A1* | 4/2009 | Sudarshan | H04B 7/2656 370/336 |
| 2009/0219841 | A1* | 9/2009 | Sudarshan | H04L 5/0007 370/281 |
| 2009/0257406 | A1* | 10/2009 | Sankar | H04W 72/23 370/336 |
| 2009/0268641 | A1* | 10/2009 | Yim | H04W 72/121 370/277 |
| 2009/0268645 | A1* | 10/2009 | Chindapol | H04L 5/0091 370/329 |
| 2010/0290375 | A1* | 11/2010 | Chin | H04W 36/0064 370/281 |
| 2011/0128942 | A1* | 6/2011 | Kim | H04L 5/0057 370/336 |
| 2013/0039297 | A1* | 2/2013 | Wang | H04W 76/25 370/328 |
| 2013/0250818 | A1* | 9/2013 | Gaal | H04W 56/00 370/350 |
| 2014/0146696 | A1* | 5/2014 | Lin | H04L 5/0094 370/252 |
| 2014/0293843 | A1* | 10/2014 | Papasakellariou | H04W 52/325 370/280 |
| 2014/0348040 | A1 | 11/2014 | Hong et al. | |
| 2015/0195097 | A1* | 7/2015 | Grigsby | G06F 3/0484 715/753 |
| 2015/0333871 | A1* | 11/2015 | Lin | H04L 5/001 370/280 |
| 2015/0382159 | A1* | 12/2015 | Kim | H04W 4/08 370/312 |
| 2016/0380746 | A1* | 12/2016 | Min | H04L 43/0888 370/277 |
| 2017/0070994 | A1* | 3/2017 | Rico Alvarino | H04L 5/0044 |
| 2017/0273091 | A1* | 9/2017 | Noh | H04L 5/14 |
| 2017/0302341 | A1* | 10/2017 | Yu | H04W 72/0446 |
| 2017/0303096 | A1* | 10/2017 | Masuda | H04W 76/11 |
| 2018/0007724 | A1* | 1/2018 | Kazmi | H04W 8/005 |
| 2018/0092089 | A1* | 3/2018 | Yin | H04L 5/0055 |
| 2019/0037385 | A1* | 1/2019 | Li | H04W 36/0016 |
| 2019/0052320 | A1* | 2/2019 | Yu | H04B 7/0417 |
| 2019/0199412 | A1* | 6/2019 | Koskela | H04B 7/0639 |
| 2019/0289536 | A1* | 9/2019 | Tao | H04W 48/16 |
| 2020/0163005 | A1* | 5/2020 | Rao | H04W 4/44 |
| 2020/0266908 | A1* | 8/2020 | Qian | H04L 5/0007 |
| 2020/0404646 | A1* | 12/2020 | Zhang | H04W 72/0446 |
| 2021/0203469 | A1* | 7/2021 | Abedini | H04W 72/56 |
| 2022/0385439 | A1* | 12/2022 | Qian | H04L 27/2605 |
| 2023/0090758 | A1* | 3/2023 | Zhang | H04L 5/0094 370/277 |
| 2023/0091873 | A1* | 3/2023 | Zhang | H04W 72/1263 370/329 |
| 2023/0300906 | A1* | 9/2023 | Shin | H04W 76/10 370/277 |
| 2024/0049216 | A1* | 2/2024 | He | H04L 5/0035 |
| 2024/0049229 | A1* | 2/2024 | He | H04W 72/20 |
| 2024/0049243 | A1* | 2/2024 | He | H04L 5/0094 |
| 2024/0106607 | A1* | 3/2024 | Prasad | H04W 72/121 |

FOREIGN PATENT DOCUMENTS

| | | |
|---|---|---|
| EP | 3737137 A1 | 11/2020 |
| WO | WO-2007020292 A1 | 2/2007 |
| WO | WO-2017111821 A1 | 6/2017 |
| WO | WO-2019170149 A1 | 9/2019 |

OTHER PUBLICATIONS

International Search Report and Written Opinion—PCT/US2022/041001—ISA/EPO—Jan. 30, 2023.
European Search Report EP25198555 Search Authority the Hague Sep. 19, 2025.

* cited by examiner

CONFIGURATION COMMON SIGNALING FOR FULL DUPLEX OPERATION

FIELD OF TECHNOLOGY

The following relates to wireless communications, including configuration common signaling for full duplex operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless multiple-access communications system may include one or more base stations or one or more network access nodes, each simultaneously supporting communication for multiple communication devices, which may be otherwise known as user equipment (UE). Some wireless communications systems may support full-duplex communications, half-duplex communications, or both between a base station and a UE. Improved techniques for facilitating full-duplex communications or half-duplex communications between base stations and UEs in a wireless communications system may be desirable.

SUMMARY

The described techniques relate to improved methods, systems, devices, and apparatuses that support configuration common signaling for full duplex operation. Generally, the described techniques provide for coordinating full-duplex communications between devices in a wireless communications network. For example, wireless communications devices in a wireless communications network may implement a number of different techniques to coordinate signaling for half-duplex and full-duplex modes. For example, in some cases a base station may transmit one or more common configuration information elements which indicate different slot format patterns (including uplink, downlink, and flexible symbols) to different groups of user equipment (UE) based on full-duplex or half-duplex capabilities of the UEs or of the base station. In some other cases, the base station may transmit a single configuration common message which indicates a full-duplex slot format (in addition to the downlink, flexible, and uplink symbols) to support full-duplex communications by the UEs and base station.

In some other examples, the base station may determine different groupings for different sets of UEs. For example, the base station may determine different uplink and downlink groupings based on UE identifiers, randomized grouping, grouping based on measured signal strength, among other metrics. In some other cases, the base station may transmit different configuration common messages to the different groups of UEs, and may dynamically change the groupings using control signaling.

A method for wireless communications at a base station is described. The method may include transmitting, to a first set of user equipments (UEs), first control signaling identifying a first common configuration information element which indicates a first slot format pattern for a first set of slots associated with the first set of user equipment (UE)s, transmitting, to a second set of UEs, second control signaling identifying a second common configuration information element which indicates a second slot format pattern for a second set of slots associated with the second set of UEs, and communicating with the first set of UEs and the second set of UEs in accordance with the first slot format pattern and the second slot format pattern.

An apparatus for wireless communications at a base station is described. The apparatus may include a processor, memory coupled with the processor, and instructions stored in the memory. The instructions may be executable by the processor to cause the apparatus to transmit, to a first set of user equipments (UEs), first control signaling identifying a first common configuration information element which indicates a first slot format pattern for a first set of slots associated with the first set of UEs, transmit, to a second set of UEs, second control signaling identifying a second common configuration information element which indicates a second slot format pattern for a second set of slots associated with the second set of UEs, and communicate with the first set of UEs and the second set of UEs in accordance with the first slot format pattern and the second slot format pattern.

Another apparatus for wireless communications at a base station is described. The apparatus may include means for transmitting, to a first set of user equipments (UEs), first control signaling identifying a first common configuration information element which indicates a first slot format pattern for a first set of slots associated with the first set of UEs, means for transmitting, to a second set of UEs, second control signaling identifying a second common configuration information element which indicates a second slot format pattern for a second set of slots associated with the second set of UEs, and means for communicating with the first set of UEs and the second set of UEs in accordance with the first slot format pattern and the second slot format pattern.

A non-transitory computer-readable medium storing code for wireless communications at a base station is described. The code may include instructions executable by a processor to transmit, to a first set of user equipments (UEs), first control signaling identifying a first common configuration information element which indicates a first slot format pattern for a first set of slots associated with the first set of UEs, transmit, to a second set of UEs, second control signaling identifying a second common configuration information element which indicates a second slot format pattern for a second set of slots associated with the second set of UEs, and communicate with the first set of UEs and the second set of UEs in accordance with the first slot format pattern and the second slot format pattern.

In some examples of the method, apparatuses, and non-transitory computer-readable medium described herein, the first control signaling includes a first radio resource control message and the second control signaling includes a second radio resource control message, the first and second radio resource control messages indicating the respective first and second slot format patterns.

In some examples of the method, apparatuses, and non-transitory computer-readable medium described herein, the first set of UEs and the second set of UEs include half-duplex mode UEs and the method, apparatuses, and non-transitory computer-readable medium may include further operations, features, means, or instructions for configuring the first slot format pattern as a number of downlink symbols, followed by a number of flexible symbols, followed by a number of uplink symbols and configuring the second slot format pattern as a number of uplink symbols, followed by a number of flexible symbols, followed by a number of downlink symbols.

Some examples of the method, apparatuses, and non-transitory computer-readable medium described herein may further include operations, features, means, or instructions for overwriting the first slot format pattern, the overwriting spanning a range of the first set of slots, where respective uplink symbols of the first slot format pattern correspond to downlink symbols of the second slot format pattern, and respective downlink symbols of the first slot format pattern correspond to uplink symbols of the second slot format pattern.

In some examples of the method, apparatuses, and non-transitory computer-readable medium described herein, the base station operates in a half-duplex mode and the method, apparatuses, and non-transitory computer-readable medium may include further operations, features, means, or instructions for configuring the first slot format pattern as a number of downlink symbols, followed by a number of flexible symbols, followed by a number of uplink symbols and configuring the second slot format pattern as a number of downlink symbols, followed by a number of flexible symbols, followed by a number of full-duplex symbols.

In some examples of the method, apparatuses, and non-transitory computer-readable medium described herein, the base station includes two transmission reception points operating in a half-duplex mode and the method, apparatuses, and non-transitory computer-readable medium may include further operations, features, means, or instructions for configuring the first slot format pattern as a number of downlink symbols, followed by a number of flexible symbols, followed by a number of uplink symbols and configuring the second slot format pattern as a number of full-duplex symbols, followed by a number of flexible symbols, followed by a number of downlink symbols.

In some examples of the method, apparatuses, and non-transitory computer-readable medium described herein, the base station includes two transmission reception points operating in a half-duplex mode and the method, apparatuses, and non-transitory computer-readable medium may include further operations, features, means, or instructions for determining a rule to modify the first slot format pattern, where the rule generates the second slot format pattern by replacing a number of uplink symbols, a number of flexible symbols, a number of downlink symbols, or a combination thereof of the first slot format pattern, with a corresponding number of full duplex slots and transmitting, via the second control signaling, the determined rule to the second set of UEs.

Some examples of the method, apparatuses, and non-transitory computer-readable medium described herein may further include operations, features, means, or instructions for transmitting an indication of a slot index range assigned to the number of full duplex slots based on the rule.

In some examples of the method, apparatuses, and non-transitory computer-readable medium described herein, the base station operates in a full-duplex mode and the method, apparatuses, and non-transitory computer-readable medium may include further operations, features, means, or instructions for configuring the first slot format pattern as a number of downlink symbols, followed by a number of flexible symbols, followed by a number of uplink symbols and configuring the second slot format pattern as a number of downlink symbols, followed by a number of flexible symbols, followed by a number of full-duplex symbols.

In some examples of the method, apparatuses, and non-transitory computer-readable medium described herein, the base station may be operates in a full-duplex mode and the method, apparatuses, and non-transitory computer-readable medium may include further operations, features, means, or instructions for configuring the first slot format pattern as a number of downlink symbols, followed by a number of flexible symbols, followed by a number of uplink symbols and configuring the second slot format pattern as a number of full-duplex symbols, followed by a number of flexible symbols, followed by a number of uplink symbols.

A method for wireless communications at a first UE is described. The method may include receiving, from a base station, a control signal identifying a first common configuration information element which indicates a first slot format pattern for a first set of slots associated with the first UE, the first configuration being different from a second common configuration information element which indicates a second slot format pattern for a second set of slots associated with a second UE and communicating with the base station via uplink or downlink signaling in accordance with the first common configuration information element and the first slot format pattern.

An apparatus for wireless communications at a first UE is described. The apparatus may include a processor, memory coupled with the processor, and instructions stored in the memory. The instructions may be executable by the processor to cause the apparatus to receive, from a base station, a control signal identifying a first common configuration information element which indicates a first slot format pattern for a first set of slots associated with the first UE, the first configuration being different from a second common configuration information element which indicates a second slot format pattern for a second set of slots associated with a second UE and communicate with the base station via uplink or downlink signaling in accordance with the first common configuration information element and the first slot format pattern.

Another apparatus for wireless communications at a first UE is described. The apparatus may include means for receiving, from a base station, a control signal identifying a first common configuration information element which indicates a first slot format pattern for a first set of slots associated with the first UE, the first configuration being different from a second common configuration information element which indicates a second slot format pattern for a second set of slots associated with a second UE and means for communicating with the base station via uplink or downlink signaling in accordance with the first common configuration information element and the first slot format pattern.

A non-transitory computer-readable medium storing code for wireless communications at a first UE is described. The code may include instructions executable by a processor to receive, from a base station, a control signal identifying a first common configuration information element which indicates a first slot format pattern for a first set of slots associated with the first UE, the first configuration being different from a second common configuration information element which indicates a second slot format pattern for a second set of slots associated with a second UE and communicate with the base station via uplink or downlink signaling in accordance with the first common configuration information element and the first slot format pattern.

In some examples of the method, apparatuses, and non-transitory computer-readable medium described herein, the control signal includes a radio resource control message indicating the first slot format pattern.

In some examples of the method, apparatuses, and non-transitory computer-readable medium described herein, the first UE may be a half-duplex mode UE, the first slot format pattern including a number of downlink symbols, followed by a number of flexible symbols, followed by a number of uplink symbols, and the second slot format pattern including a number of uplink symbols, followed by a number of flexible symbols, followed by a number of downlink symbols.

In some examples of the method, apparatuses, and non-transitory computer-readable medium described herein, the base station operates in a half-duplex mode, and the first UE may be a half-duplex mode UE, and the second UE may be a full-duplex mode UE, the first slot format pattern including a number of downlink symbols, followed by a number of flexible symbols, followed by a number of uplink symbols and the second slot format pattern including a number of downlink symbols, followed by a number of flexible symbols, followed by a number of full-duplex symbols.

In some examples of the method, apparatuses, and non-transitory computer-readable medium described herein, the base station operates in a half-duplex mode, and the first UE may be a half-duplex mode UE, and the second UE may be a full-duplex mode UE, the first slot format pattern including a number of downlink symbols, followed by a number of flexible symbols, followed by a number of uplink symbols, and the second slot format pattern including a number of full-duplex symbols, followed by a number of flexible symbols, followed by a number of downlink symbols.

In some examples of the method, apparatuses, and non-transitory computer-readable medium described herein, the base station operates in a half-duplex mode and the method, apparatuses, and non-transitory computer-readable medium may include further operations, features, means, or instructions for receiving, from the base station, a rule to modify the first slot format pattern for a duration spanning a range of the first set of slots, where the rule generates the second slot format pattern by replacing a number of uplink symbols, a number of flexible symbols, a number of downlink symbols, or a combination thereof of the first slot format pattern, with a corresponding number of full duplex slots.

Some examples of the method, apparatuses, and non-transitory computer-readable medium described herein may further include operations, features, means, or instructions for receiving, from the base station, an indication of a slot index range assigned to the number of full duplex slots based on the rule.

In some examples of the method, apparatuses, and non-transitory computer-readable medium described herein, the base station includes two transmission reception points operating in a half-duplex mode, the first UE includes a half-duplex mode UE, and the second UE includes a full-duplex mode UE, the first slot format pattern including a number of downlink symbols, followed by a number of flexible symbols, followed by a number of uplink symbols, and the second slot format pattern including a number of downlink symbols, followed by a number of flexible symbols, followed by a number of full-duplex symbols.

In some examples of the method, apparatuses, and non-transitory computer-readable medium described herein, the base station includes two transmission reception points operating in a half-duplex mode, the first UE includes a half-duplex mode UE, and the second UE includes a full-duplex mode UE, the first slot format pattern including a number of downlink symbols, followed by a number of flexible symbols, followed by a number of uplink symbols, and the second slot format pattern including a number of full-duplex symbols, followed by a number of flexible symbols, followed by a number of uplink symbols.

A method for wireless communications at a base station is described. The method may include transmitting, to each UE of a set of UEs, a control signal identifying a first common configuration information element which indicates a first slot format pattern, the first slot format pattern for a first set of slots associated with a set of full-duplex UEs, and the first slot format pattern including one or more symbols being a full-duplex symbol and communicating with the first set of UEs in accordance with the first slot pattern.

An apparatus for wireless communications at a base station is described. The apparatus may include a processor, memory coupled with the processor, and instructions stored in the memory. The instructions may be executable by the processor to cause the apparatus to transmit, to each UE of a set of UEs, a control signal identifying a first common configuration information element which indicates a first slot format pattern, the first slot format pattern for a first set of slots associated with a set of full-duplex UEs, and the first slot format pattern including one or more symbols being a full-duplex symbol and communicate with the first set of UEs in accordance with the first slot pattern.

Another apparatus for wireless communications at a base station is described. The apparatus may include means for transmitting, to each UE of a set of UEs, a control signal identifying a first common configuration information element which indicates a first slot format pattern, the first slot format pattern for a first set of slots associated with a set of full-duplex UEs, and the first slot format pattern including one or more symbols being a full-duplex symbol and means for communicating with the first set of UEs in accordance with the first slot pattern.

A non-transitory computer-readable medium storing code for wireless communications at a base station is described. The code may include instructions executable by a processor to transmit, to each UE of a set of UEs, a control signal identifying a first common configuration information element which indicates a first slot format pattern, the first slot format pattern for a first set of slots associated with a set of full-duplex UEs, and the first slot format pattern including one or more symbols being a full-duplex symbol and communicate with the first set of UEs in accordance with the first slot pattern.

In some examples of the method, apparatuses, and non-transitory computer-readable medium described herein, the first slot format pattern includes any combination of a number of uplink symbols, a number of downlink symbols, a number of flexible symbols, and a number of full-duplex symbols.

In some examples of the method, apparatuses, and non-transitory computer-readable medium described herein, the first common configuration information element includes an overwriting rule and the method, apparatuses, and non-transitory computer-readable medium may include further operations, features, means, or instructions for overwriting a second slot format pattern to determine the first slot format pattern, where one or more uplink symbols, downlink symbols, or flexible symbols may be overwritten as one or more full duplex slots based on the overwriting rule.

In some examples of the method, apparatuses, and non-transitory computer-readable medium described herein, the overwriting rule further includes an indication of a slot index range to apply the overwriting rule.

In some examples of the method, apparatuses, and non-transitory computer-readable medium described herein, the first common configuration information element may be a cell specific configuration for a cell associated with the first set of UEs.

A method for wireless communications at a first user equipment (UE) is described. The method may include receiving, from a base station, a control signal identifying a first common configuration information element which indicates a first slot format pattern for a first set of slots associated with a set of full-duplex capable UE including the first UE, the first slot format pattern including one or more symbols being a full-duplex symbol and communicating with the base station in accordance with the first slot format.

An apparatus for wireless communications at a first user equipment (UE) is described. The apparatus may include a processor, memory coupled with the processor, and instructions stored in the memory. The instructions may be executable by the processor to cause the apparatus to receive, from a base station, a control signal identifying a first common configuration information element which indicates a first slot format pattern for a first set of slots associated with a set of full-duplex capable UE including the first UE, the first slot format pattern including one or more symbols being a full-duplex symbol and communicate with the base station in accordance with the first slot format.

Another apparatus for wireless communications at a first user equipment (UE) is described. The apparatus may include means for receiving, from a base station, a control signal identifying a first common configuration information element which indicates a first slot format pattern for a first set of slots associated with a set of full-duplex capable UE including the first UE, the first slot format pattern including one or more symbols being a full-duplex symbol and means for communicating with the base station in accordance with the first slot format.

A non-transitory computer-readable medium storing code for wireless communications at a first user equipment (UE) is described. The code may include instructions executable by a processor to receive, from a base station, a control signal identifying a first common configuration information element which indicates a first slot format pattern for a first set of slots associated with a set of full-duplex capable UE including the first UE, the first slot format pattern including one or more symbols being a full-duplex symbol and communicate with the base station in accordance with the first slot format.

In some examples of the method, apparatuses, and non-transitory computer-readable medium described herein, the first slot format pattern includes any combination of a number of uplink symbols, a number of downlink symbols, a number of flexible symbols, and a number of full-duplex symbols.

In some examples of the method, apparatuses, and non-transitory computer-readable medium described herein, the first common configuration information element includes an overwriting rule and the method, apparatuses, and non-transitory computer-readable medium may include further operations, features, means, or instructions for overwriting a second slot format pattern to determine the first slot format pattern, where one or more uplink symbols, downlink symbols, or flexible symbols may be overwritten as one or more full duplex slots based on the overwriting rule.

In some examples of the method, apparatuses, and non-transitory computer-readable medium described herein, the overwriting rule further includes an indication of a slot index range to apply the overwriting rule.

In some examples of the method, apparatuses, and non-transitory computer-readable medium described herein, the first common configuration information element includes a cell specific configuration for a cell associated with the first set of UEs.

A method for wireless communications at a UE operating in a half-duplex mode is described. The method may include receiving, from a base station operating in a full-duplex mode, a message identifying a grouping configuration for assigning the UE to either a first group of UEs configured for transmitting uplink communications or a second group of UEs configured for receiving downlink communications, joining the first group of UEs or the second group of UEs based on the grouping configuration message, and communicating with the base station via uplink or downlink signaling based on joining the first group of UEs or the second group of UEs.

An apparatus for wireless communications at a UE operating in a half-duplex mode is described. The apparatus may include a processor, memory coupled with the processor, and instructions stored in the memory. The instructions may be executable by the processor to cause the apparatus to receive, from a base station operating in a full-duplex mode, a message identifying a grouping configuration for assigning the UE to either a first group of UEs configured for transmitting uplink communications or a second group of UEs configured for receiving downlink communications, join the first group of UEs or the second group of UEs based on the grouping configuration message, and communicate with the base station via uplink or downlink signaling based on joining the first group of UEs or the second group of UEs.

Another apparatus for wireless communications at a UE operating in a half-duplex mode is described. The apparatus may include means for receiving, from a base station operating in a full-duplex mode, a message identifying a grouping configuration for assigning the UE to either a first group of UEs configured for transmitting uplink communications or a second group of UEs configured for receiving downlink communications, means for joining the first group of UEs or the second group of UEs based on the grouping configuration message, and means for communicating with the base station via uplink or downlink signaling based on joining the first group of UEs or the second group of UEs.

A non-transitory computer-readable medium storing code for wireless communications at a UE operating in a half-duplex mode is described. The code may include instructions executable by a processor to receive, from a base station operating in a full-duplex mode, a message identifying a grouping configuration for assigning the UE to either a first group of UEs configured for transmitting uplink communications or a second group of UEs configured for receiving downlink communications, join the first group of UEs or the second group of UEs based on the grouping configuration message, and communicate with the base station via uplink or downlink signaling based on joining the first group of UEs or the second group of UEs.

Some examples of the method, apparatuses, and non-transitory computer-readable medium described herein may further include operations, features, means, or instructions for determining whether to join the first group of UEs or the second group of UEs based on a global identifier associated with the UE.

Some examples of the method, apparatuses, and non-transitory computer-readable medium described herein may further include operations, features, means, or instructions for determining whether to join the first group of UEs or the second group of UEs based on a random selection of the first group of UEs or the second group of UEs.

Some examples of the method, apparatuses, and non-transitory computer-readable medium described herein may further include operations, features, means, or instructions for receiving, from the base station, a reference signal receive power (RSRP) threshold value and determining whether to join to first group of UEs or the second group of UEs based on a RSRP measurement at the UE.

In some examples of the method, apparatuses, and non-transitory computer-readable medium described herein, the first group of UEs may be associated with RSRP values which exceed a threshold RSRP value, and the second group of UEs may be associated with RSRP values which may be less than the threshold RSRP value.

In some examples of the method, apparatuses, and non-transitory computer-readable medium described herein, the grouping configuration message includes an indication of one or more synchronization signal blocks for reception by the first group of UEs and the method, apparatuses, and non-transitory computer-readable medium may include further operations, features, means, or instructions for receiving, from the base station, the first set of synchronization signal blocks associated the first set of UEs and a second set of synchronization signal blocks associated with the second set of UEs, where the first set of synchronization signal blocks and the second set of synchronization signal blocks may be used for an initial access procedure during respective first and second time resources.

In some examples of the method, apparatuses, and non-transitory computer-readable medium described herein, the grouping configuration message includes an indication of a first set of random access channel occasions configured for the first group of UEs and a second set of random access channel occasions configured for the second group of UEs and the method, apparatuses, and non-transitory computer-readable medium may include further operations, features, means, or instructions for performing an initial access procedure with the base station using a random access channel occasion of the first set of random access channel occasions or a random access channel occasion of the second set of random access channel occasions based on joining the first group of UEs or the second group of UEs, where the first set of random access channel occasions may be associated with a first time resource and the second set of random access channel occasions may be associated with a second time resource.

Some examples of the method, apparatuses, and non-transitory computer-readable medium described herein may further include operations, features, means, or instructions for receiving a control message which indicates an update to apply to the grouping configuration and updating the grouping configuration based on the received control message.

In some examples of the method, apparatuses, and non-transitory computer-readable medium described herein, the control message includes a downlink control information message and the method, apparatuses, and non-transitory computer-readable medium may include further operations, features, means, or instructions for receiving the downlink control information message from the base station, the downlink control information including a radio network temporary identifier associated with the first group of UEs or the second group of UEs.

Some examples of the method, apparatuses, and non-transitory computer-readable medium described herein may further include operations, features, means, or instructions for receiving the control message based on a location change of the UE, a beam change at the UE, one or more signal quality measurements at the UE, or any combination thereof.

In some examples of the method, apparatuses, and non-transitory computer-readable medium described herein, the control message includes a downlink control information message or a medium access control-control element.

A method for wireless communications at a base station operating in a full-duplex mode is described. The method may include transmitting, to a UE operating in a half-duplex mode, a message which indicates a grouping configuration for assigning the UE into either a first group of UEs configured for transmitting uplink communications or a second group of UEs configured for receiving downlink communications and communicating with the UE via uplink or downlink signaling based on determining whether the UE is assigned to the first group of UEs or the second group of UEs in accordance with the grouping configuration message.

An apparatus for wireless communications at a base station operating in a full-duplex mode is described. The apparatus may include a processor, memory coupled with the processor, and instructions stored in the memory. The instructions may be executable by the processor to cause the apparatus to transmit, to a UE operating in a half-duplex mode, a message which indicates a grouping configuration for assigning the UE into either a first group of UEs configured for transmitting uplink communications or a second group of UEs configured for receiving downlink communications and communicate with the UE via uplink or downlink signaling based on determining whether the UE is assigned to the first group of UEs or the second group of UEs in accordance with the grouping configuration message.

Another apparatus for wireless communications at a base station operating in a full-duplex mode is described. The apparatus may include means for transmitting, to a UE operating in a half-duplex mode, a message which indicates a grouping configuration for assigning the UE into either a first group of UEs configured for transmitting uplink communications or a second group of UEs configured for receiving downlink communications and means for communicating with the UE via uplink or downlink signaling based on determining whether the UE is assigned to the first group of UEs or the second group of UEs in accordance with the grouping configuration message.

A non-transitory computer-readable medium storing code for wireless communications at a base station operating in a full-duplex mode is described. The code may include instructions executable by a processor to transmit, to a UE operating in a half-duplex mode, a message which indicates a grouping configuration for assigning the UE into either a first group of UEs configured for transmitting uplink communications or a second group of UEs configured for receiving downlink communications and communicate with the UE via uplink or downlink signaling based on determining whether the UE is assigned to the first group of UEs or the second group of UEs in accordance with the grouping configuration message.

In some examples of the method, apparatuses, and non-transitory computer-readable medium described herein, the grouping configuration may be based on a global identifier associated with the UE, and the first group of UEs includes even identifiers and the second group of UEs includes odd identifiers.

In some examples of the method, apparatuses, and non-transitory computer-readable medium described herein, the grouping configuration may be based on a random selection of the first group of UEs or the second group of UEs.

Some examples of the method, apparatuses, and non-transitory computer-readable medium described herein may further include operations, features, means, or instructions for transmitting, to the UE, a reference signal receive power (RSRP) threshold value, where the grouping configuration may be based on the RSRP threshold value.

In some examples of the method, apparatuses, and non-transitory computer-readable medium described herein, the first group of UEs may be associated with RSRP values which exceed a threshold RSRP value, and the second group of UEs may be associated with RSRP values which may be less than the threshold RSRP value.

In some examples of the method, apparatuses, and non-transitory computer-readable medium described herein, the grouping configuration includes an indication of one or more synchronization signal blocks for reception by the first group of UEs and the method, apparatuses, and non-transitory computer-readable medium may include further operations, features, means, or instructions for transmitting, to the first group of UEs, the one or more synchronization signal blocks associated with a first initial access procedure during a first time resource and transmitting, to the second group of UEs, one or more synchronization signal blocks associated with a second initial access procedure during a second time resource.

In some examples of the method, apparatuses, and non-transitory computer-readable medium described herein, and the method, apparatuses, and non-transitory computer-readable medium may include further operations, features, means, or instructions for communicating with the second group of UEs using the one or more random access channel occasions during a third time resource and communicating with the first group of UEs using the one or more random access channel occasions during a fourth time resource.

Some examples of the method, apparatuses, and non-transitory computer-readable medium described herein may further include operations, features, means, or instructions for transmitting a control message which indicates an update to apply to the grouping configuration and receiving communications from the first group of UEs, the second group of UEs, or both, based on the update to the grouping configuration.

In some examples of the method, apparatuses, and non-transitory computer-readable medium described herein, the control message includes a downlink control information message and the method, apparatuses, and non-transitory computer-readable medium may include further operations, features, means, or instructions for transmitting the downlink control information message, the downlink control information including a radio network temporary identifier associated with the first group of UEs or the second group of UEs.'

Some examples of the method, apparatuses, and non-transitory computer-readable medium described herein may further include operations, features, means, or instructions for transmitting the control message based on a location change of the UE, a beam change at the UE, one or more signal quality measurements at the UE, or any combination thereof.

In some examples of the method, apparatuses, and non-transitory computer-readable medium described herein, the control message includes a downlink control information message or a medium access control-control element.

DETAILED DESCRIPTION

Figure 1:
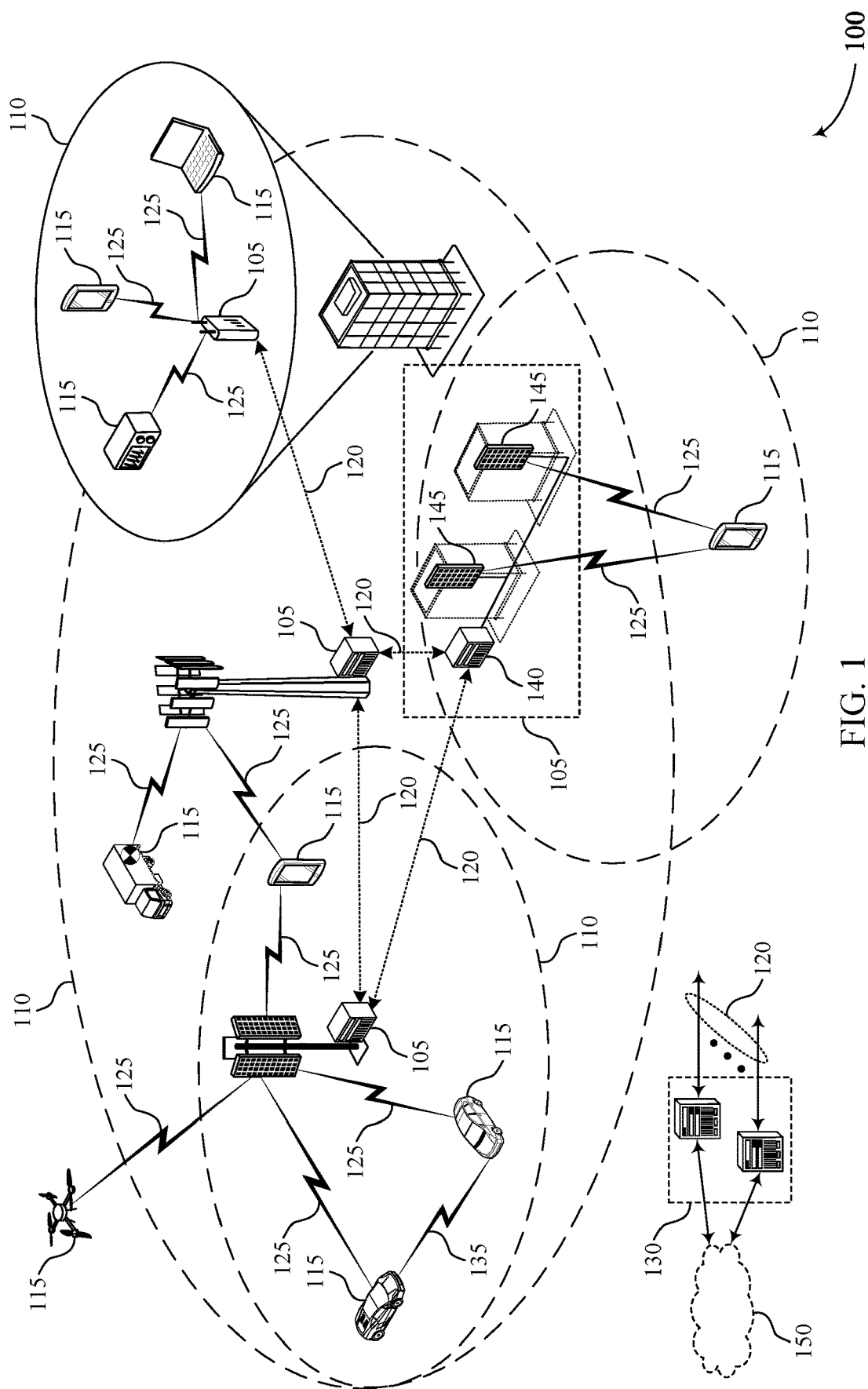
FIG. 1 illustrates an example of a wireless communications system that supports configuration common signaling for full duplex operation in accordance with aspects of the present disclosure.

Some wireless communications systems may support full-duplex communications, half-duplex communications, or both between a base station and a user equipment (UE).

In such systems, different base stations may support different operating modes including a full-duplex mode for full-duplex communications or a half-duplex mode for half-duplex communications. In addition, different UEs may have different capabilities, where a UE with full-duplex capabilities may operate in the full-duplex mode for full-duplex communications, and a UE with half-duplex capabilities may operate in the half-duplex mode for half-duplex communications.

Devices that implement full-duplexing modes may be able to simultaneously perform both uplink and downlink communications within a frequency band during a specified time period. In some cases, however, devices may implement a combination of both full-duplex and half duplex capabilities, which may increase signaling between the devices and also increase the likelihood of collisions between the devices operating using full-duplex communications.

To support the combination of full-duplex operations and half-duplex operations in the wireless communications network, the devices may implement a number of different techniques to coordinate signaling for half-duplex and full-duplex modes. For example, in some cases a base station may transmit one or more common configuration information elements (e.g., tdd-UL-DL-ConfigurationCommon information elements) which indicate different slot format patterns to different groups of UEs based on full-duplex or half-duplex capabilities of the UEs or of the base station.

For example, in some cases the base station may operate in a full-duplex mode while one or more UEs in the cell operate in a half-duplex mode. The base station may transmit a first configuration common message to a first set of UEs which indicates a first slot format (e.g., Downlink (D) . . . Flexible (F) . . . . Uplink (U)), and a second configuration common message to a second set of UEs which indicates a second slot format (e.g., Uplink (U) . . . Flexible (F) . . . Downlink (D)). In such examples, the base station may operate in a full-duplexing mode by simultaneously transmitting downlink communications to one group of UEs while receiving uplink communications from the other group of UEs based on the coordinated configurations.

In some other examples, each UE in a cell may have full-duplex capabilities, and the base station may also have full-duplex capabilities. In such examples, the base station may transmit a single configuration common message which indicates a full-duplex symbol format (in addition to the downlink, flexible, and uplink symbol formats) to support full-duplex communications by the UEs and base station.

In some other examples, the base station may determine different groupings for different sets of UEs in order to support full-duplex communications. For example, the base station may determine different uplink and downlink groupings based on UE identifiers, randomized grouping, grouping based on measured signal strength, among other metrics. In some other cases, the base station may transmit different configuration common messages to the different groups of UEs, and may dynamically change the groupings using control signaling.

Aspects of the disclosure are initially described in the context of wireless communications systems. Aspects of the disclosure are further illustrated by and described with reference to apparatus diagrams, system diagrams, full-duplexing and half-duplexing operations, process flows, and flowcharts that relate to configuration common signaling for full duplex operation.

FIG. 1 illustrates an example of a wireless communications system 100 that supports configuration common signaling for full duplex operation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and A $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications network 100 may support both half duplex and full-duplex communications between base stations 105 and UE 115, such that the devices may transmit and receive information sequentially, or such that the devices may simultaneously perform both uplink and downlink communications. In some cases, however, a combination of both full-duplex and half duplex capable devices may increase signaling between the devices and also increase the likelihood of collisions between the devices operating using full-duplex communications.

To support the combination of full-duplex operations and half-duplex operations in the wireless communications network 100, devices may implement a number of different techniques to coordinate signaling for half-duplex and full-duplex modes. For example, in some cases a base station 105 may transmit one or more common configuration information elements which indicate different slot format patterns (including uplink, downlink, and flexible symbols) to different groups of UEs based on full-duplex or half-duplex capabilities of the UEs or of the base station. In some other cases, the base station 105 may transmit a single configuration common message which indicates a full-duplex slot format (in addition to the downlink, flexible, and uplink symbols) to support full-duplex communications by the UEs 115 and base station 105.

In some other examples, the base station may determine different groupings for different sets of UEs 115. For example, the base station 105 may determine different uplink and downlink groupings based on UE identifiers, randomized grouping, grouping based on measured signal strength, among other metrics. In some other cases, the base station may transmit different configuration common messages to the different groups of UEs, and may dynamically change the groupings using control signaling such as downlink control information (DCI) or medium access control-control element (MAC-CE) signaling.

Figure 2:
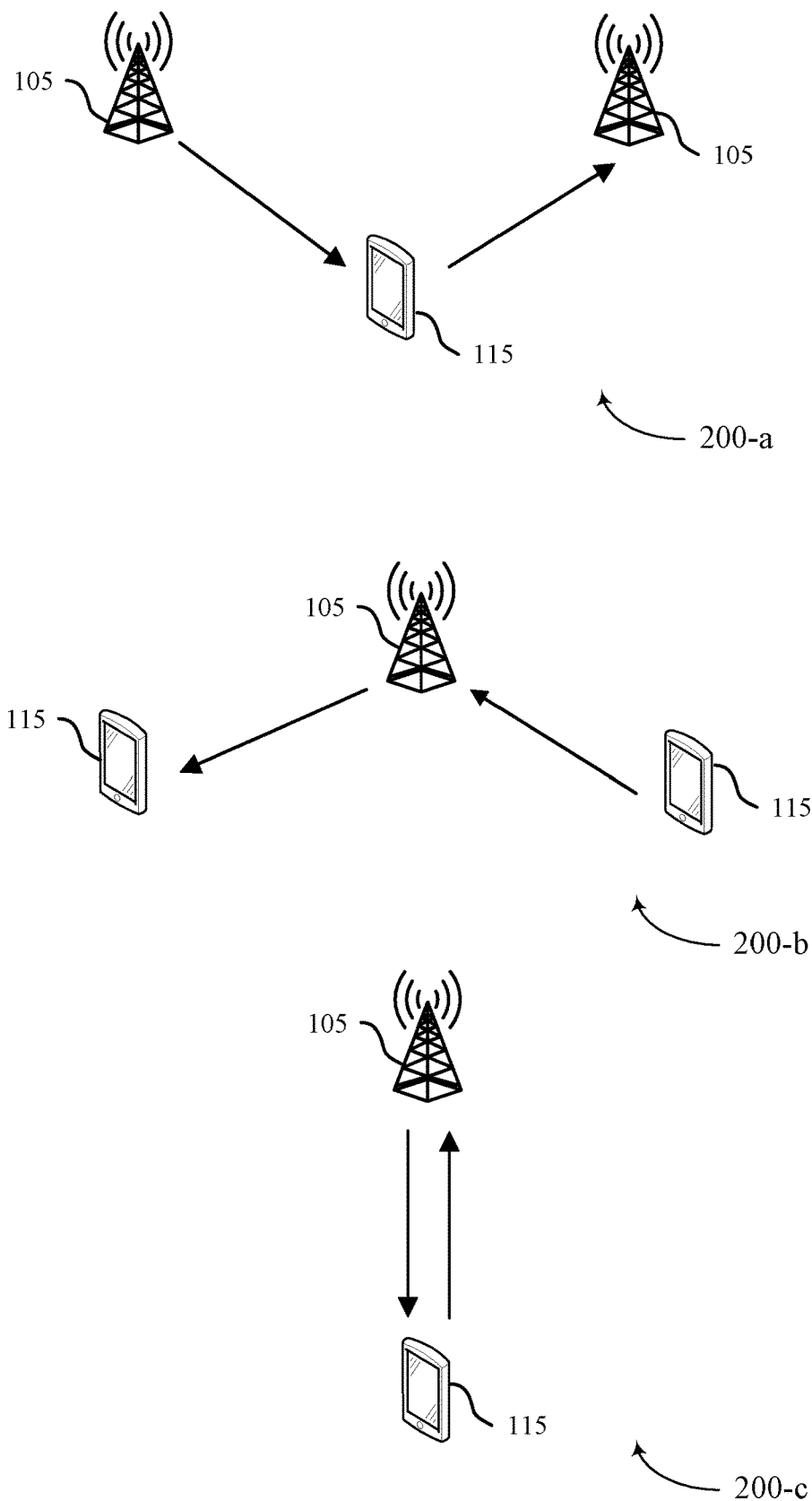
FIG. 2 illustrates an example of full-duplex communications that support configuration common signaling for full duplex operation in accordance with aspects of the present disclosure.

FIG. 2 illustrates an example of full-duplex communications 200 that support configuration common signaling for full duplex operation in accordance with aspects of the present disclosure. In a first example 200-a, a UE 115 may support full-duplex communications (e.g., operate in a full-duplex mode), and the UE 115 may receive downlink signals from a first base station 105 (e.g., cell or transmission and reception point (TRP)) and transmit uplink signals to a second base station 105. The first example 200-a may be an example of multi-TRP communications. In a second example 200-b, a base station 105 may support full-duplex communications (e.g., operate in a full-duplex mode), and the base station 105 may transmit downlink signals to a first UE 115 and receive uplink signals from a second UE 115. In a third example 200-c, a base station 105 and a UE 115 may each support full-duplex communications (e.g., operate in a full-duplex mode). The base station 105 may transmit downlink signals to the UE 115 and receive uplink signals from the UE 115, and the UE 115 may receive downlink signals from the base station 105 and transmit uplink signals to the base station 105.

Figure 3:
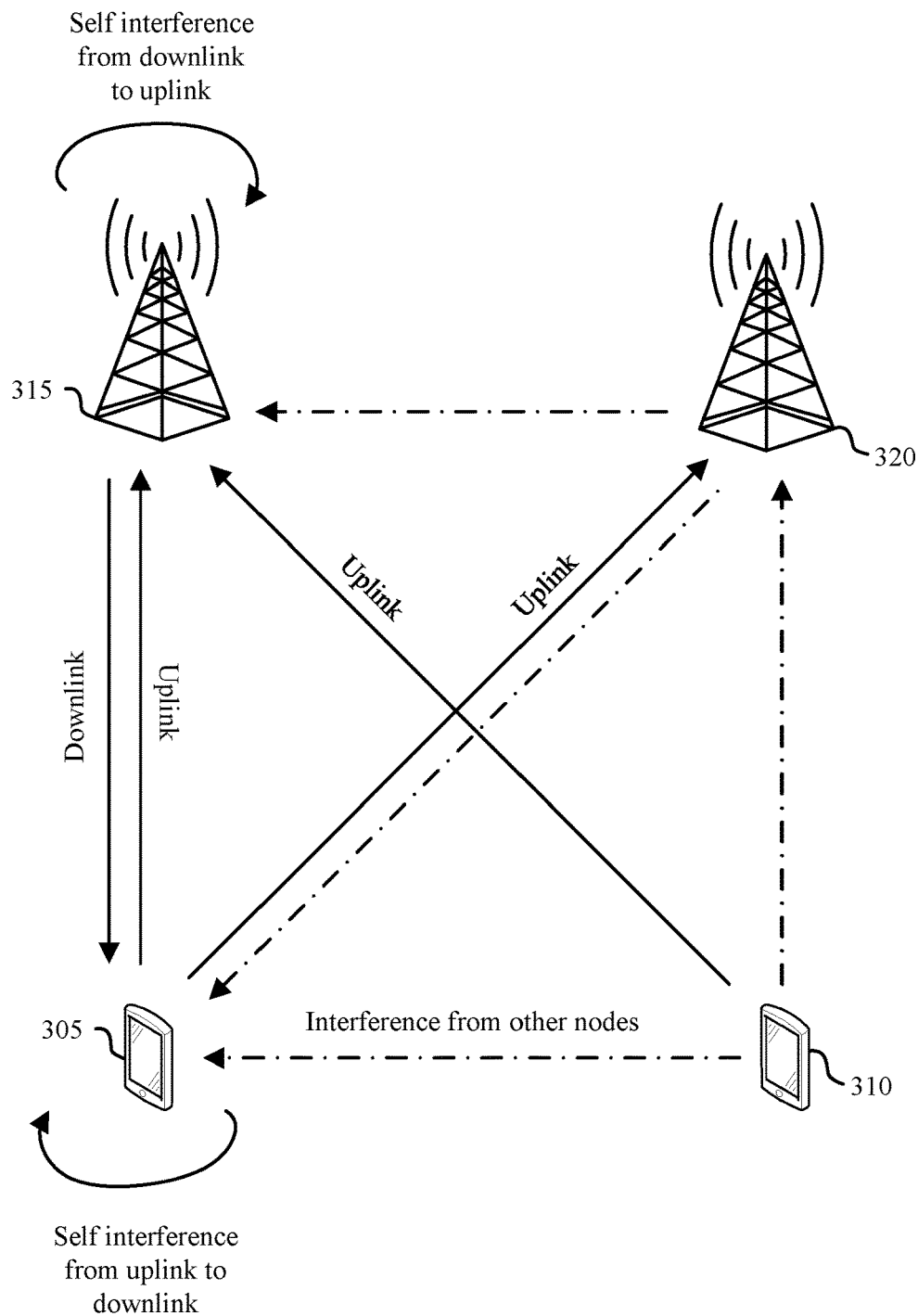
FIG. 3 illustrates an example of a network that supports configuration common signaling for full duplex operation in accordance with aspects of the present disclosure.

FIG. 3 illustrates an example of a network 300 that supports configuration common signaling for full duplex operation in accordance with aspects of the present disclosure. The network 300 may include a first UE 305, a second UE 310, a first base station 315, and a second base station 320. The first UE 305 and the second UE 310 may be examples of UEs 115 described herein, and the first base station 315 and the second base station 320 may be examples of base stations 105 described herein.

The first UE 305 may support full-duplex communications with the first base station 315 and half-duplex communications with the second base station 320. In particular, the first UE 305 may receive downlink signals from the first base station 315 and transmit uplink signals to the first base station 315, and the first UE 305 may transmit uplink signals to the second base station 320. In some cases, the first UE 305 may be referred to as a full-duplex UE 305. In addition, the second UE 310 may support half-duplex communications with the first base station 315. In particular, the second UE 310 may transmit uplink signals to the first base station 315. In some cases, the second UE 310 may be referred to as a half-duplex UE 310.

The first base station 315 may support full-duplex communications with the first UE 305 and half-duplex communications with the second UE 310. In particular, the first base station 315 may transmit downlink signals to the first UE 305 and receive uplink signals from the first UE 305, and the first base station 315 may receive uplink signals from the second UE 310. In some cases, the first base station 315 may be referred to as a full-duplex base station 315. In addition, the second base station 320 may support half-duplex communications with the first UE 305. In particular, the second base station 320 may receive uplink signals from the first UE 305. In some cases, the second base station 320 may be referred to as a half-duplex base station 320.

In some cases, communications between some base stations 105 and UEs 115 in the network 300 may interfere with communications between other base stations 105 and UEs 115 in the network. That is, there may be interference 325 between nodes in the network 300. For instance, communications at the second base station 320 may interfere with communications at the first base station 315 and communications at the first UE 305. Similarly, communications at the second UE 310 may interfere with communications at the first UE 305 and communications at the second base station 320. In addition, because the first base station 315 and the first UE 305 may support full-duplex communications, each of these devices may experience self-interference (e.g., from uplink to downlink). In some examples, self-interference may occur due to signal leakage between a transmit antenna and a receive antenna at a device.

As illustrated in FIG. 3, different base stations 105 in wireless communications system 100 may support different operating modes including a full-duplex mode for full-duplex communications or a half-duplex mode for half-duplex communications. In addition, different UEs 115 may have different capabilities, where a UE 115 with full-duplex capabilities may operate in the full-duplex mode for full-duplex communications, and a UE 115 with half-duplex capabilities may operate in the half-duplex mode for half-duplex communications.

In some cases, although base stations 105 and UEs 115 may both support different operating modes, a UE 115 may not be able to detect a mode in which a base station 105 is operating. As such, in one aspect, UEs 115 with different capabilities may connect to the base station 105 regardless of the mode in which the base station 105 is operating. In this aspect, the base station 105 may configure or schedule communications differently for UEs 115 with different capabilities, resulting in an increase in overhead and complexity at the base station 105 and the UEs 115. In another aspect, a UE 115 may not be able to perform cell selection based on an operating mode of a base station, which may lead to reduced throughput since the UE 115 may miss out on additional resources or transmission opportunities (e.g., if the UE 115 selects a half-duplex cell instead of a full-duplex cell).

The wireless communications system 300 may support efficient techniques for facilitating configuration common signaling for full-duplex communications and half-duplex communications with minimal overhead and complexity.

Figure 4:
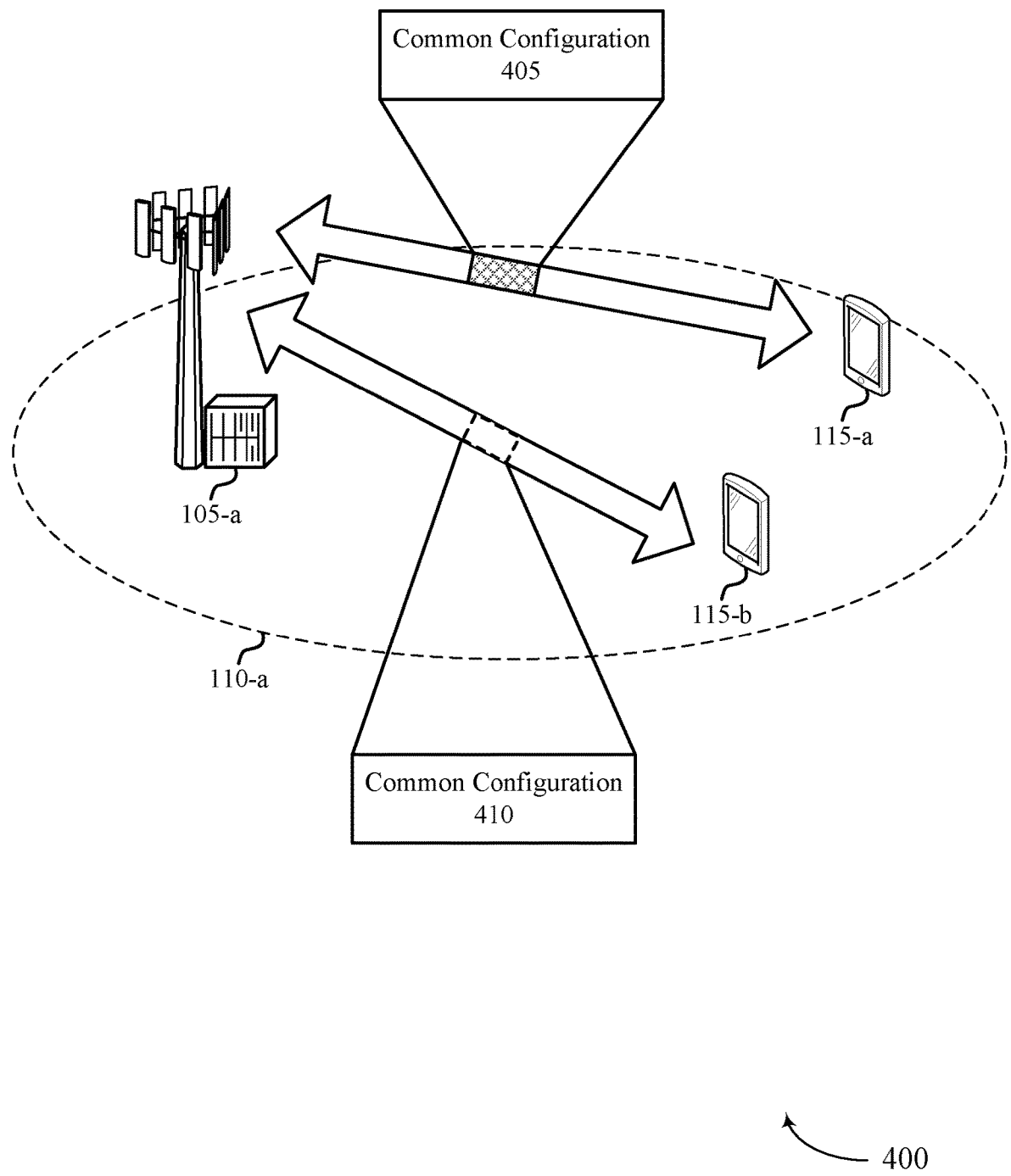
FIG. 4 illustrates an example of a wireless communications system that supports configuration common signaling for full duplex operation in accordance with aspects of the present disclosure.

FIG. 4 illustrates an example of a wireless communications system 400 that supports configuration common signaling for full duplex operation in accordance with aspects of the present disclosure. The wireless communications system 400 includes a UE 115-a, which may be an example of a UE 115 described with reference to FIGS. 1-3. The wireless communications system 400 also includes a base station 105-a, which may be an example of a base station 105 described with reference to FIGS. 1-3. The wireless communications system 400 may implement aspects of the wireless communications system 100. For example, the wireless communications system 400 may support efficient techniques for facilitating full-duplex communications and half-duplex communications with minimal overhead and complexity.

The wireless communications system 400 may support both half duplex and full-duplex communications between the base station 105-a and the UE 115-a, such that the devices may transmit and receive information sequentially, or such that the devices may simultaneously perform both uplink and downlink communications within a frequency band during a specified time period. A combination of both full-duplex and half duplex devices may be present in the system, including the UE 115-a and the base station 105-a, which may increase signaling between the devices and also increase the likelihood of collisions between the devices operating using full-duplex communications.

To support the combination of full-duplex operations and half-duplex operations in the wireless communications network 400, the devices may implement a number of different techniques to coordinate signaling. For example, in some cases the base station 105-a may transmit one or more information elements 405 and 410 (e.g., tdd-UL-DL-ConfigurationCommon information elements) which indicate different slot format patterns to different groups of UEs based on full-duplex capabilities of the UEs or base station.

In some examples, the base station 105-a may operate in a full-duplex mode while the UE 115-a in the cell 105-a operate in a half-duplex mode. The base station 105-a transmits a first configuration common message 405 to a first set of UEs (including UE 115-a) which indicates a first slot format (e.g., Downlink (D) . . . Flexible (F) . . . . Uplink (U)), and a second configuration common message 410 to a second set of UEs (including UE 115-b) which indicates a second slot format (e.g., U . . . F . . . D). In such examples, the base station 105-a may simultaneously transmit to one group of UEs while receiving from the other group.

In some other examples, each UE 115 in a cell may have full-duplex capabilities, and the base station 105-a may also have full-duplex capabilities. The base station 105-a may transmit a single configuration common message 405 which indicates a full-duplex slot format (in addition to the downlink, flexible, and uplink slot formats) to support full-duplex communications by the UEs 115.

In some other examples, the base station 105-a may determine a grouping for the UEs 115 in order to support full-duplex communications. For example, the base station 105-a may determine the grouping based on UE ID, randomized grouping, grouping based on measured RSRP, etc. In some other cases, the base station 105-a may transmit different configuration common messages to the different groups of UEs, and may dynamically change the groupings using control signaling (e.g., DCI or MAC-CE signaling).

Figure 5:
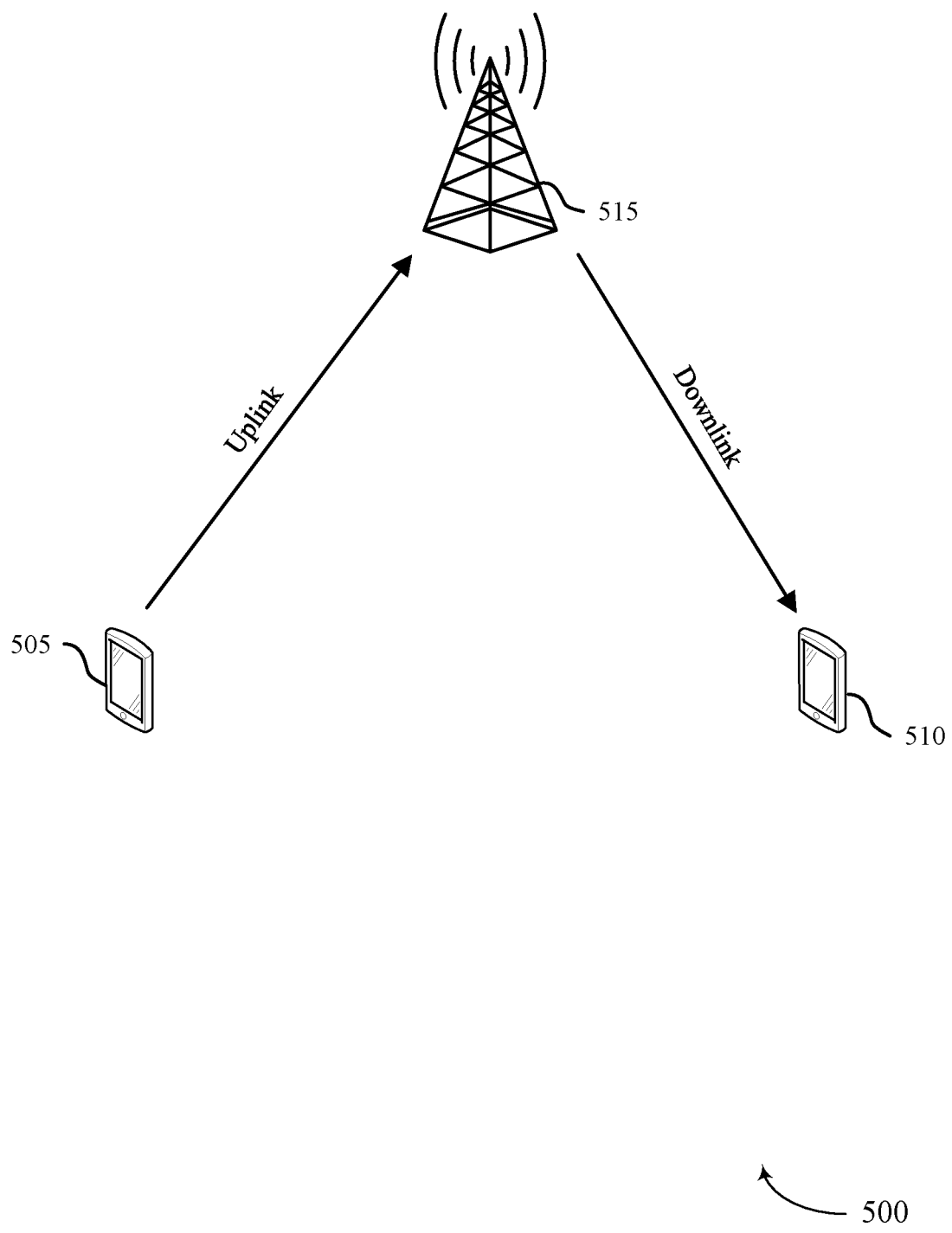
FIGS. 5-8 illustrate examples of full duplex communications that support configuration common signaling for full duplex operation in accordance with aspects of the present disclosure.

FIG. 5 illustrates an example of full-duplex communications 500 that support configuration common signaling for full duplex operation in accordance with aspects of the present disclosure. The full-duplex communications 500 may include a first UE 505, a second UE 510, and a base station 515. The first UE 505 and the second UE 510 may be examples of UEs 115 described herein, and the base station 515 may be an example of base stations 105 described herein.

In the example of FIG. 5, the first UE 505 and the second UE 510 may be configured to support half-duplex communications, while the base station 515 may be configured to support full-duplex communications. For example, the first UE 505 may participate in uplink communications with the base station 515 using a half-duplexing mode during a first time duration, and the second UE 510 may participate in downlink communications with the base station 515 using a half-duplexing mode during the first time duration. The base station 515 may operate using a full-duplexing mode to simultaneously communicate with the first UE 505 and the second UE 510 during the first duration.

In some examples, the full-duplexing mode and the full-duplexing scheduling of the base station 515 may be transparent to the first UE 505 and to the second UE 510. For example, the base station 515 may schedule the first UE 505 in accordance with the half-duplexing mode of the first UE 505, and may schedule the second UE 510 in accordance with the half-duplexing mode of the second UE 510. The scheduling of both UEs 505 and 510 may be compatible with the full-duplexing mode of the base station 515, however the base station 515 may not indicate its full-duplexing mode or associated full-duplex scheduling to the UEs 505 and 510.

To support transparent scheduling, the base station 515 may transmit configuration common signaling to the UEs 505 and 510. For example, the base station 515 may transmit an information element (e.g., tdd-UL-DL-Configuration-Common) via RRC signaling or in a first system information block to the UEs 505 and 510 to notify the UEs of a slot format pattern for communicating with the base station 515. For example, the information element may include a reference subcarrier spacing configuration and the slot format pattern, which may further include a slot configuration period (e.g., a transmission periodicity), a number of slots having downlink symbols, a number of slots including uplink symbols, and the number of configured uplink symbols. In some cases, the information element may enable the base station 515 to flexibly schedule uplink and downlink communications for the UEs 505 and 510.

In some examples, the first UE 505 may be associated with a first UE group, and the second UE 510 may be associated with a second UE group. In such cases, the base station 515 may configure two information elements (e.g., two tdd-UL-DL-ConfigurationCommon information elements) to configure two different slot format patterns for the different groups of UEs. In some examples, the base station 515 may configure the slot format patterns such that one group of UEs (e.g., the UE group associated with UE 505) may perform uplink transmissions and such that the other group of UEs (e.g., the UE group associated with UE 510) may receive downlink transmissions.

In one example, a first information element may configure a first slot format pattern to indicate a set of downlink symbols (D), a set of flexible symbols (F), and a set of uplink symbols (U). In such cases, the first slot format pattern may be configured as D . . . F . . . U . . . , and the number of downlink, flexible, and uplink symbols may be variable. In such cases, the base station may configure a second information element to indicate a set of uplink symbols, a set of flexible symbols, and a set of downlink symbols. In such cases, the second slot format pattern may be configured as U . . . F . . . D . . . , and the number of downlink, flexible, and uplink symbols may be variable. Because the first set of UEs and the second set of UEs operate in a half-duplex mode, the first slot pattern and the second slot pattern may alternate (e.g., if the first slot pattern begins with a set of uplink slots, the second slot pattern may begin with a set of downlink slots).

In cases that the second slot pattern (e.g., the slot pattern corresponding to U . . . F . . . D . . . symbols) instead starts with a downlink symbol, the second slot pattern may be configured as a downlink symbol followed by a set of uplink symbols, a set of flexible symbols, and a set of downlink symbols (e.g., D U . . . . F . . . D). In such cases, downlink and uplink symbols may occur simultaneously at the two different sets of UEs in the cell.

In some other cases, the second slot pattern may be defined by overwriting one or more symbols. For example, downlink symbols may be overwritten to be uplink symbols, or uplink symbols may be overwritten to be downlink symbols. In some cases, the overwriting may occur for an slot index range (e.g., slots or symbols [n-m]). In such cases, the base station 515 may flexibly configure or reconfigure the first slot pattern and the second slot pattern to support the full duplex mode of the base station 515. For example, the base station 515 may configure different slot format patterns for different UE groups such that the first group of UEs perform uplink communications while the second group of UEs receive downlink communications, or such that the first group of UEs receive downlink communications while the second group of UEs perform uplink communications.

Figure 6:
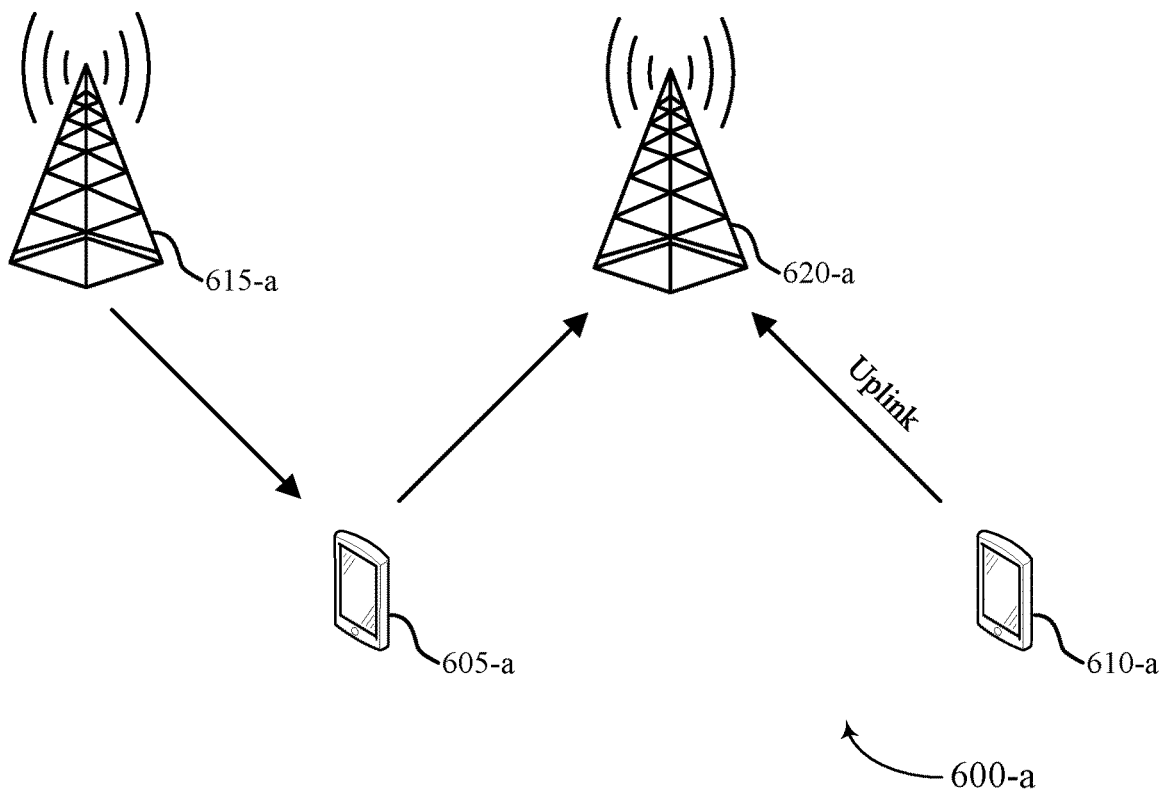
Figure 6:
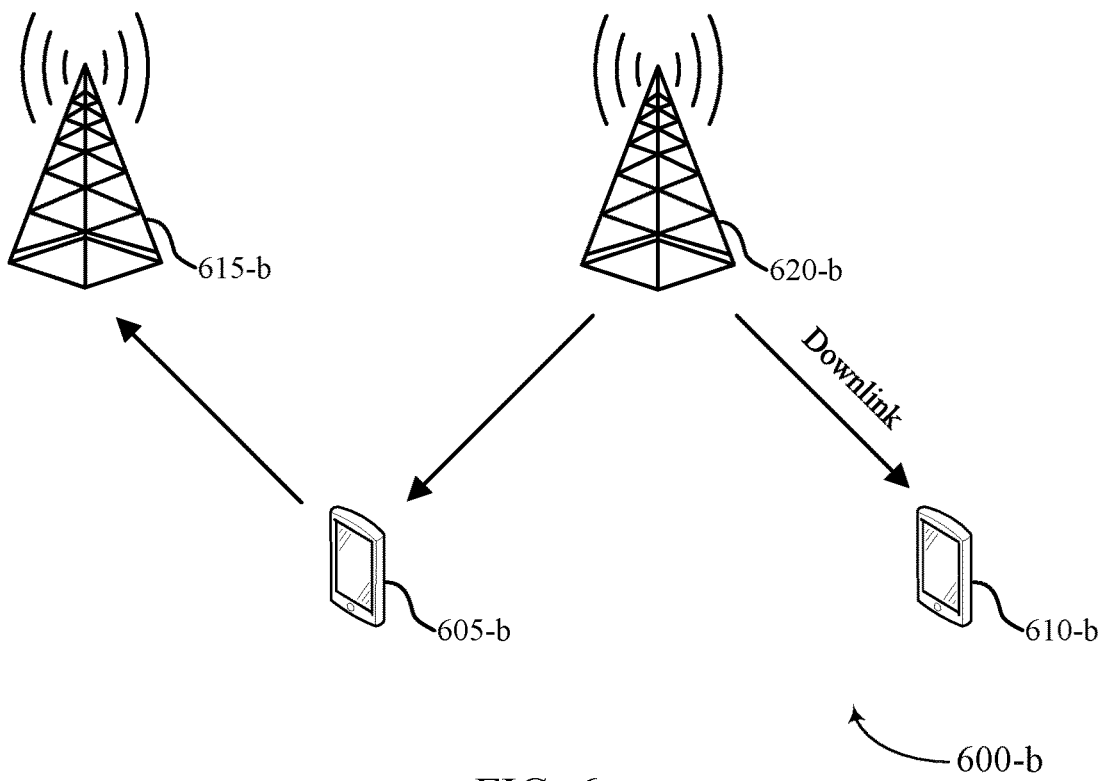

FIG. 6 illustrates an example of full-duplex communications 600 that support configuration common signaling for full duplex operation in accordance with aspects of the present disclosure. The full-duplex communications 600-a may include a first UE 605-a, a second UE 610-a, a first base station 615-a and a second base station 620-a. In addition, the full-duplex communications 600-b may include a first UE 605-b, a second UE 610-b, a first base station 615-b and a second base station 620-b. The first UEs 505 and the second UEs 510 may be examples of UEs 115 described herein, and the first base stations 615 and the second base stations 620 may be examples of base stations 105 described herein.

In the example of 600-a, the first UE 605-a may be configured to support full-duplex communications, and the second UE 610-a may be configured to support half-duplex communications (e.g., the UE 610-a may transmit uplink communications to the TRP 620-a), while the base station with two TRPs 615-a and 620-a may be configured to support either full-duplex communications or half-duplex communications. The configuration of 600-a may reduce cross-link interference between the UE 605-a and the UE 610-a. In addition, the cross link interference between TRP 615-a and 620-a may be reduced based on the distance between the TRPs.

In the example of 600-b, the first UE 605-b may be configured to support full-duplex communications, and the second UE 610-b may be configured to support half-duplex communications, while the base station with two TRPs 615-b and 620-b may be configured to support either full-duplex communications or half-duplex communications. In some cases, cross-link interference may occur between the UE 605-a and the UE 610-a receiving downlink transmissions from TRP 620-b. Cross-link interference between TRP 615-a and 620-a may be reduced based on the distance between the TRPs.

A base station corresponding to the TRPs 615 and 620 may transmit configuration common signaling to the UEs 605 and 610. For example, the base station 615 may transmit an information element (e.g., tdd-UL-DL-Configuration-Common) via RRC signaling or in a first system information block to the UEs 605 and 610 to notify the UEs of a common slot format pattern for communicating with the TRPs 615 and 620.

In some examples, the first UEs 605 may be associated with a first UE group, and the second UE 610 may be associated with a second UE group. In such cases, the base station may configure two information elements (e.g., two tdd-UL-DL-ConfigurationCommon information elements) or two system information blocks (SIBs) to configure two different slot format patterns for the different groups of UEs.

In one example, a first information element or SIB may configure a first slot format pattern to indicate a set of downlink symbols (D), a set of flexible symbols (F), and a set of uplink symbols (U). In such cases, the first slot format pattern may be configured as D . . . F . . . U . . . , and the number of downlink, flexible, and uplink symbols may be variable. In such cases, the base station may configure a second information element to indicate a set of uplink symbols, a set of flexible symbols, and a set of full duplex symbols. In such cases, the second slot format pattern may be configured as U . . . F . . . FD . . . , and the number of downlink, flexible, and full duplex symbols may be variable. In some cases, the full-duplex symbol may allow the UE 605 to flexibly perform full-duplex communications. In some cases, the base station may transmit the slot format patterns in a first SIB (e.g., SIB1)

In some other cases, a slot format pattern may be defined by overwriting one or more symbols of a different slot format pattern. For example, downlink symbols, uplink symbols, or flexible symbols may be overwritten to be full-duplex symbols. In some cases, the overwriting may occur for an slot index range (e.g., slots or symbols [n-m]). In such cases, the base station may transmit an overwriting rule in a different SIB, or a different information element of the first SIB. may be the base station 515 may flexibly configure or reconfigure the first slot pattern and the second slot pattern to support the full duplex mode of the base station 615. For example, the base station 615 may configure different slot format patterns for different UE groups such that the first group of UEs perform uplink communications while the second group of UEs receive downlink communications, or such that the first group of UEs receive downlink communications while the second group of UEs perform uplink communications.

Figure 7:
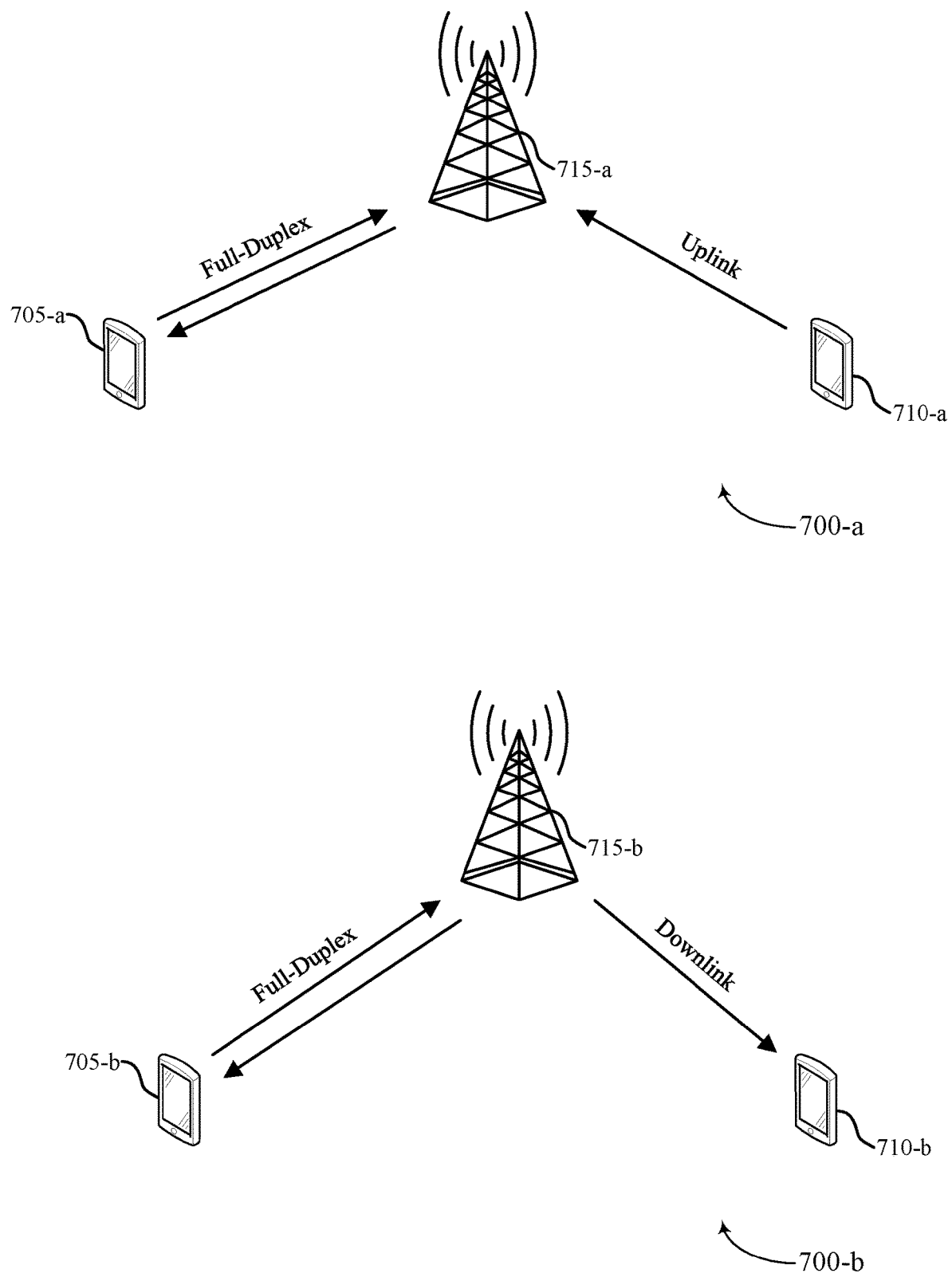

FIG. 7 illustrates an example of full-duplex communications 700 that support configuration common signaling for full duplex operation in accordance with aspects of the present disclosure. The full-duplex communications 700-a may include a first UE 705-a, a second UE 710-a, and a base station 715-a. In addition, the full-duplex communications 700-b may include a first UE 705-b, a second UE 710-b, and a base station 715-b. The first UEs 705 and the second UEs 710 may be examples of UEs 115 described herein, and the base stations 715 may be examples of base stations 105 described herein.

In the example of 700-a, the first UE 705-a may be configured to support full-duplex communications, and the second UE 710-a may be configured to support half-duplex communications (e.g., the UE 710-a may transmit uplink communications to the base station 715-a), while the base station 715-a may be configured to support either full-duplex communications or half-duplex communications. The configuration of 700-a may reduce cross-link interference between the UE 705-a and the UE 710-a.

In the example of 700-b, the first UE 705-b may be configured to support full-duplex communications, and the second UE 710-b may be configured to support half-duplex communications, while the base station 715-b may be configured to support either full-duplex communications or half-duplex communications.

In some cases, a base station 715 may transmit configuration common signaling to the UEs 705 and 710. For example, the base station 715 may transmit an information element (e.g., tdd-UL-DL-ConfigurationCommon) via RRC signaling or in a first system information block to the UEs 705 and 710 to notify the UEs of a common slot format pattern for communicating with the base station 715.

In some examples, the first UE 705 may be associated with a first UE group, and the second UE 710 may be associated with a second UE group. In such cases, the base station 715 may configure two information elements (e.g., two tdd-UL-DL-ConfigurationCommon information elements) or two SIBs to indicate two different slot format patterns for the different groups of UEs.

In configuration 700-a, a first information element or SIB may configure a first slot format pattern to indicate a set of downlink symbols (D), a set of flexible symbols (F), and a set of uplink symbols (U). In such cases, the first slot format pattern may be configured as D . . . F . . . U . . . , and the number of downlink, flexible, and uplink symbols may be variable. In such cases, the base station 715-a may configure a second information element to indicate a set of downlink symbols, a set of flexible symbols, and a set of full duplex symbols. In such cases, the second slot format pattern may be configured as D . . . F . . . FD . . . , and the number of downlink, flexible, and full duplex symbols may be variable. In some cases, the full-duplex symbol may allow the UE 705-a to flexibly perform full-duplex communications. In some cases, the base station may transmit the slot format patterns in a first SIB (e.g., SIB 1)

In configuration 700-b, a first information element or SIB may configure a first slot format pattern to indicate a set of downlink symbols (D), a set of flexible symbols (F), and a set of uplink symbols (U). In such cases, the first slot format pattern may be configured as D . . . F . . . U . . . , and the number of downlink, flexible, and uplink symbols may be variable. In such cases, the base station 715-b may configure a second information element to indicate a set of full-duplex symbols, a set of flexible symbols, and a set of uplink symbols. In such cases, the second slot format pattern may be configured as FD . . . F . . . U . . . , and the number of downlink, flexible, and full duplex symbols may be variable.

In some other cases, a slot format pattern may be defined by overwriting one or more symbols of a different slot format pattern. For example, downlink symbols, uplink symbols, or flexible symbols may be overwritten to be full-duplex symbols. In some cases, the overwriting may occur for an slot index range (e.g., slots or symbols [n-m]). In such cases, the base station may transmit an overwriting rule in a different SIB, or a different information element of the first SIB. may be the base station 715 may flexibly configure or reconfigure the first slot pattern and the second slot pattern to support the full duplex mode of the base station 715 and the UE 705.

Figure 8:
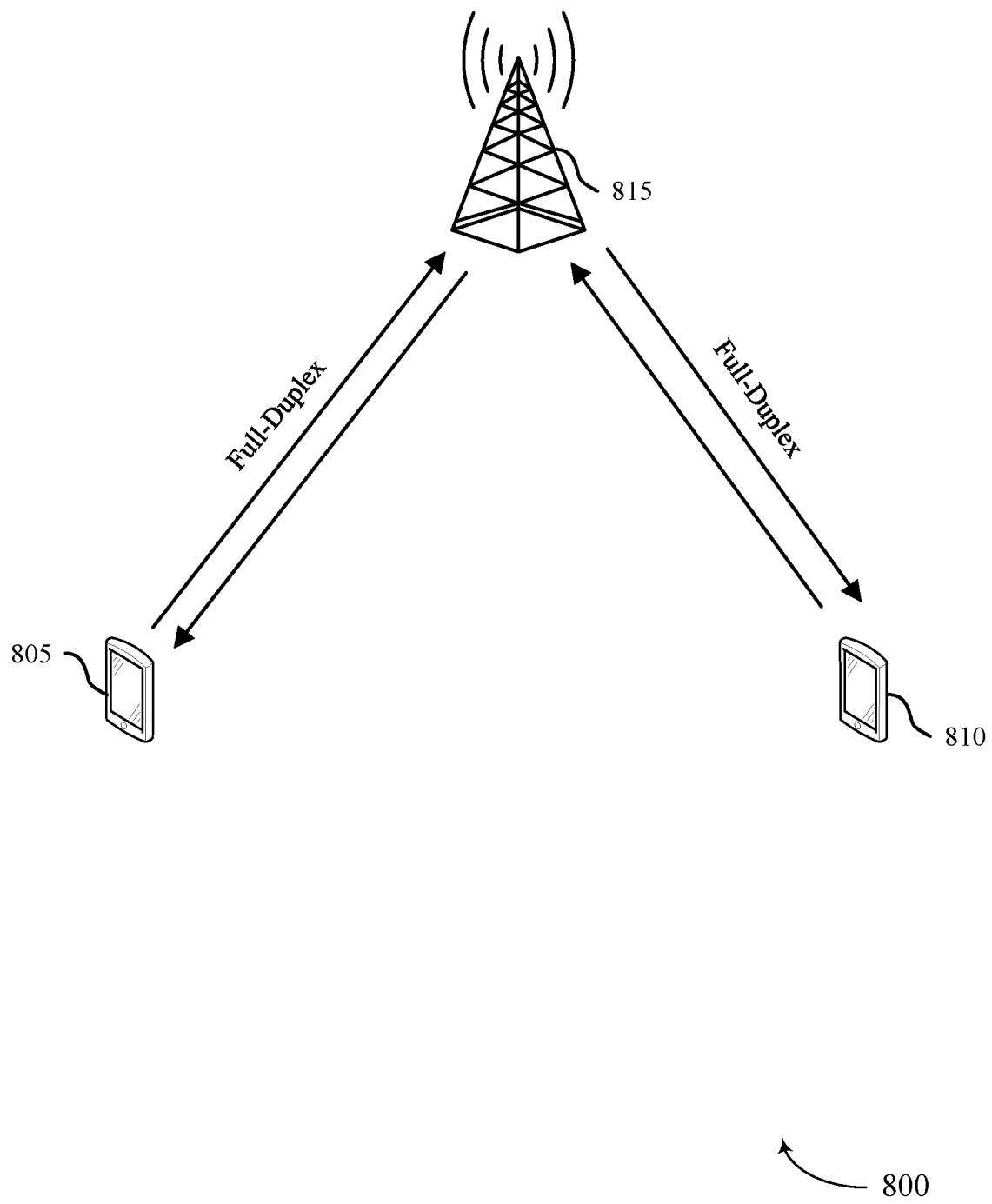

FIG. 8 illustrates an example of full-duplex communications 800 that support configuration common signaling for full duplex operation in accordance with aspects of the present disclosure. The full-duplex communications 800 may include a first UE 805, a second UE 810, and a base station 815. The first UE 805 and the second UE 810 may be examples of UEs 115 described herein, and the base station 815 may be an example of base stations 105 described herein.

In the example of full-duplex communications 800, a first UE 805 and a second UE 810 may be configured to support full-duplex communications, (e.g., the UEs may be configured to simultaneously transmit and receive uplink and downlink communications with the base station 815), while the base station 815 may also be configured to support full-duplex communications.

In some cases, a base station 715 may transmit configuration common signaling to the UEs 705 and 710. For example, the base station 715 may transmit an information element (e.g., tdd-UL-DL-ConfigurationCommon) via RRC signaling or in a first system information block to the UEs 705 and 710 to notify the UEs of a common slot format pattern for communicating with the base station 715.

In some examples, the first UE 805 may be associated with a first UE group, and the second UE 810 may be associated with a second UE group, or the first UE 805 and the second UE 810 may be part of a same UE group. In such cases, the base station 815 may configure one information element (e.g., one tdd-UL-DL-ConfigurationCommon information element) to indicate a slot format pattern for the UEs. In some cases, because the UEs 805 and 810 are both full-duplex UEs, the slot format pattern may be cell-specific (e.g., one full-duplex tdd-UL-DL-ConfigurationCommon information element may be configured for the UEs).

The information element may configure a slot format pattern for the UEs 805 and 810 to use for full duplex communications. For example, each slot format pattern may have a number of downlink symbols (D), uplink symbols (U), flexible symbols (F), full-duplex symbols (FD), or any combination thereof. Some example slot format patterns may include D . . . F . . . FD . . . U . . . , D . . . D . . . F . . . U . . . , D . . . FD . . . F . . . FD . . . U . . . D . . . FD . . . U . . . D . . . U . . . FD . . . FD . . . D . . . U . . . D . . . F . . . FD . . . , F . . . FD . . . , BD . . . F . . . , FD . . . , or any other combination of symbols.

In some other cases, a slot format pattern may be defined by overwriting one or more symbols of a different slot format pattern using an overwriting rule. For example, downlink symbols, uplink symbols, or flexible symbols may be overwritten to be full-duplex symbols. In some cases, the overwriting may occur for an slot index range (e.g., slots or symbols [n-m]). In such cases, the base station may transmit an overwriting rule in a different SIB, or a different information element of the first SIB. may be the base station 815 may flexibly configure or reconfigure the first slot pattern and the second slot pattern to support the full duplex mode of the base station 815 and the UEs 805 and 810. In some cases, the base station 815 may generate full-duplex slot format patterns using a full-duplex generation pattern applied to the common configuration information element.

Figure 9:
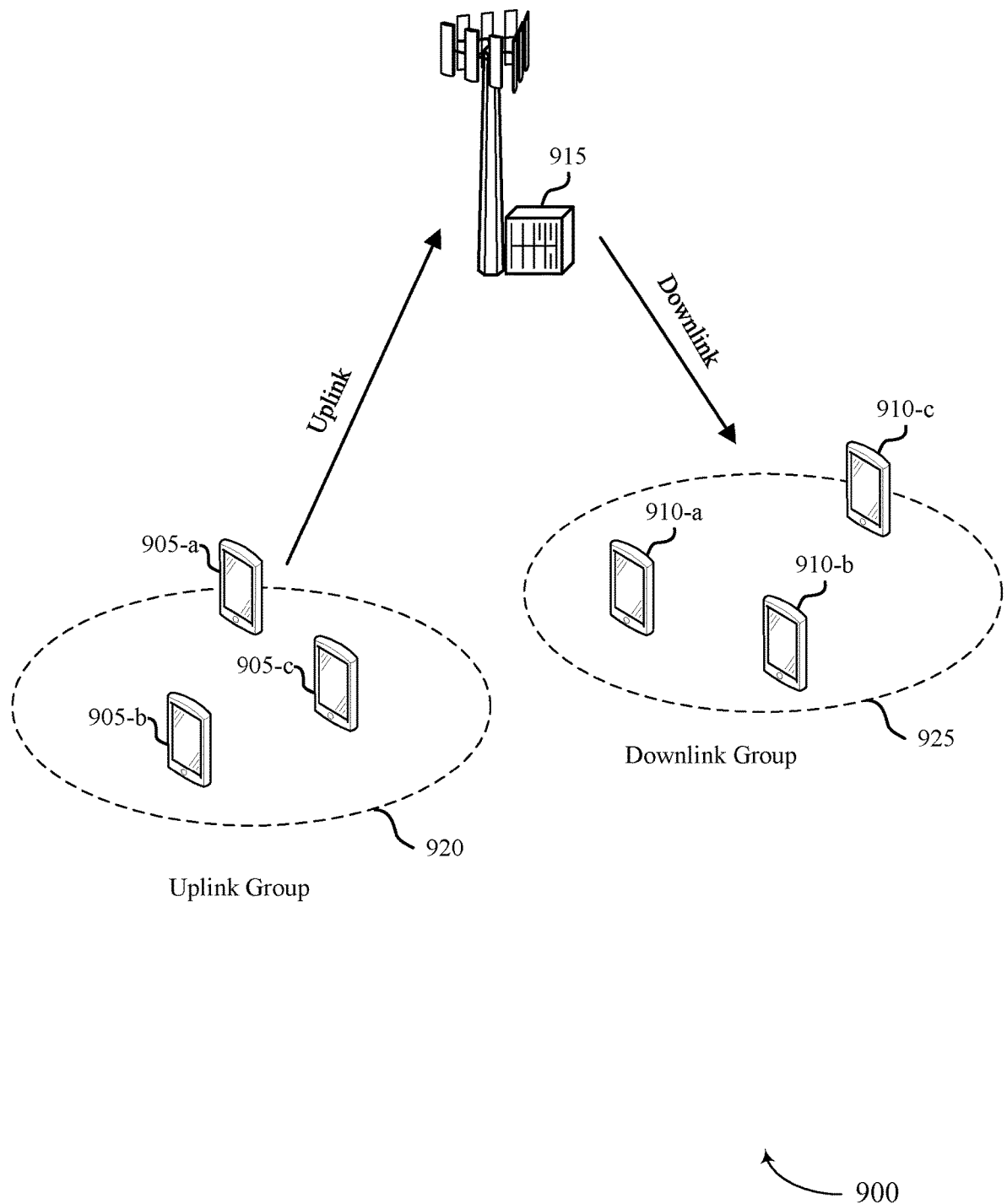
FIG. 9 illustrates an example of a grouping configuration that supports configuration common signaling for full duplex operation in accordance with aspects of the present disclosure.

FIG. 9 illustrates an example of a grouping configuration 900 that supports configuration common signaling for full duplex operation in accordance with aspects of the present disclosure. The grouping configuration 800 may include a first set of UEs 920 including UEs 905-a, 905-b, and 905-c, a second group of UEs 925 including UEs 910-a, 910-b, and 910-c, and a base station 915. The UEs 905 and the UEs 910 may be examples of UEs 115 described herein, and the base station 915 may be an example of base stations 105 described herein.

In some examples, the first UE group 920 may be associated with UEs 905 which are configured to support half-duplex communications, and the second UE group 925 may be associated with UEs 910, which may be configured to support half-duplex communications. The base station 915 may be configured to support full-duplex communications. For example, the first UE group 920 may participate in uplink communications with the base station 915 using a half-duplexing mode during a first time duration, and the second UE group 925 may participate in downlink communications with the base station 915 using a half-duplexing mode during the first time duration. The base station 915 may operate using a full-duplexing mode to simultaneously communicate with UEs of the first UE group 920 and with UEs of the second UE group 925 during the first duration.

The base station may determine the UE groups 920 and 925 using a number of different techniques. In some cases, the base station 915 may group the UEs based on one or more specified rules. In some examples, the base station 915 may determine the UE grouping based on global identifiers (IDs) associated with each UE (e.g., international mobile subscriber entity (IMSI) global IDs). For example, the base station 915 may group UEs having odd IMSI global IDs in a first group and the base station 915 may group UEs having even IMSI global IDs in a second group.

In some other examples, each UE may randomly choose a group to join (e.g., based on a random number generation or an otherwise random selection). In some other examples, the base station 915 may group the UEs based on a received measurement of RSRP. For example, the base station may transmit SSBs to UEs, which the UEs may use to measure and report RSRP or other signal strength metrics to the base station 915. For example, the base station 915 may assign UEs with a higher measured RSRP to a first UE group 920 (e.g., an uplink group) and may assign UEs with a lower measured RSRP to the second UE group 925 (e.g., the downlink UE group). In some cases, the higher RSRP UEs may be assigned to an uplink group and the lower RSRP UEs may be assigned to the downlink group based on different downlink and uplink link budgets. In such examples, the base station 915 may indicate or predefine a signal strength or RSRP threshold associated with each group.

In some other cases, the base station 915 may dynamically group the UEs using downlink signaling. The base station 915 may transmit or broadcast system information (e.g., remaining minimum system information (RMSI)) which includes two sets of tdd-UL-DL-ConfigurationCommon. In such cases, one tdd-UL-DL-ConfigurationCommon may be associated with the first set of UEs, and another tdd-UL-DL-ConfigurationCommon may be associated with the second set of UEs. The base station 915 may configure two sets of SSBs or random access channel (RACH) occasions, one set for the first group of UEs and one set for the second group of UEs. The SSBs or RACH occasions for the two different groups may be configured at different time resources to support initial access operations in full-duplex mode.

In some other cases that the UEs are operating in a connected mode. For example, the base station may transmit control information (e.g., downlink control information (DCI) or a medium access control control-element (MAC-CE)) to update tdd-UL-DL-ConfigurationCommon for the first group of UEs, the second group of UEs, or both. In cases that the base station transmits DCI, the base station may configure two DCI common-identifiers (slot format indication-radio network temporary identifier (SFI-RNTIs)) to differentiate two groups for UEs and receive the group-based DCI.

In some cases, the base station 915 may dynamically change the UE groupings using the DCI or MAC-CE by including a different group ID for a UE. For example, due to a UE location change, beam change, or one or more connected mode measurements of narrower data beams per UE, the base station 915 may change the grouping for the UE.

In one example, based CSI-RS measurement, the base station 915 may pair a downlink beam associated with a first UE with an uplink beam associated with a second UE with lower BS SI. Further, a downlink beam associated with a third UE may be paired with an uplink beam associated with a fourth UE. In addition, a downlink beam associated with a fifth UE may be paired with an uplink beam associated with a sixth UE. The base station 915 may group the first UE, the third UE and the fifth UE as one group, and may group the second UE, the fourth UE, and the sixth UE as another group.

Figure 10:
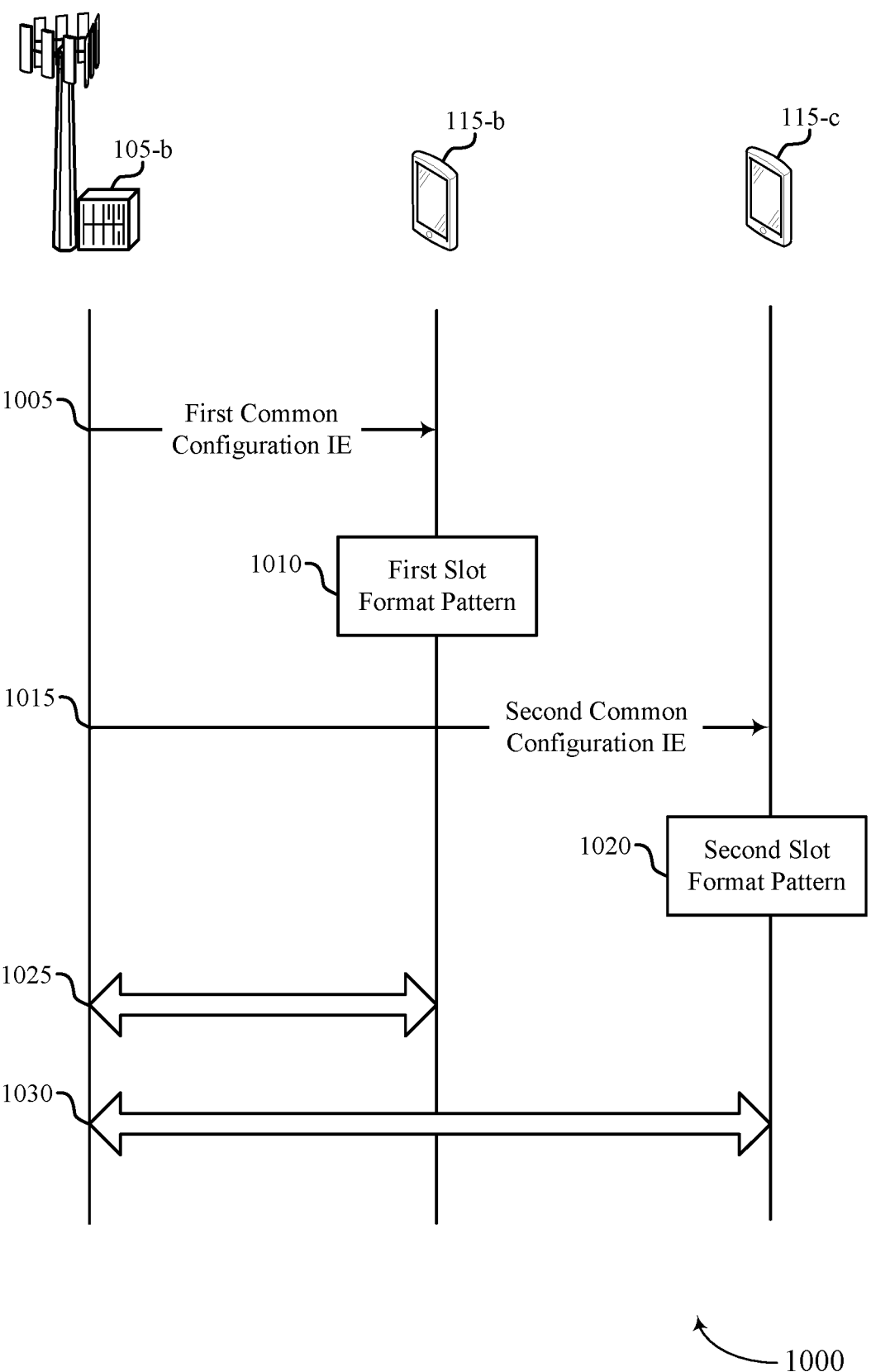
FIG. 10-12 illustrates example process flows that support configuration common signaling for full duplex operation in accordance with aspects of the present disclosure.

FIG. 10 illustrates an example of a process flow 1000 that supports configuration common signaling for full duplex operation in accordance with aspects of the present disclosure. Process flow 1000 includes a first UE 115-b and a second UE 115-c, which may be examples of UEs 115 described with reference to FIGS. 1-9. Process flow 1000 also includes a base station 105-b, which may be an example of a base station 105 described with reference to FIGS. 1-9. The process flow 1000 may implement aspects of wireless communications system 400. For example, the process flow 1000 may support efficient techniques for facilitating UE grouping and dynamic slot format configuration to support full-duplex communications and half-duplex communications.

In the following description of the process flow 1000, the signaling exchanged between UE 115-b, UE 115-c, and base station 105-b may be exchanged in a different order than the example order shown, or the operations performed by UE 115-b, UE 115-c, and base station 105-b may be performed in different orders or at different times. Some operations may also be omitted from the process flow 1000, and other operations may be added to the process flow 1000.

At 1005, the base station 105-b may transmit, to a first set of UEs including at least the first UE 115-b, a first control signal which identifies a first configuration common information element which indicates a first slot format pattern 1010 of a first set of slots to be used by the first set of UEs.

At 1015, the base station 105-b may transmit, to a second set of UEs including at least the first UE 115-c, a second control signal which identifies a second configuration common information element which indicates a second slot format pattern 1020 of a second set of slots to be used by the second set of UEs.

In some cases, the first control signal is a first RRC message and the second control signal is a second RRC message which each indicate respective first and second slot format patterns. In some examples, the first UE 115-b and the second UE 115-c may operate in a half-duplex mode, and the base station 105-b may configure the first slot format pattern as a number of downlink symbols, followed by a number of flexible symbols, followed by a number of uplink symbols, and may configure the second slot format pattern as a number of uplink symbols, followed by a number of flexible symbols, followed by a number of downlink symbols.

In some examples, the base station 105-*b* may overwrite the first slot format pattern over an indexed range of the first set of slots. The base station 105-*b* may overwrite respective uplink symbols of the first slot format pattern such that they correspond to downlink symbols of the second slot format pattern, and such that respective downlink symbols of the first slot format pattern correspond to uplink symbols of the second slot format pattern.

In some implementations, the base station 105-*b* may operate in a half-duplex mode, the first UE 115-*b* operates in a half-duplex mode, and the second UE 115-*c* operates in a full-duplex mode. In such implementations, the base station 105-*b* may configure the first slot format pattern as a number of downlink symbols, followed by a number of flexible symbols, followed by a number of uplink symbols, and may configure the second slot format pattern as a number of downlink symbols, followed by a number of flexible symbols, followed by a number of full-duplex symbols.

In some other implementations, the base station 105-*b* is associated with two TRPs which operate in a half-duplex mode, the first UE 115-*b* is configured to operate in a half-duplex mode, and the second UE 115-*c* is configured to operate in a full-duplex mode. In such implementations, the first slot format pattern may include a number of downlink symbols, followed by a number of flexible symbols, followed by a number of uplink symbols, and the second slot format pattern may include a number of full-duplex symbols, followed by a number of flexible symbols, followed by a number of downlink symbols.

In some cases, the base station 105-*b* may determine a rule to modify the first slot format pattern which generates the second slot format pattern by replacing a number of uplink symbols, a number of flexible symbols, a number of downlink symbols, or a combination thereof of the first slot format pattern, with a corresponding number of full duplex slots. The base station 105-*b* may transmit, via the second control signal, the determined rule to the second UE 115-*c*. In some examples, the base station 105-*b* may include an indication of a slot index range in which the modifying rule is valid.

In some other implementations, the base station 105-*b* may operate in a full-duplex mode, the first UE 115-*b* operates in a half-duplex mode, and the second UE 115-*c* operates in a full-duplex mode. In such implementations, the base station 105-*b* may configure the first slot format pattern as a number of downlink symbols, followed by a number of flexible symbols, followed by a number of uplink symbols, and may configure the second slot format pattern as a number of downlink symbols, followed by a number of flexible symbols, followed by a number of full-duplex symbols. In some other cases, the base station 105-*b* may configure the first slot format pattern as a number of downlink symbols, followed by a number of flexible symbols, followed by a number of uplink symbols, and may configure the second slot format pattern as a number of full-duplex symbols, followed by a number of flexible symbols, followed by a number of uplink symbols.

At 1025, the base station 105-*b* may communicate with the first set of UEs including the first UE 115-*b*, and at 1030 the base station 105-*b* may communicate with the second set of UEs including the second UE 115-*c*.

Figure 11:
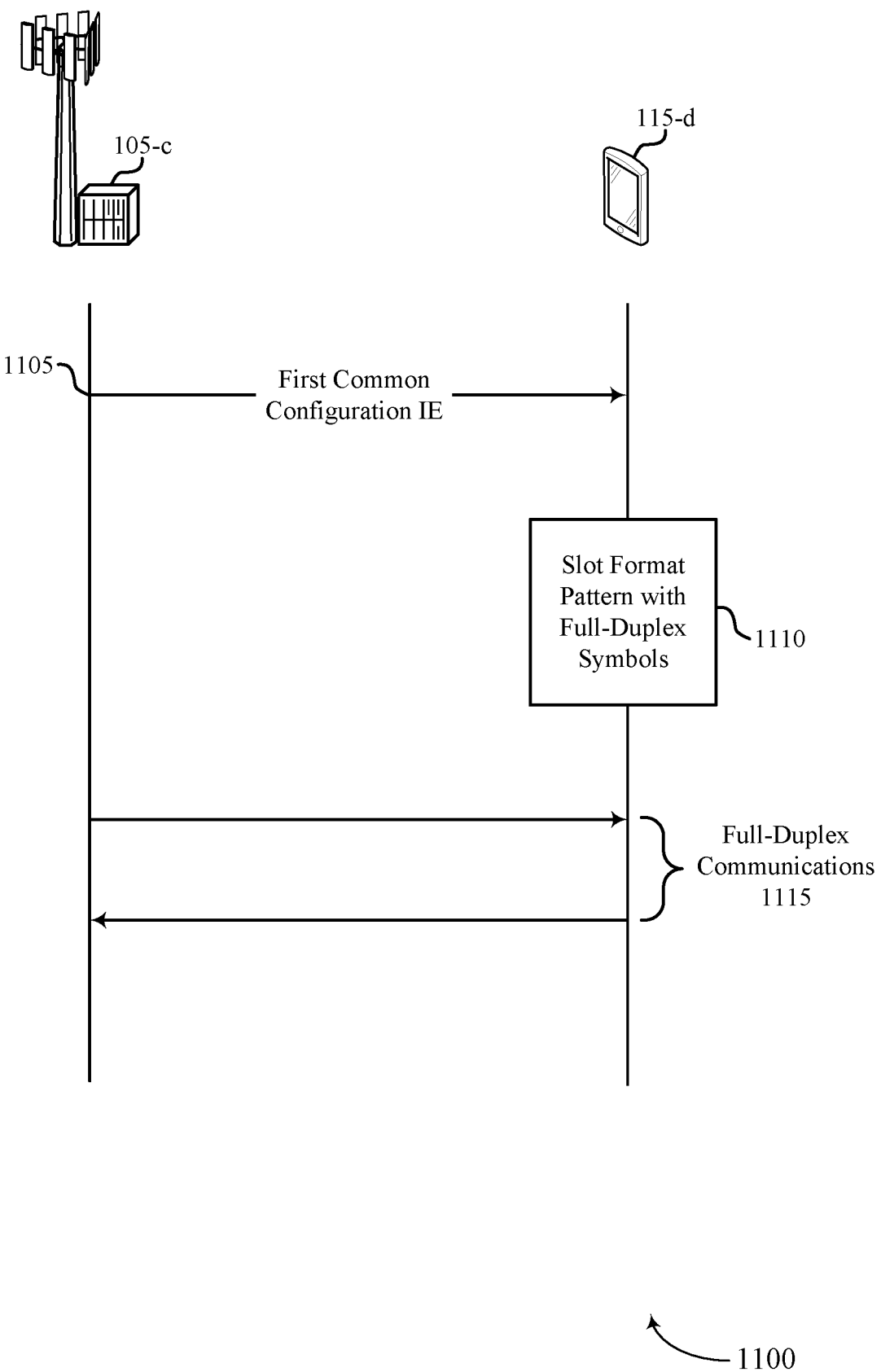

FIG. 11 illustrates an example of a process flow 1100 that supports configuration common signaling for full duplex operation in accordance with aspects of the present disclosure. Process flow 1100 includes a UE 115-*d*, which may be an example of UEs 115 described with reference to FIGS. 1-10. Process flow 1100 also includes a base station 105-*c*, which may be an example of a base station 105 described with reference to FIGS. 1-10. The process flow 1100 may implement aspects of wireless communications system 400. For example, the process flow 1100 may support efficient techniques for facilitating UE grouping and dynamic slot format configuration to support full-duplex communications and half-duplex communications.

In the following description of the process flow 1100, the signaling exchanged between UE 115-*d* and base station 105-*c* may be exchanged in a different order than the example order shown, or the operations performed by UE 115-*d* and base station 105-*c* may be performed in different orders or at different times. Some operations may also be omitted from the process flow 1100, and other operations may be added to the process flow 1100.

At 1105, the base station 105-*c* may transmit, to each UE of a set of UEs including UE 115-*d*, a control signal which identifies a first common configuration information element which indicates a first slot format pattern. The first slot format pattern may indicate a first set of slots associated with a set of full-duplex UEs, and the first slot format pattern may also include one or more full-duplex symbols. In some aspects, the first common configuration information element may be a cell-specific configuration for a cell including the first set of UEs.

At 1110, the UE 115-*d* may identify the slot format pattern including any combination of a number of uplink symbols, a number of downlink symbols, a number of flexible symbols, and a number of full-duplex symbols.

In some cases, the first common configuration information element includes an overwriting rule, and the UE 115-*d* or the base station 105-*c* may overwrite a second slot format pattern to determine the first slot format pattern. In such cases, one or more uplink symbols, downlink symbols, or flexible symbols may be overwritten as one or more full duplex slots based on the overwriting rule. The overwriting rule may contain an indication of a slot index range with which to apply the overwriting rule.

At 1115, the UE 115-*d* may participate in full-duplex communications with the base station 105-*c*.

Figure 12:
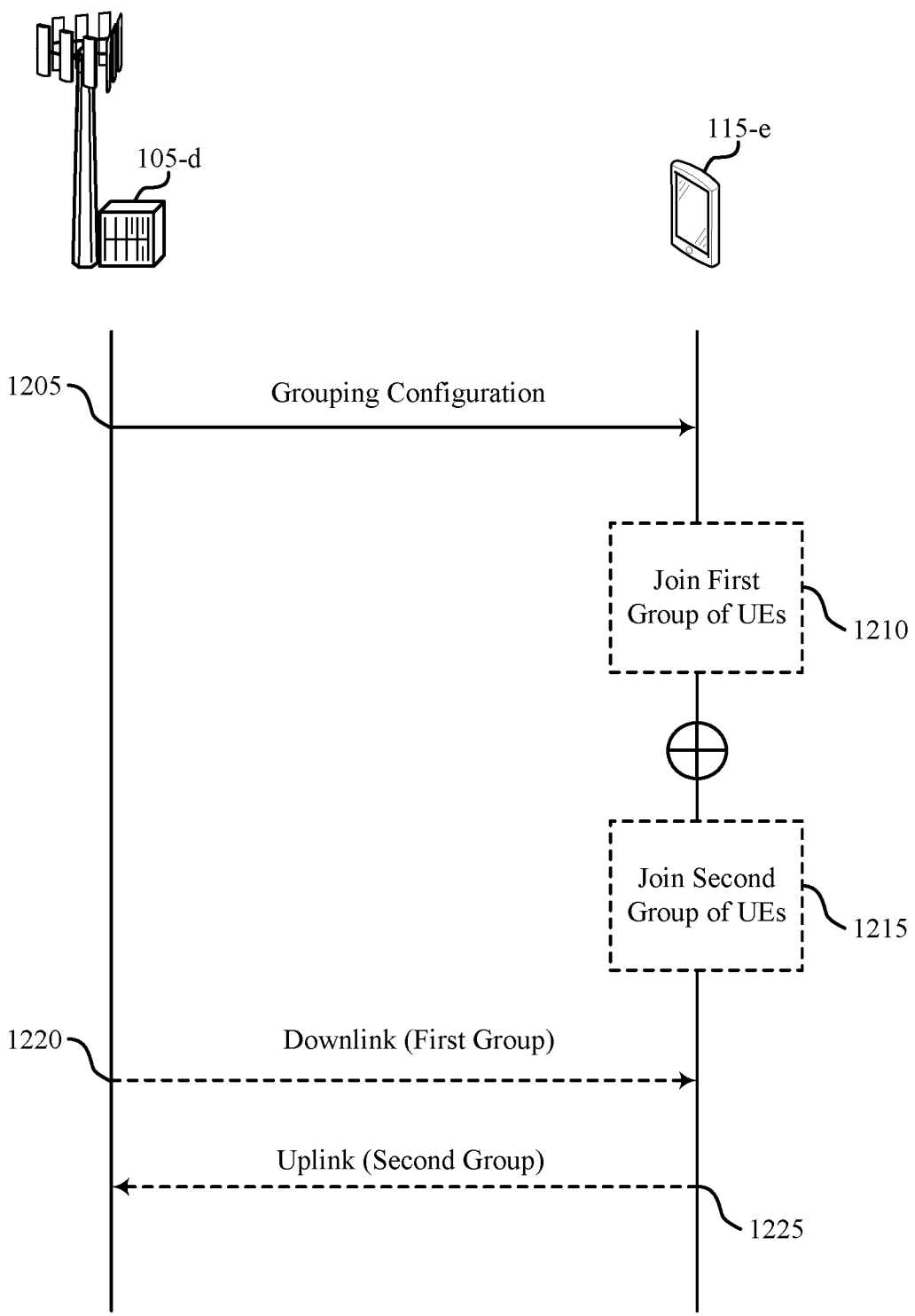

FIG. 12 illustrates an example of a process flow 1200 that supports configuration common signaling for full duplex operation in accordance with aspects of the present disclosure. Process flow 1200 includes a UE 115-*e*, which may be an example of UEs 115 described with reference to FIGS. 1-11. Process flow 1200 also includes a base station 105-*d*, which may be an example of a base station 105 described with reference to FIGS. 1-11. The process flow 1200 may implement aspects of wireless communications system 400. For example, the process flow 1200 may support efficient techniques for facilitating UE grouping and dynamic slot format configuration to support full-duplex communications and half-duplex communications.

In the following description of the process flow 1200, the signaling exchanged between UE 115-*e* and base station 105-*d* may be exchanged in a different order than the example order shown, or the operations performed by UE 115-*e* and base station 105-*d* may be performed in different orders or at different times. Some operations may also be omitted from the process flow 1200, and other operations may be added to the process flow 1200.

At 1205, the base station 105-*d* operating in a full-duplexing mode may transmit, and the UE 115-*e* may receive, a message identifying a grouping configuration for assigning the UE 115-*e* to either a first group of UEs configured for transmitting uplink communications or a second group of UEs configured for receiving downlink communications.

At 1210 or 1215, the UE 115-*e* may join the first group of UEs or the second group of UEs based on the grouping configuration message. For example, the UE 115-*e* may determine whether to join the first group of UEs or the second group of UEs based on a global identifier associated with the UE 115-*e*. In some other examples, the UE 115-*e* may determine whether to join the first group of UEs or the second group of UEs based on a random selection of the first group of UEs or the second group of UEs.

In some other cases, the UE 115-*e* may receive, from the base station 105-*d*, ad RSRP threshold value, and the UE 115-*e* may determine to join the first group of UEs or the second group of UEs based comparing a measured RSRP value to the threshold RSRP. For example, the first group of UEs may be associated with RSRP values which exceed a threshold RSRP value, and the second group of UEs are associated with RSRP values which are less than the threshold RSRP value.

In some cases, the grouping configuration message includes an indication of one or more SSBs for reception by the UE 115-*e*. The UE 115-*e* may receive, from the base station 105-*d*, *e* a first set of SSBs associated the first set of UEs and a second set of SSBs associated with the second set of UEs. The UE may perform an initial access procedure to determine whether to join the first set of UEs or the second set of UEs.

In some cases, the grouping configuration message includes an indication of a first set RACH occasions configured for the first group of UEs and a second set of RACH occasions configured for the second group of UEs. The UE 115-*e* may perform an initial access procedure with the base station 105-*d* using a RACH occasion of the first set of RACH occasions or a RACH occasion of the second set of RACH occasions based at least in part on joining the first group of UEs or the second group of UEs. In some examples, the first set of RACH occasions are associated with a first time resource and the second set of RACH occasions are associated with a second time resource.

In some examples, the UE 115-*e* may receive a control message (e.g., a DCI or MAC-CE) which indicates an update to the apply to the grouping configuration, and the UE 115-*e* may update the grouping configuration based on the received control message. In some examples, the control message may be a DCI which includes a RNTI specifying the first group of UEs or the second group of UEs indicated in the grouping configuration. In some cases, the UE 115-*e* may receive an update to the grouping configuration based on a location change of the UE 115-*e*, a beam change at the UE 115-*e*, one or more signal quality measurements at the UE 115-*e*, or any combination thereof.

Figure 13:
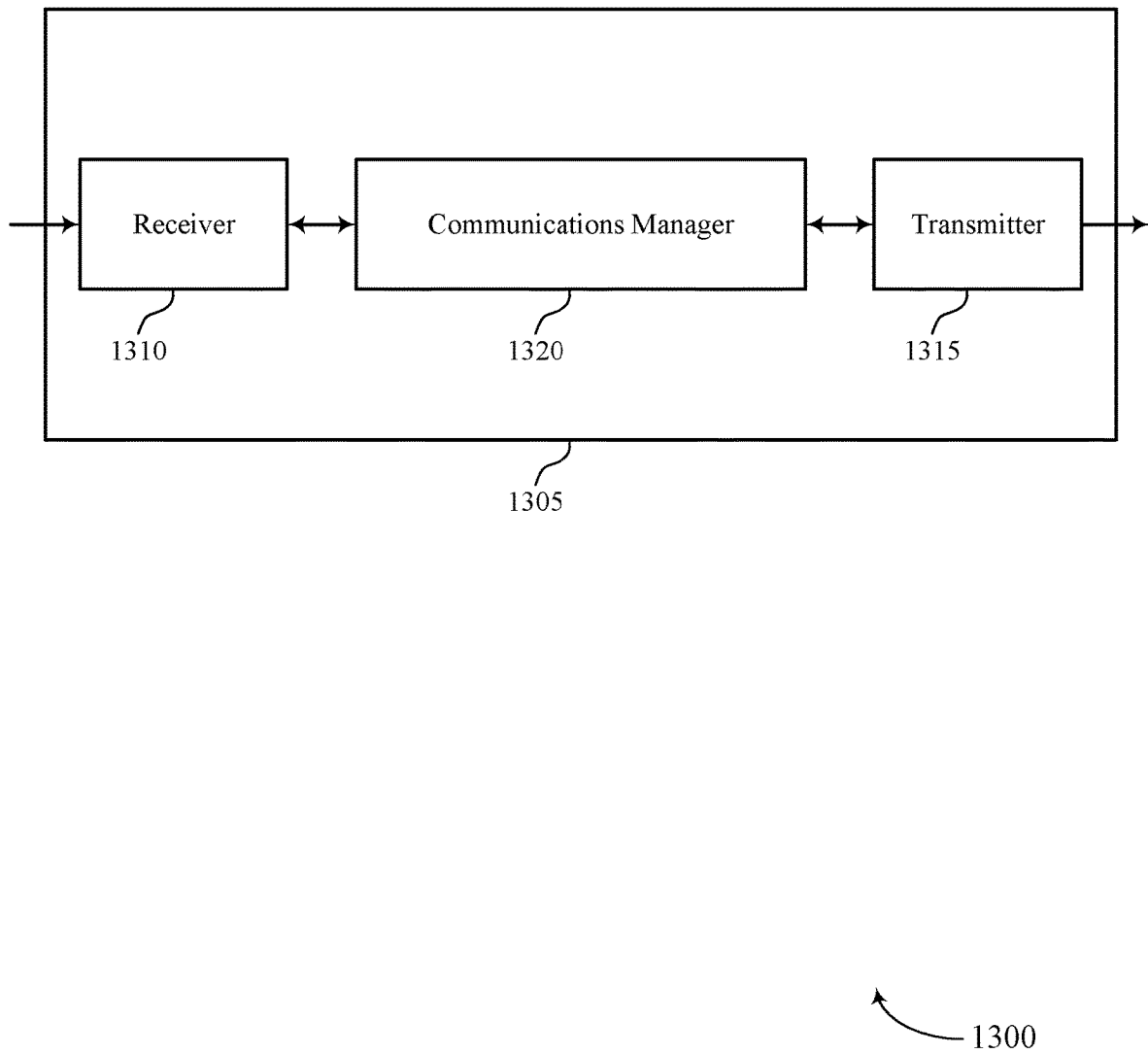
FIGS. 13 and 14 show block diagrams of devices that support configuration common signaling for full duplex operation in accordance with aspects of the present disclosure.

FIG. 13 shows a block diagram 1300 of a device 1305 that supports configuration common signaling for full duplex operation in accordance with aspects of the present disclosure. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to configuration common signaling for full duplex operation). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to configuration common signaling for full duplex operation). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of configuration common signaling for full duplex operation as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. For example, the communications manager 1320 may be configured as or otherwise support a means for transmitting, to a first set of user equipments (UEs), first control signaling identifying a first common configuration information element which indicates a first slot format pattern for a first set of slots associated with the first set of UEs. The communications manager 1320 may be configured as or otherwise support a means for transmitting, to a second set of UEs, second control signaling identifying a second common configuration information element which indicates a second slot format pattern for a second set of slots associated with the second set of UEs. The communications manager 1320 may be configured as or otherwise support a means for communicating with the first set of UEs and the second set of UEs in accordance with the first slot format pattern and the second slot format pattern.

Additionally or alternatively, the communications manager 1320 may support wireless communications at a base station in accordance with examples as disclosed herein. For example, the communications manager 1320 may be configured as or otherwise support a means for transmitting, to each UE of a set of UEs, a control signal identifying a first common configuration information element which indicates a first slot format pattern, the first slot format pattern for a first set of slots associated with a set of full-duplex UEs, and the first slot format pattern including one or more symbols being a full-duplex symbol. The communications manager 1320 may be configured as or otherwise support a means for communicating with the first set of UEs in accordance with the first slot pattern.

Additionally or alternatively, the communications manager 1320 may support wireless communications at a base station operating in a full-duplex mode in accordance with examples as disclosed herein. For example, the communications manager 1320 may be configured as or otherwise support a means for transmitting, to a UE operating in a half-duplex mode, a message which indicates a grouping configuration for assigning the UE into either a first group of UEs configured for transmitting uplink communications or a second group of UEs configured for receiving downlink communications. The communications manager 1320 may be configured as or otherwise support a means for communicating with the UE via uplink or downlink signaling based on determining whether the UE is assigned to the first group of UEs or the second group of UEs in accordance with the grouping configuration message.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for reduced processing, reduced power consumption, more efficient utilization of communication resources, and more efficient utilization of full-duplexing modes.

Figure 14:
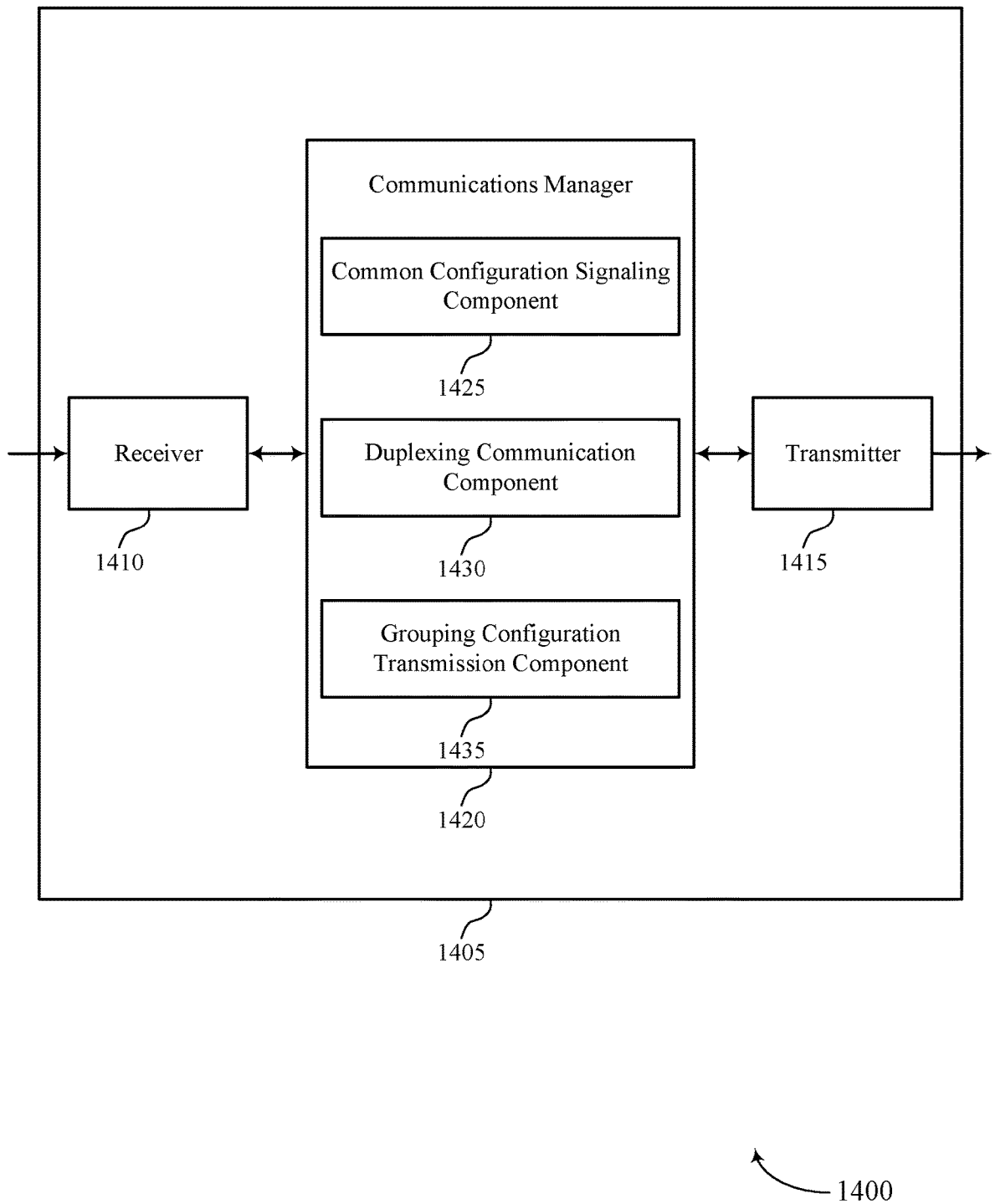

FIG. 14 shows a block diagram 1400 of a device 1405 that supports configuration common signaling for full duplex operation in accordance with aspects of the present disclosure. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to configuration common signaling for full duplex operation). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to configuration common signaling for full duplex operation). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of configuration common signaling for full duplex operation as described herein. For example, the communications manager 1420 may include a common configuration signaling component 1425, a duplexing communication component 1430, a grouping configuration transmission component 1435, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communications at a base station in accordance with examples as disclosed herein. The common configuration signaling component 1425 may be configured as or otherwise support a means for transmitting, to a first set of user equipments (UEs), first control signaling identifying a first common configuration information element which indicates a first slot format pattern for a first set of slots associated with the first set of UEs. The common configuration signaling component 1425 may be configured as or otherwise support a means for transmitting, to a second set of UEs, second control signaling identifying a second common configuration information element which indicates a second slot format pattern for a second set of slots associated with the second set of UEs. The duplexing communication component 1430 may be configured as or otherwise support a means for communicating with the first set of UEs and the second set of UEs in accordance with the first slot format pattern and the second slot format pattern.

Additionally or alternatively, the communications manager 1420 may support wireless communications at a base station in accordance with examples as disclosed herein. The common configuration signaling component 1425 may be configured as or otherwise support a means for transmitting, to each UE of a set of UEs, a control signal identifying a first common configuration information element which indicates a first slot format pattern, the first slot format pattern for a first set of slots associated with a set of full-duplex UEs, and the first slot format pattern including one or more symbols being a full-duplex symbol. The duplexing communication component 1430 may be configured as or otherwise support a means for communicating with the first set of UEs in accordance with the first slot pattern.

Additionally or alternatively, the communications manager 1420 may support wireless communications at a base station operating in a full-duplex mode in accordance with examples as disclosed herein. The grouping configuration transmission component 1435 may be configured as or otherwise support a means for transmitting, to a UE operating in a half-duplex mode, a message which indicates a grouping configuration for assigning the UE into either a first group of UEs configured for transmitting uplink communications or a second group of UEs configured for receiving downlink communications. The duplexing communication component 1430 may be configured as or otherwise support a means for communicating with the UE via uplink or downlink signaling based on determining whether the UE is assigned to the first group of UEs or the second group of UEs in accordance with the grouping configuration message.

Figure 15:
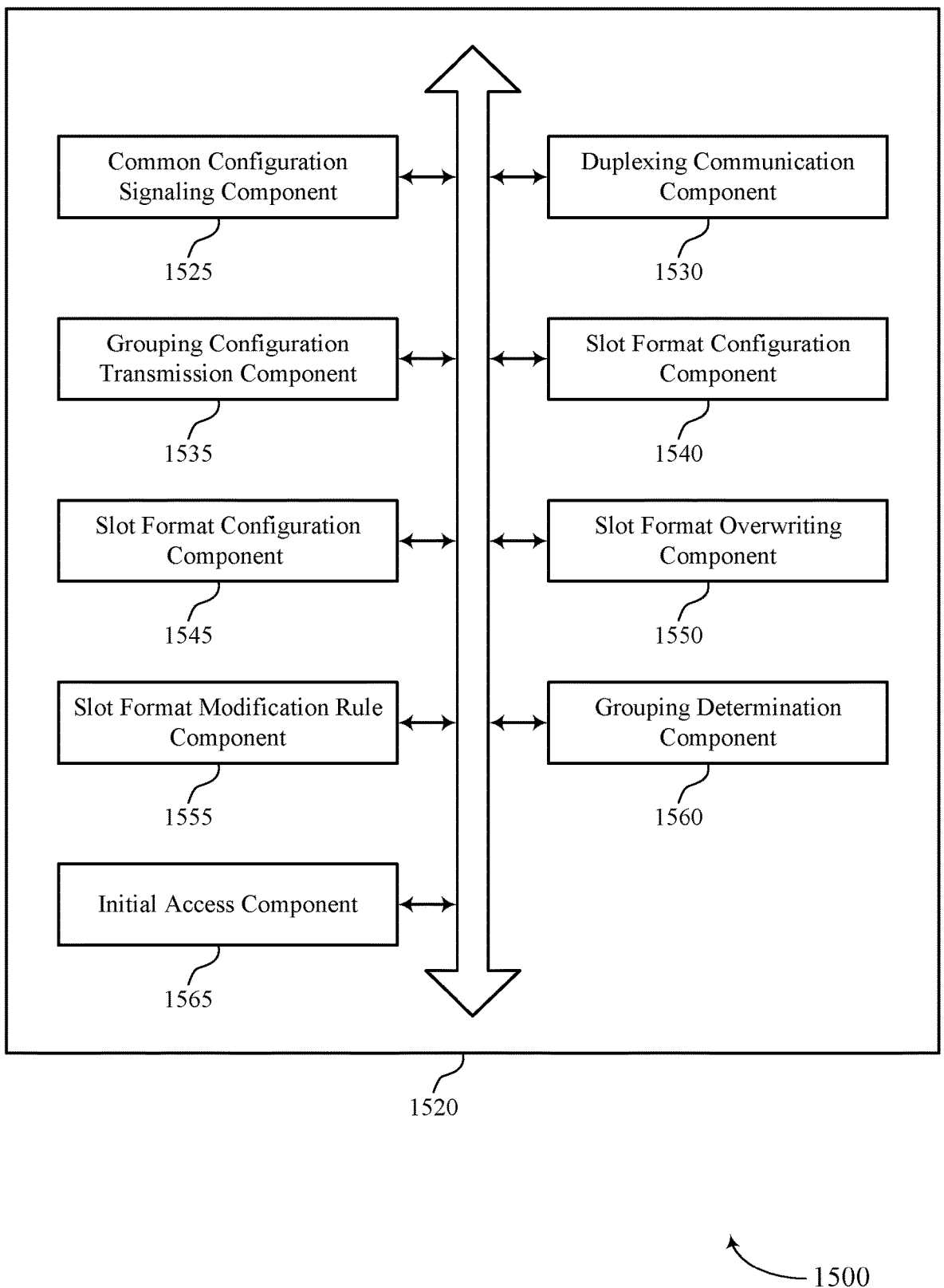
FIG. 15 shows a block diagram of a communications manager that supports configuration common signaling for full duplex operation in accordance with aspects of the present disclosure.

FIG. 15 shows a block diagram 1500 of a communications manager 1520 that supports configuration common signaling for full duplex operation in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of configuration common signaling for full duplex operation as described herein. For example, the communications manager 1520 may include a common configuration signaling component 1525, a duplexing communication component 1530, a grouping configuration transmission component 1535, a slot format configuration component 1540, a slot format configuration component 1545, a slot format overwriting component 1550, a slot format modification rule component 1555, a grouping determination component 1560, an initial access component 1565, or any combination thereof. Each of these components may communicate, directly or indirectly, with one another (e.g., via one or more buses).

The communications manager 1520 may support wireless communications at a base station in accordance with examples as disclosed herein. The common configuration signaling component 1525 may be configured as or otherwise support a means for transmitting, to a first set of user equipments (UEs), first control signaling identifying a first common configuration information element which indicates a first slot format pattern for a first set of slots associated with the first set of UEs. In some examples, the common configuration signaling component 1525 may be configured as or otherwise support a means for transmitting, to a second set of UEs, second control signaling identifying a second common configuration information element which indicates a second slot format pattern for a second set of slots associated with the second set of UEs. The duplexing communication component 1530 may be configured as or otherwise support a means for communicating with the first set of UEs and the second set of UEs in accordance with the first slot format pattern and the second slot format pattern.

In some examples, the first control signaling includes a first radio resource control message and the second control signaling includes a second radio resource control message, the first and second radio resource control messages indicating the respective first and second slot format patterns.

In some examples, the first set of UEs and the second set of UEs include half-duplex mode UEs, and the slot format configuration component 1540 may be configured as or otherwise support a means for configuring the first slot format pattern as a number of downlink symbols, followed by a number of flexible symbols, followed by a number of uplink symbols. In some examples, the first set of UEs and the second set of UEs include half-duplex mode UEs, and the slot format configuration component 1545 may be configured as or otherwise support a means for configuring the second slot format pattern as a number of uplink symbols, followed by a number of flexible symbols, followed by a number of downlink symbols.

In some examples, the slot format overwriting component 1550 may be configured as or otherwise support a means for overwriting the first slot format pattern, the overwriting spanning a range of the first set of slots, where respective uplink symbols of the first slot format pattern correspond to downlink symbols of the second slot format pattern, and respective downlink symbols of the first slot format pattern correspond to uplink symbols of the second slot format pattern.

In some examples, the base station operates in a half-duplex mode, and the slot format configuration component 1540 may be configured as or otherwise support a means for configuring the first slot format pattern as a number of downlink symbols, followed by a number of flexible symbols, followed by a number of uplink symbols. In some examples, the base station operates in a half-duplex mode, and the slot format configuration component 1540 may be configured as or otherwise support a means for configuring the second slot format pattern as a number of downlink symbols, followed by a number of flexible symbols, followed by a number of full-duplex symbols.

In some examples, the base station includes two transmission reception points operating in a half-duplex mode, and the slot format configuration component 1540 may be configured as or otherwise support a means for configuring the first slot format pattern as a number of downlink symbols, followed by a number of flexible symbols, followed by a number of uplink symbols. In some examples, the base station includes two transmission reception points operating in a half-duplex mode, and the slot format configuration component 1540 may be configured as or otherwise support a means for configuring the second slot format pattern as a number of full-duplex symbols, followed by a number of flexible symbols, followed by a number of downlink symbols.

In some examples, the base station includes two transmission reception points operating in a half-duplex mode, and the slot format modification rule component 1555 may be configured as or otherwise support a means for determining a rule to modify the first slot format pattern, where the rule generates the second slot format pattern by replacing a number of uplink symbols, a number of flexible symbols, a number of downlink symbols, or a combination thereof of the first slot format pattern, with a corresponding number of full duplex slots. In some examples, the base station includes two transmission reception points operating in a half-duplex mode, and the slot format modification rule component 1555 may be configured as or otherwise support a means for transmitting, via the second control signaling, the determined rule to the second set of UEs.

In some examples, the slot format modification rule component 1555 may be configured as or otherwise support a means for transmitting an indication of a slot index range assigned to the number of full duplex slots based on the rule.

In some examples, the base station operates in a full-duplex mode, and the slot format configuration component 1540 may be configured as or otherwise support a means for configuring the first slot format pattern as a number of downlink symbols, followed by a number of flexible symbols, followed by a number of uplink symbols. In some examples, the base station operates in a full-duplex mode, and the slot format configuration component 1540 may be configured as or otherwise support a means for configuring the second slot format pattern as a number of downlink symbols, followed by a number of flexible symbols, followed by a number of full-duplex symbols.

In some examples, the base station operates in a full-duplex mode, and the slot format configuration component 1540 may be configured as or otherwise support a means for configuring the first slot format pattern as a number of downlink symbols, followed by a number of flexible symbols, followed by a number of uplink symbols. In some examples, the base station is operates in a full-duplex mode, and the slot format configuration component 1540 may be configured as or otherwise support a means for configuring the second slot format pattern as a number of full-duplex symbols, followed by a number of flexible symbols, followed by a number of uplink symbols.

Additionally or alternatively, the communications manager 1520 may support wireless communications at a base station in accordance with examples as disclosed herein. In some examples, the common configuration signaling component 1525 may be configured as or otherwise support a means for transmitting, to each UE of a set of UEs, a control signal identifying a first common configuration information element which indicates a first slot format pattern, the first slot format pattern for a first set of slots associated with a set of full-duplex UEs, and the first slot format pattern including one or more symbols being a full-duplex symbol. In some examples, the duplexing communication component 1530 may be configured as or otherwise support a means for communicating with the first set of UEs in accordance with the first slot pattern.

In some examples, the first slot format pattern includes any combination of a number of uplink symbols, a number of downlink symbols, a number of flexible symbols, and a number of full-duplex symbols.

In some examples, the first common configuration information element includes an overwriting rule, and the slot format overwriting component 1550 may be configured as or otherwise support a means for overwriting a second slot format pattern to determine the first slot format pattern, where one or more uplink symbols, downlink symbols, or flexible symbols are overwritten as one or more full duplex slots based on the overwriting rule.

In some examples, the overwriting rule further includes an indication of a slot index range to apply the overwriting rule.

In some examples, the first common configuration information element is a cell specific configuration for a cell associated with the first set of UEs.

Additionally or alternatively, the communications manager 1520 may support wireless communications at a base station operating in a full-duplex mode in accordance with examples as disclosed herein. The grouping configuration transmission component 1535 may be configured as or otherwise support a means for transmitting, to a UE operating in a half-duplex mode, a message which indicates a grouping configuration for assigning the UE into either a first group of UEs configured for transmitting uplink communications or a second group of UEs configured for receiving downlink communications. In some examples, the duplexing communication component 1530 may be configured as or otherwise support a means for communicating with the UE via uplink or downlink signaling based on determining whether the UE is assigned to the first group of UEs or the second group of UEs in accordance with the grouping configuration message.

In some examples, the grouping configuration is based on a global identifier associated with the UE. In some examples, the first group of UEs includes even identifiers and the second group of UEs includes odd identifiers.

In some examples, the grouping configuration is based on a random selection of the first group of UEs or the second group of UEs.

In some examples, the grouping determination component 1560 may be configured as or otherwise support a means for transmitting, to the UE, a RSRP threshold value, where the grouping configuration is based on the RSRP threshold value.

In some examples, the first group of UEs are associated with RSRP values which exceed a threshold RSRP value, and the second group of UEs are associated with RSRP values which are less than the threshold RSRP value.

In some examples, the grouping configuration includes an indication of one or more synchronization signal blocks for reception by the first group of UEs, and the initial access component 1565 may be configured as or otherwise support a means for transmitting, to the first group of UEs, the one or more synchronization signal blocks associated with a first initial access procedure during a first time resource. In some examples, the grouping configuration includes an indication of one or more synchronization signal blocks for reception by the first group of UEs, and the initial access component 1565 may be configured as or otherwise support a means for transmitting, to the second group of UEs, one or more synchronization signal blocks associated with a second initial access procedure during a second time resource.

In some examples, the grouping configuration includes an indication of one or more random access channel occasions configured for the second group of UEs, and the initial access component 1565 may be configured as or otherwise support a means for communicating with the second group of UEs using the one or more random access channel occasions during a third time resource. In some examples, the grouping configuration includes an indication of one or more random access channel occasions configured for the second group of UEs, and the initial access component 1565 may be configured as or otherwise support a means for communicating with the first group of UEs using the one or more random access channel occasions during a fourth time resource.

In some examples, the grouping configuration transmission component 1535 may be configured as or otherwise support a means for transmitting a control message which indicates an update to apply to the grouping configuration. In some examples, the duplexing communication component 1530 may be configured as or otherwise support a means for receiving communications from the first group of UEs, the second group of UEs, or both, based on the update to the grouping configuration.

In some examples, the control message includes a downlink control information message, and the grouping determination component 1560 may be configured as or otherwise support a means for transmitting the downlink control information message, the downlink control information including a radio network temporary identifier associated with the first group of UEs or the second group of UEs.

In some examples, the grouping configuration transmission component 1535 may be configured as or otherwise support a means for transmitting the control message based on a location change of the UE, a beam change at the UE, one or more signal quality measurements at the UE, or any combination thereof.

In some examples, the control message includes a downlink control information message or a medium access control-control element.

Figure 16:
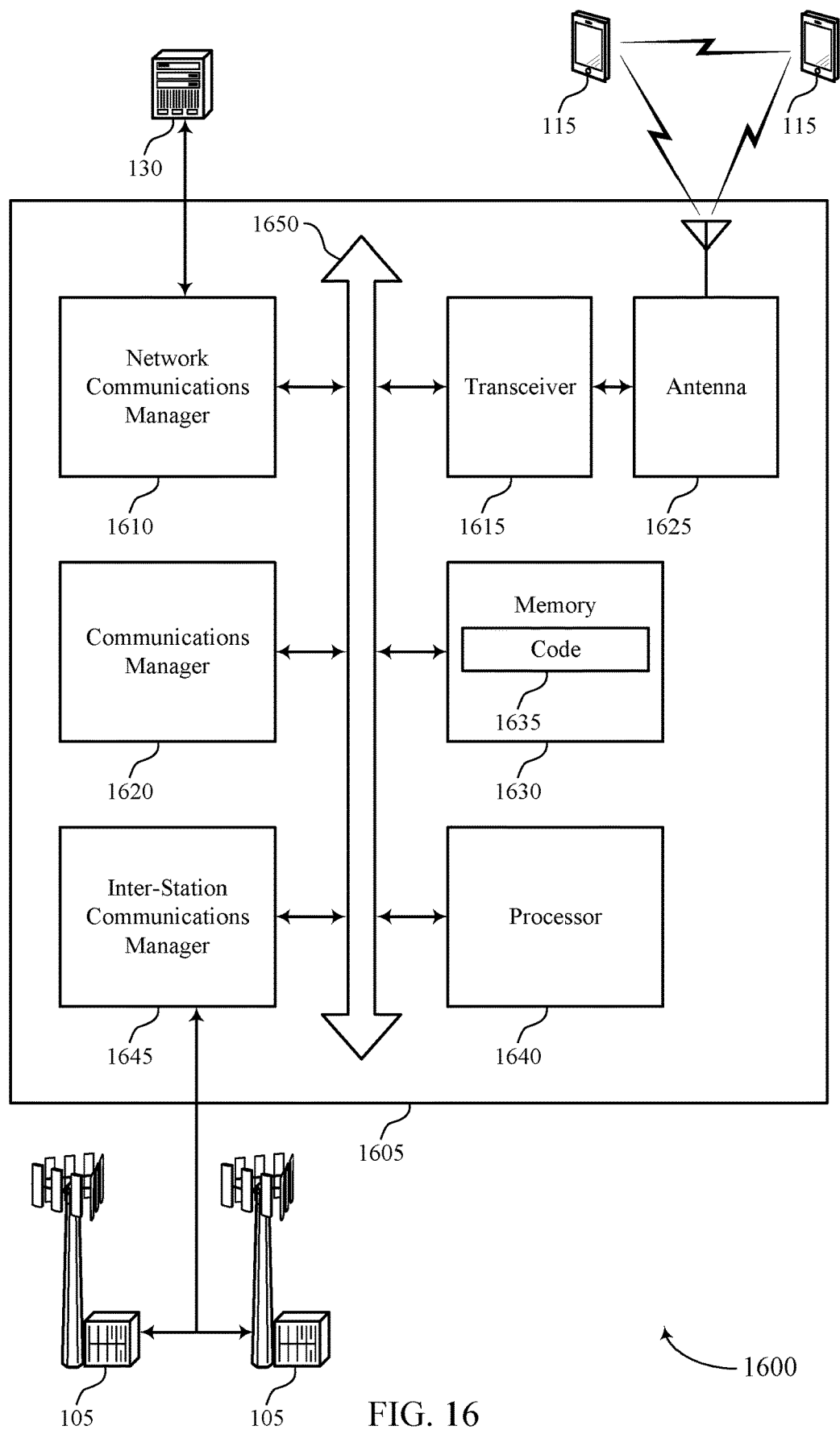
FIG. 16 shows a diagram of a system including a device that supports configuration common signaling for full duplex operation in accordance with aspects of the present disclosure.

FIG. 16 shows a diagram of a system 1600 including a device 1605 that supports configuration common signaling for full duplex operation in accordance with aspects of the present disclosure. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting configuration common signaling for full duplex operation). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communications at a base station in accordance with examples as disclosed herein. For example, the communications manager 1620 may be configured as or otherwise support a means for transmitting, to a first set of user equipments (UEs), first control signaling identifying a first common configuration information element which indicates a first slot format pattern for a first set of slots associated with the first set of UEs. The communications manager 1620 may be configured as or otherwise support a means for transmitting, to a second set of UEs, second control signaling identifying a second common configuration information element which indicates a second slot format pattern for a second set of slots associated with the second set of UEs. The communications manager 1620 may be configured as or otherwise support a means for communicating with the first set of UEs and the second set of UEs in accordance with the first slot format pattern and the second slot format pattern.

Additionally or alternatively, the communications manager 1620 may support wireless communications at a base station in accordance with examples as disclosed herein. For example, the communications manager 1620 may be configured as or otherwise support a means for transmitting, to each UE of a set of UEs, a control signal identifying a first common configuration information element which indicates a first slot format pattern, the first slot format pattern for a first set of slots associated with a set of full-duplex UEs, and the first slot format pattern including one or more symbols being a full-duplex symbol. The communications manager 1620 may be configured as or otherwise support a means for communicating with the first set of UEs in accordance with the first slot pattern.

Additionally or alternatively, the communications manager 1620 may support wireless communications at a base station operating in a full-duplex mode in accordance with examples as disclosed herein. For example, the communications manager 1620 may be configured as or otherwise support a means for transmitting, to a UE operating in a half-duplex mode, a message which indicates a grouping configuration for assigning the UE into either a first group of UEs configured for transmitting uplink communications or a second group of UEs configured for receiving downlink communications. The communications manager 1620 may be configured as or otherwise support a means for communicating with the UE via uplink or downlink signaling based on determining whether the UE is assigned to the first group of UEs or the second group of UEs in accordance with the grouping configuration message.

By including or configuring the communications manager 1620 in accordance with examples as described herein, the device 1605 may support techniques for improved communication reliability, reduced latency, improved user experience related to reduced processing, higher throughput, more efficient utilization of communication resources, improved coordination between devices, and improved utilization and coordination of full-duplexing device capabilities.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of configuration common signaling for full duplex operation as described herein, or the processor 1640 and the memory 1630 may be otherwise configured to perform or support such operations.

Figure 17:
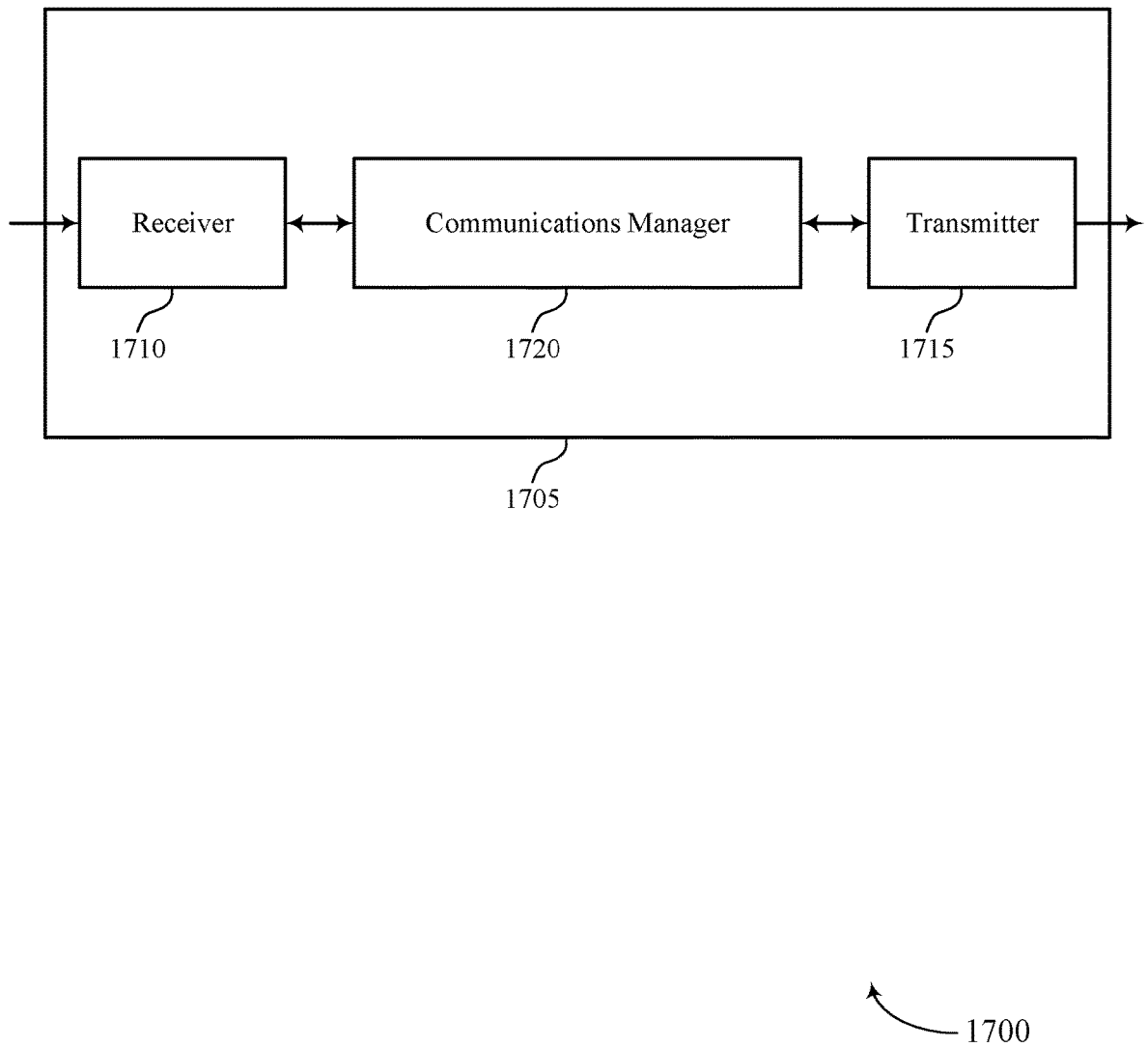
FIGS. 17 and 18 show block diagrams of devices that support configuration common signaling for full duplex operation in accordance with aspects of the present disclosure.

FIG. 17 shows a block diagram 1700 of a device 1705 that supports configuration common signaling for full duplex operation in accordance with aspects of the present disclosure. The device 1705 may be an example of aspects of a UE 115 as described herein. The device 1705 may include a receiver 1710, a transmitter 1715, and a communications manager 1720. The device 1705 may also include a processor. Each of these components may be in communication with one another (e.g., via one or more buses).

The receiver 1710 may provide a means for receiving information such as packets, user data, control information, or any combination thereof associated with various information channels (e.g., control channels, data channels, information channels related to configuration common signaling for full duplex operation). Information may be passed on to other components of the device 1705. The receiver 1710 may utilize a single antenna or a set of multiple antennas.

The transmitter 1715 may provide a means for transmitting signals generated by other components of the device 1705. For example, the transmitter 1715 may transmit information such as packets, user data, control information, or any combination thereof associated with various information channels (e.g., control channels, data channels, information channels related to configuration common signaling for full duplex operation). In some examples, the transmitter 1715 may be co-located with a receiver 1710 in a transceiver module. The transmitter 1715 may utilize a single antenna or a set of multiple antennas.

The communications manager 1720, the receiver 1710, the transmitter 1715, or various combinations thereof or various components thereof may be examples of means for performing various aspects of configuration common signaling for full duplex operation as described herein. For example, the communications manager 1720, the receiver 1710, the transmitter 1715, or various combinations or components thereof may support a method for performing one or more of the functions described herein.

In some examples, the communications manager 1720, the receiver 1710, the transmitter 1715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1720, the receiver 1710, the transmitter 1715, or various combinations or components thereof may be implemented in code (e.g., as communications management software or firmware) executed by a processor. If implemented in code executed by a processor, the functions of the communications manager 1720, the receiver 1710, the transmitter 1715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1720 may be configured to perform various operations (e.g., receiving, monitoring, transmitting) using or otherwise in cooperation with the receiver 1710, the transmitter 1715, or both. For example, the communications manager 1720 may receive information from the receiver 1710, send information to the transmitter 1715, or be integrated in combination with the receiver 1710, the transmitter 1715, or both to receive information, transmit information, or perform various other operations as described herein.

The communications manager 1720 may support wireless communications at a first UE in accordance with examples as disclosed herein. For example, the communications manager 1720 may be configured as or otherwise support a means for receiving, from a base station, a control signal identifying a first common configuration information element which indicates a first slot format pattern for a first set of slots associated with the first UE, the first configuration being different from a second common configuration information element which indicates a second slot format pattern for a second set of slots associated with a second UE. The communications manager 1720 may be configured as or otherwise support a means for communicating with the base station via uplink or downlink signaling in accordance with the first common configuration information element and the first slot format pattern.

Additionally or alternatively, the communications manager 1720 may support wireless communications at a first user equipment (UE) in accordance with examples as disclosed herein. For example, the communications manager 1720 may be configured as or otherwise support a means for receiving, from a base station, a control signal identifying a first common configuration information element which indicates a first slot format pattern for a first set of slots associated with a set of full-duplex capable UE including the first UE, the first slot format pattern including one or more symbols being a full-duplex symbol. The communications manager 1720 may be configured as or otherwise support a means for communicating with the base station in accordance with the first slot format.

Additionally or alternatively, the communications manager 1720 may support wireless communications at a UE operating in a half-duplex mode in accordance with examples as disclosed herein. For example, the communications manager 1720 may be configured as or otherwise support a means for receiving, from a base station operating in a full-duplex mode, a message identifying a grouping configuration for assigning the UE to either a first group of UEs configured for transmitting uplink communications or a second group of UEs configured for receiving downlink communications. The communications manager 1720 may be configured as or otherwise support a means for joining the first group of UEs or the second group of UEs based on the grouping configuration message. The communications manager 1720 may be configured as or otherwise support a means for communicating with the base station via uplink or downlink signaling based on joining the first group of UEs or the second group of UEs.

By including or configuring the communications manager 1720 in accordance with examples as described herein, the device 1705 (e.g., a processor controlling or otherwise coupled to the receiver 1710, the transmitter 1715, the communications manager 1720, or a combination thereof) may support techniques for reduced processing, reduced power consumption, more efficient utilization of communication resources, and more efficient utilization of full-duplexing modes.

Figure 18:
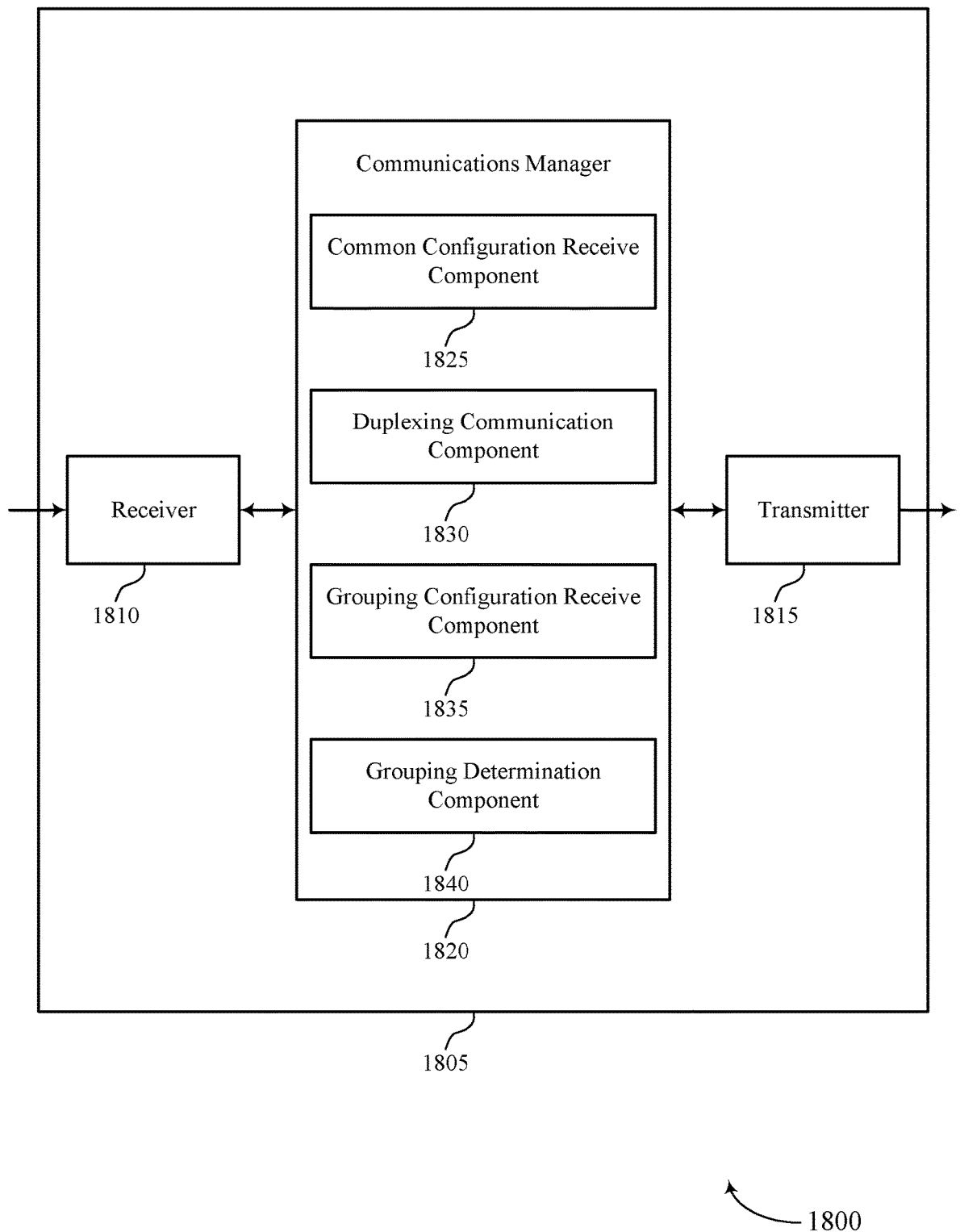

FIG. 18 shows a block diagram 1800 of a device 1805 that supports configuration common signaling for full duplex operation in accordance with aspects of the present disclosure. The device 1805 may be an example of aspects of a device 1705 or a UE 115 as described herein. The device 1805 may include a receiver 1810, a transmitter 1815, and a communications manager 1820. The device 1805 may also include a processor. Each of these components may be in communication with one another (e.g., via one or more buses).

The receiver 1810 may provide a means for receiving information such as packets, user data, control information, or any combination thereof associated with various information channels (e.g., control channels, data channels, information channels related to configuration common signaling for full duplex operation). Information may be passed on to other components of the device 1805. The receiver 1810 may utilize a single antenna or a set of multiple antennas.

The transmitter 1815 may provide a means for transmitting signals generated by other components of the device 1805. For example, the transmitter 1815 may transmit information such as packets, user data, control information, or any combination thereof associated with various information channels (e.g., control channels, data channels, information channels related to configuration common signaling for full duplex operation). In some examples, the transmitter 1815 may be co-located with a receiver 1810 in a transceiver module. The transmitter 1815 may utilize a single antenna or a set of multiple antennas.

The device 1805, or various components thereof, may be an example of means for performing various aspects of configuration common signaling for full duplex operation as described herein. For example, the communications manager 1820 may include a common configuration receive component 1825, a duplexing communication component 1830, a grouping configuration receive component 1835, a grouping determination component 1840, or any combination thereof. The communications manager 1820 may be an example of aspects of a communications manager 1720 as described herein. In some examples, the communications manager 1820, or various components thereof, may be configured to perform various operations (e.g., receiving, monitoring, transmitting) using or otherwise in cooperation with the receiver 1810, the transmitter 1815, or both. For example, the communications manager 1820 may receive information from the receiver 1810, send information to the transmitter 1815, or be integrated in combination with the receiver 1810, the transmitter 1815, or both to receive information, transmit information, or perform various other operations as described herein.

The communications manager 1820 may support wireless communications at a first UE in accordance with examples as disclosed herein. The common configuration receive component 1825 may be configured as or otherwise support a means for receiving, from a base station, a control signal identifying a first common configuration information element which indicates a first slot format pattern for a first set of slots associated with the first UE, the first configuration being different from a second common configuration information element which indicates a second slot format pattern for a second set of slots associated with a second UE. The duplexing communication component 1830 may be configured as or otherwise support a means for communicating with the base station via uplink or downlink signaling in accordance with the first common configuration information element and the first slot format pattern.

Additionally or alternatively, the communications manager 1820 may support wireless communications at a first user equipment (UE) in accordance with examples as disclosed herein. The common configuration receive component 1825 may be configured as or otherwise support a means for receiving, from a base station, a control signal identifying a first common configuration information element which indicates a first slot format pattern for a first set of slots associated with a set of full-duplex capable UE including the first UE, the first slot format pattern including one or more symbols being a full-duplex symbol. The duplexing communication component 1830 may be configured as or otherwise support a means for communicating with the base station in accordance with the first slot format.

Additionally or alternatively, the communications manager 1820 may support wireless communications at a UE operating in a half-duplex mode in accordance with examples as disclosed herein. The grouping configuration receive component 1835 may be configured as or otherwise support a means for receiving, from a base station operating in a full-duplex mode, a message identifying a grouping configuration for assigning the UE to either a first group of UEs configured for transmitting uplink communications or a second group of UEs configured for receiving downlink communications. The grouping determination component 1840 may be configured as or otherwise support a means for joining the first group of UEs or the second group of UEs based on the grouping configuration message. The duplexing communication component 1830 may be configured as or otherwise support a means for communicating with the base station via uplink or downlink signaling based on joining the first group of UEs or the second group of UEs.

Figure 19:
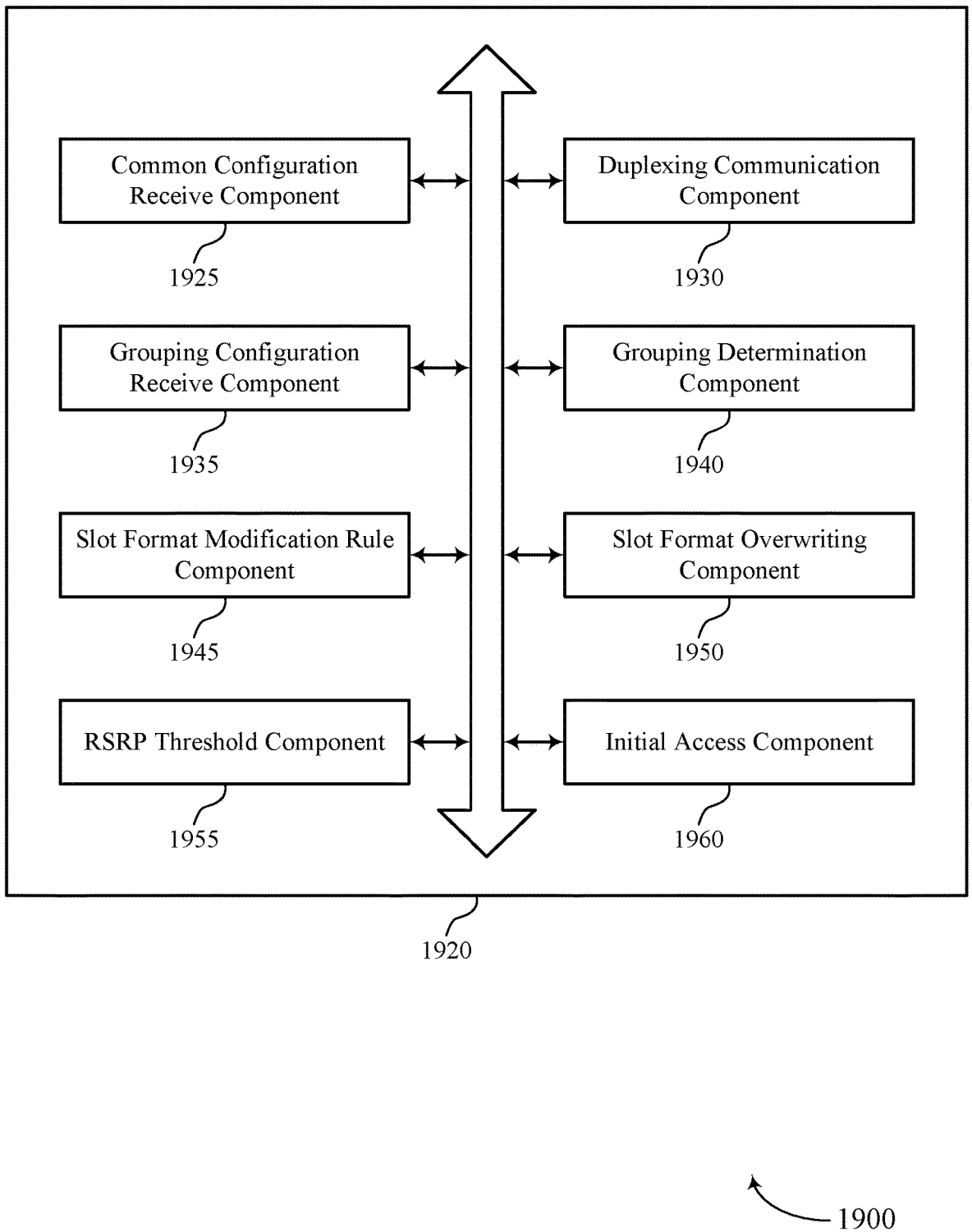
FIG. 19 shows a block diagram of a communications manager that supports configuration common signaling for full duplex operation in accordance with aspects of the present disclosure.

FIG. 19 shows a block diagram 1900 of a communications manager 1920 that supports configuration common signaling for full duplex operation in accordance with aspects of the present disclosure. The communications manager 1920 may be an example of aspects of a communications manager 1720, a communications manager 1820, or both, as described herein. The communications manager 1920, or various components thereof, may be an example of means for performing various aspects of configuration common signaling for full duplex operation as described herein. For example, the communications manager 1920 may include a common configuration receive component 1925, a duplexing communication component 1930, a grouping configuration receive component 1935, a grouping determination component 1940, a slot format modification rule component 1945, a slot format overwriting component 1950, an RSRP threshold component 1955, an initial access component 1960, or any combination thereof. Each of these components may communicate, directly or indirectly, with one another (e.g., via one or more buses).

The communications manager 1920 may support wireless communications at a first UE in accordance with examples as disclosed herein. The common configuration receive component 1925 may be configured as or otherwise support a means for receiving, from a base station, a control signal identifying a first common configuration information element which indicates a first slot format pattern for a first set of slots associated with the first UE, the first configuration being different from a second common configuration information element which indicates a second slot format pattern for a second set of slots associated with a second UE. The duplexing communication component 1930 may be configured as or otherwise support a means for communicating with the base station via uplink or downlink signaling in accordance with the first common configuration information element and the first slot format pattern.

In some examples, the control signal includes a radio resource control message indicating the first slot format pattern.

In some examples, the first UE is a half-duplex mode UE, the first slot format pattern including a number of downlink symbols, followed by a number of flexible symbols, followed by a number of uplink symbols, and the second slot format pattern including a number of uplink symbols, followed by a number of flexible symbols, followed by a number of downlink symbols.

In some examples, the base station operates in a half-duplex mode, and the first UE is a half-duplex mode UE, and the second UE is a full-duplex mode UE, the first slot format pattern including a number of downlink symbols, followed by a number of flexible symbols, followed by a number of uplink symbols and the second slot format pattern including a number of downlink symbols, followed by a number of flexible symbols, followed by a number of full-duplex symbols.

In some examples, the base station operates in a half-duplex mode, and the first UE is a half-duplex mode UE, and the second UE is a full-duplex mode UE, the first slot format pattern including a number of downlink symbols, followed by a number of flexible symbols, followed by a number of uplink symbols, and the second slot format pattern including a number of full-duplex symbols, followed by a number of flexible symbols, followed by a number of downlink symbols.

In some examples, the base station operates in a half-duplex mode, and the slot format modification rule component 1945 may be configured as or otherwise support a means for receiving, from the base station, a rule to modify the first slot format pattern for a duration spanning a range of the first set of slots, where the rule generates the second slot format pattern by replacing a number of uplink symbols, a number of flexible symbols, a number of downlink symbols, or a combination thereof of the first slot format pattern, with a corresponding number of full duplex slots.

In some examples, the slot format modification rule component 1945 may be configured as or otherwise support a means for receiving, from the base station, an indication of a slot index range assigned to the number of full duplex slots based on the rule.

In some examples, the base station includes two transmission reception points operating in a half-duplex mode, the first UE includes a half-duplex mode UE, and the second UE includes a full-duplex mode UE, the first slot format pattern including a number of downlink symbols, followed by a number of flexible symbols, followed by a number of uplink symbols, and the second slot format pattern including a number of downlink symbols, followed by a number of flexible symbols, followed by a number of full-duplex symbols.

In some examples, the base station includes two transmission reception points operating in a half-duplex mode, the first UE includes a half-duplex mode UE, and the second UE includes a full-duplex mode UE, the first slot format pattern including a number of downlink symbols, followed by a number of flexible symbols, followed by a number of uplink symbols, and the second slot format pattern including a number of full-duplex symbols, followed by a number of flexible symbols, followed by a number of uplink symbols.

Additionally or alternatively, the communications manager 1920 may support wireless communications at a first user equipment (UE) in accordance with examples as disclosed herein. In some examples, the common configuration receive component 1925 may be configured as or otherwise support a means for receiving, from a base station, a control signal identifying a first common configuration information element which indicates a first slot format pattern for a first set of slots associated with a set of full-duplex capable UE including the first UE, the first slot format pattern including one or more symbols being a full-duplex symbol. In some examples, the duplexing communication component 1930 may be configured as or otherwise support a means for communicating with the base station in accordance with the first slot format.

In some examples, the first slot format pattern includes any combination of a number of uplink symbols, a number of downlink symbols, a number of flexible symbols, and a number of full-duplex symbols.

In some examples, the first common configuration information element includes an overwriting rule, and the slot format overwriting component 1950 may be configured as or otherwise support a means for overwriting a second slot format pattern to determine the first slot format pattern, where one or more uplink symbols, downlink symbols, or flexible symbols are overwritten as one or more full duplex slots based on the overwriting rule.

In some examples, the overwriting rule further includes an indication of a slot index range to apply the overwriting rule.

In some examples, the first common configuration information element includes a cell specific configuration for a cell associated with the first set of UEs.

Additionally or alternatively, the communications manager 1920 may support wireless communications at a UE operating in a half-duplex mode in accordance with examples as disclosed herein. The grouping configuration receive component 1935 may be configured as or otherwise support a means for receiving, from a base station operating in a full-duplex mode, a message identifying a grouping configuration for assigning the UE to either a first group of UEs configured for transmitting uplink communications or a second group of UEs configured for receiving downlink communications. The grouping determination component 1940 may be configured as or otherwise support a means for joining the first group of UEs or the second group of UEs based on the grouping configuration message. In some examples, the duplexing communication component 1930 may be configured as or otherwise support a means for communicating with the base station via uplink or downlink signaling based on joining the first group of UEs or the second group of UEs.

In some examples, the grouping determination component 1940 may be configured as or otherwise support a means for determining whether to join the first group of UEs or the second group of UEs based on a global identifier associated with the UE.

In some examples, the grouping determination component 1940 may be configured as or otherwise support a means for determining whether to join the first group of UEs or the second group of UEs based on a random selection of the first group of UEs or the second group of UEs.

In some examples, the RSRP threshold component 1955 may be configured as or otherwise support a means for receiving, from the base station, a reference signal receive power (RSRP) threshold value. In some examples, the grouping determination component 1940 may be configured as or otherwise support a means for determining whether to join to first group of UEs or the second group of UEs based on a RSRP measurement at the UE.

In some examples, the first group of UEs are associated with RSRP values which exceed a threshold RSRP value, and the second group of UEs are associated with RSRP values which are less than the threshold RSRP value.

In some examples, the grouping configuration message includes an indication of one or more synchronization signal blocks for reception by the first group of UEs, and the initial access component 1960 may be configured as or otherwise support a means for receiving, from the base station, the first set of synchronization signal blocks associated the first set of UEs and a second set of synchronization signal blocks associated with the second set of UEs, where the first set of synchronization signal blocks and the second set of synchronization signal blocks are used for an initial access procedure during respective first and second time resources.

In some examples, the grouping configuration message includes an indication of a first set of random access channel occasions configured for the first group of UEs and a second set of random access channel occasions configured for the second group of UEs, and the initial access component 1960 may be configured as or otherwise support a means for performing an initial access procedure with the base station using a random access channel occasion of the first set of random access channel occasions or a random access channel occasion of the second set of random access channel occasions based on joining the first group of UEs or the second group of UEs, where the first set of random access channel occasions are associated with a first time resource and the second set of random access channel occasions are associated with a second time resource.

In some examples, the grouping configuration receive component 1935 may be configured as or otherwise support a means for receiving a control message which indicates an update to apply to the grouping configuration. In some examples, the grouping determination component 1940 may be configured as or otherwise support a means for updating the grouping configuration based on the received control message.

In some examples, the control message includes a downlink control information message, and the grouping determination component 1940 may be configured as or otherwise support a means for receiving the downlink control information message from the base station, the downlink control information including a radio network temporary identifier associated with the first group of UEs or the second group of UEs.

In some examples, the grouping configuration receive component 1935 may be configured as or otherwise support a means for receiving the control message based on a location change of the UE, a beam change at the UE, one or more signal quality measurements at the UE, or any combination thereof.

In some examples, the control message includes a downlink control information message or a medium access control-control element.

Figure 20:
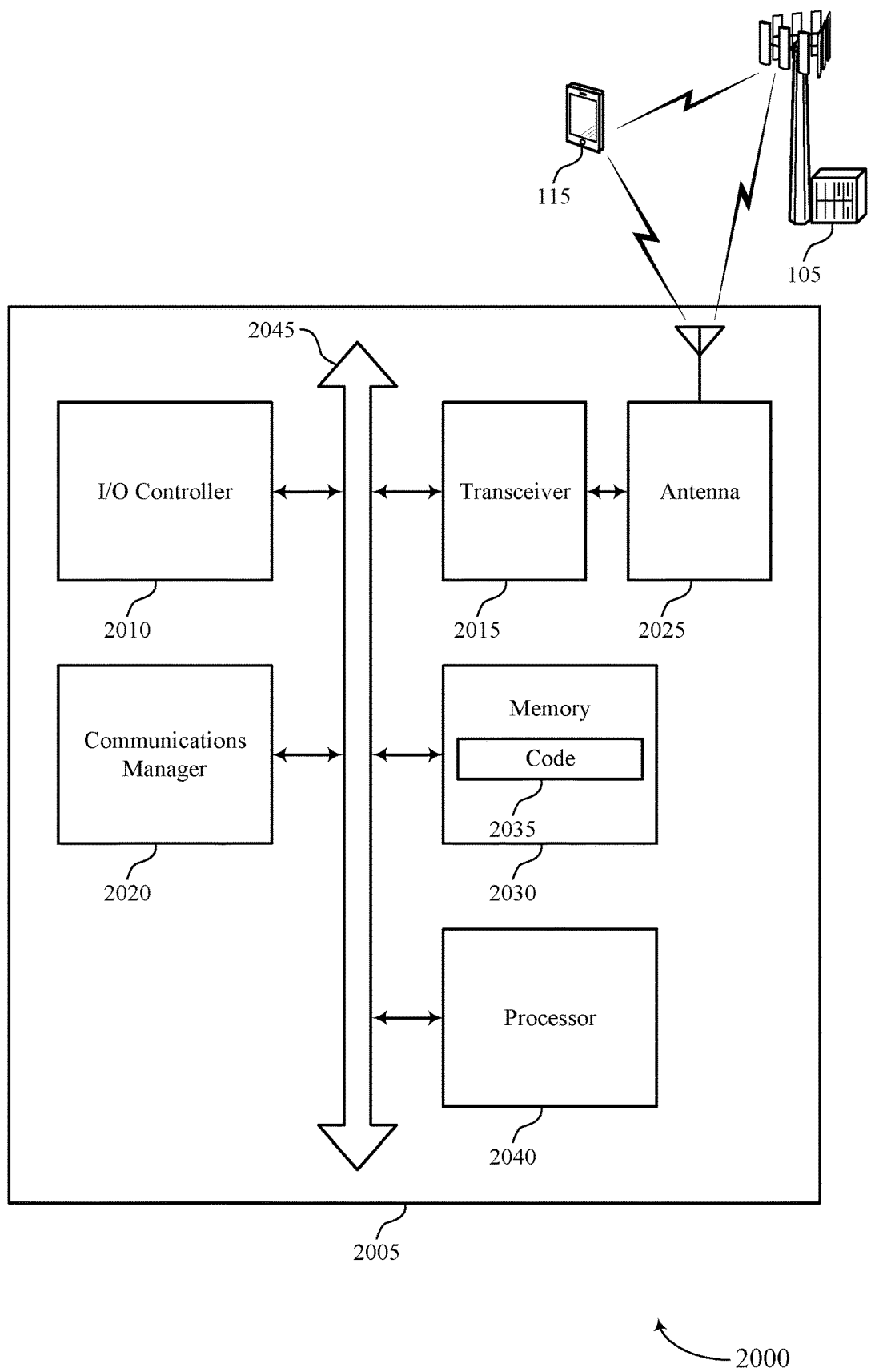
FIG. 20 shows a diagram of a system including a device that supports configuration common signaling for full duplex operation in accordance with aspects of the present disclosure.

FIG. 20 shows a diagram of a system 2000 including a device 2005 that supports configuration common signaling for full duplex operation in accordance with aspects of the present disclosure. The device 2005 may be an example of or include the components of a device 1705, a device 1805, or a UE 115 as described herein. The device 2005 may communicate wirelessly with one or more base stations 105, UEs 115, or any combination thereof. The device 2005 may include components for bi-directional voice and data communications including components for transmitting and receiving communications, such as a communications manager 2020, an input/output (I/O) controller 2010, a transceiver 2015, an antenna 2025, a memory 2030, code 2035, and a processor 2040. These components may be in electronic communication or otherwise coupled (e.g., operatively, communicatively, functionally, electronically, electrically) via one or more buses (e.g., a bus 2045).

The I/O controller 2010 may manage input and output signals for the device 2005. The I/O controller 2010 may also manage peripherals not integrated into the device 2005. In some cases, the I/O controller 2010 may represent a physical connection or port to an external peripheral. In some cases, the I/O controller 2010 may utilize an operating system such as iOS®, ANDROID®, MS-DOS®, MS-WINDOWS®, OS/2®, UNIX®, LINUX®, or another known operating system. Additionally or alternatively, the I/O controller 2010 may represent or interact with a modem, a keyboard, a mouse, a touchscreen, or a similar device. In some cases, the I/O controller 2010 may be implemented as part of a processor, such as the processor 2040. In some cases, a user may interact with the device 2005 via the I/O controller 2010 or via hardware components controlled by the I/O controller 2010.

In some cases, the device 2005 may include a single antenna 2025. However, in some other cases, the device 2005 may have more than one antenna 2025, which may be capable of concurrently transmitting or receiving multiple wireless transmissions. The transceiver 2015 may communicate bi-directionally, via the one or more antennas 2025, wired, or wireless links as described herein. For example, the transceiver 2015 may represent a wireless transceiver and may communicate bi-directionally with another wireless transceiver. The transceiver 2015 may also include a modem to modulate the packets, to provide the modulated packets to one or more antennas 2025 for transmission, and to demodulate packets received from the one or more antennas 2025. The transceiver 2015, or the transceiver 2015 and one or more antennas 2025, may be an example of a transmitter

1715, a transmitter 1815, a receiver 1710, a receiver 1810, or any combination thereof or component thereof, as described herein.

The memory 2030 may include random access memory (RAM) and read-only memory (ROM). The memory 2030 may store computer-readable, computer-executable code 2035 including instructions that, when executed by the processor 2040, cause the device 2005 to perform various functions described herein. The code 2035 may be stored in a non-transitory computer-readable medium such as system memory or another type of memory. In some cases, the code 2035 may not be directly executable by the processor 2040 but may cause a computer (e.g., when compiled and executed) to perform functions described herein. In some cases, the memory 2030 may contain, among other things, a basic I/O system (BIOS) which may control basic hardware or software operation such as the interaction with peripheral components or devices.

The processor 2040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2040 may be configured to operate a memory array using a memory controller. In some other cases, a memory controller may be integrated into the processor 2040. The processor 2040 may be configured to execute computer-readable instructions stored in a memory (e.g., the memory 2030) to cause the device 2005 to perform various functions (e.g., functions or tasks supporting configuration common signaling for full duplex operation). For example, the device 2005 or a component of the device 2005 may include a processor 2040 and memory 2030 coupled to the processor 2040, the processor 2040 and memory 2030 configured to perform various functions described herein.

The communications manager 2020 may support wireless communications at a first UE in accordance with examples as disclosed herein. For example, the communications manager 2020 may be configured as or otherwise support a means for receiving, from a base station, a control signal identifying a first common configuration information element which indicates a first slot format pattern for a first set of slots associated with the first UE, the first configuration being different from a second common configuration information element which indicates a second slot format pattern for a second set of slots associated with a second UE. The communications manager 2020 may be configured as or otherwise support a means for communicating with the base station via uplink or downlink signaling in accordance with the first common configuration information element and the first slot format pattern.

Additionally or alternatively, the communications manager 2020 may support wireless communications at a first user equipment (UE) in accordance with examples as disclosed herein. For example, the communications manager 2020 may be configured as or otherwise support a means for receiving, from a base station, a control signal identifying a first common configuration information element which indicates a first slot format pattern for a first set of slots associated with a set of full-duplex capable UE including the first UE, the first slot format pattern including one or more symbols being a full-duplex symbol. The communications manager 2020 may be configured as or otherwise support a means for communicating with the base station in accordance with the first slot format.

Additionally or alternatively, the communications manager 2020 may support wireless communications at a UE operating in a half-duplex mode in accordance with examples as disclosed herein. For example, the communications manager 2020 may be configured as or otherwise support a means for receiving, from a base station operating in a full-duplex mode, a message identifying a grouping configuration for assigning the UE to either a first group of UEs configured for transmitting uplink communications or a second group of UEs configured for receiving downlink communications. The communications manager 2020 may be configured as or otherwise support a means for joining the first group of UEs or the second group of UEs based on the grouping configuration message. The communications manager 2020 may be configured as or otherwise support a means for communicating with the base station via uplink or downlink signaling based on joining the first group of UEs or the second group of UEs.

By including or configuring the communications manager 2020 in accordance with examples as described herein, the device 2005 may support techniques for improved communication reliability, reduced latency, improved user experience related to reduced processing, higher throughput, more efficient utilization of communication resources, improved coordination between devices, and improved utilization and coordination of full-duplexing device capabilities.

In some examples, the communications manager 2020 may be configured to perform various operations (e.g., receiving, monitoring, transmitting) using or otherwise in cooperation with the transceiver 2015, the one or more antennas 2025, or any combination thereof. Although the communications manager 2020 is illustrated as a separate component, in some examples, one or more functions described with reference to the communications manager 2020 may be supported by or performed by the processor 2040, the memory 2030, the code 2035, or any combination thereof. For example, the code 2035 may include instructions executable by the processor 2040 to cause the device 2005 to perform various aspects of configuration common signaling for full duplex operation as described herein, or the processor 2040 and the memory 2030 may be otherwise configured to perform or support such operations.

Figure 21:
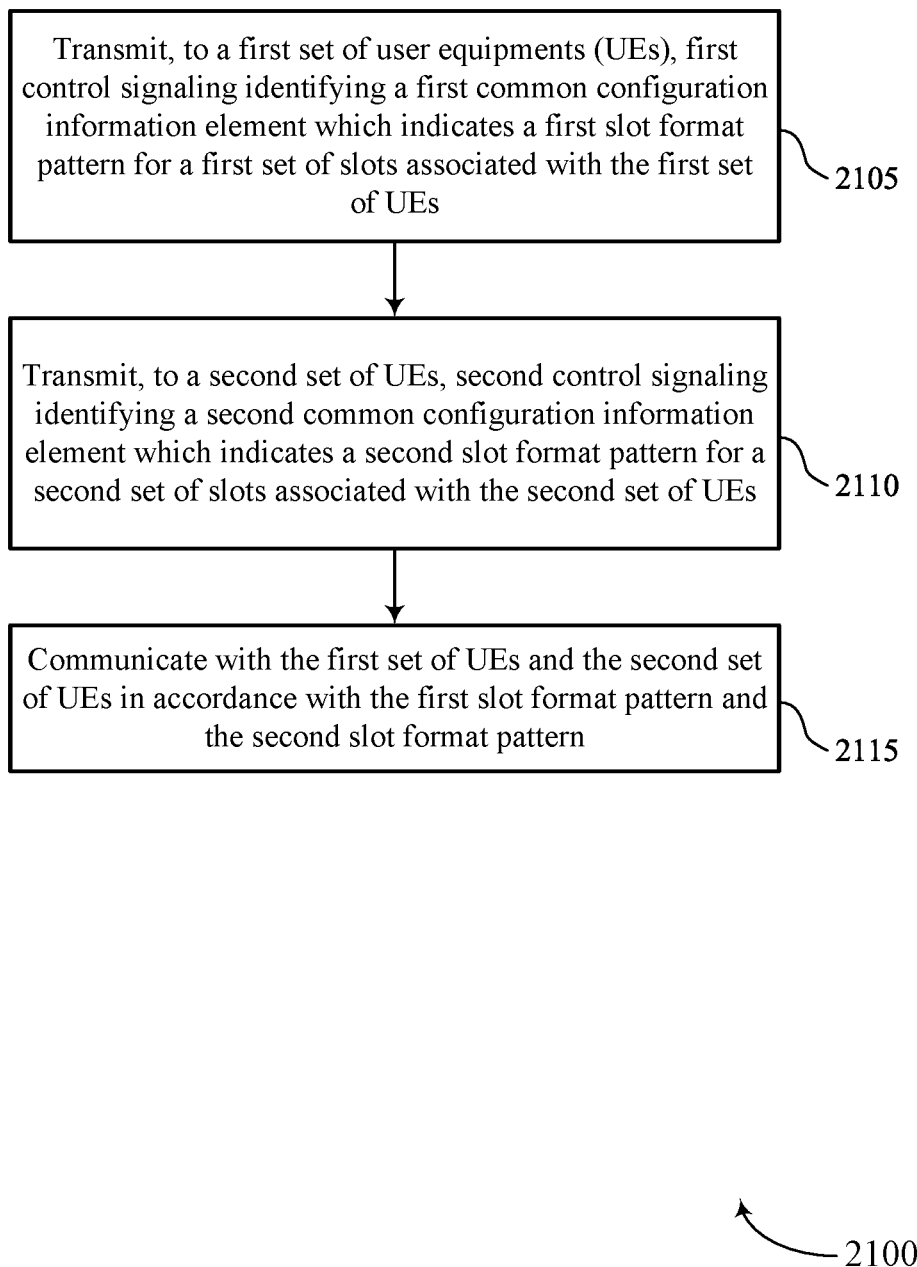
FIGS. 21 through 26 show flowcharts illustrating methods that support configuration common signaling for full duplex operation in accordance with aspects of the present disclosure.

FIG. 21 shows a flowchart illustrating a method 2100 that supports configuration common signaling for full duplex operation in accordance with aspects of the present disclosure. The operations of the method 2100 may be implemented by a base station or its components as described herein. For example, the operations of the method 2100 may be performed by a base station 105 as described with reference to FIGS. 1 through 16. In some examples, a base station may execute a set of instructions to control the functional elements of the base station to perform the described functions. Additionally or alternatively, the base station may perform aspects of the described functions using special-purpose hardware.

At 2105, the method may include transmitting, to a first set of user equipments (UEs), first control signaling identifying a first common configuration information element which indicates a first slot format pattern for a first set of slots associated with the first set of UEs. The operations of 2105 may be performed in accordance with examples as disclosed herein. In some examples, aspects of the operations of 2105 may be performed by a common configuration signaling component 1525 as described with reference to FIG. 15.

At 2110, the method may include transmitting, to a second set of UEs, second control signaling identifying a second common configuration information element which indicates a second slot format pattern for a second set of slots associated with the second set of UEs. The operations of 2110 may be performed in accordance with examples as disclosed herein. In some examples, aspects of the operations of 2110 may be performed by a common configuration signaling component 1525 as described with reference to FIG. 15.

At 2115, the method may include communicating with the first set of UEs and the second set of UEs in accordance with the first slot format pattern and the second slot format pattern. The operations of 2115 may be performed in accordance with examples as disclosed herein. In some examples, aspects of the operations of 2115 may be performed by a duplexing communication component 1530 as described with reference to FIG. 15.

Figure 22:
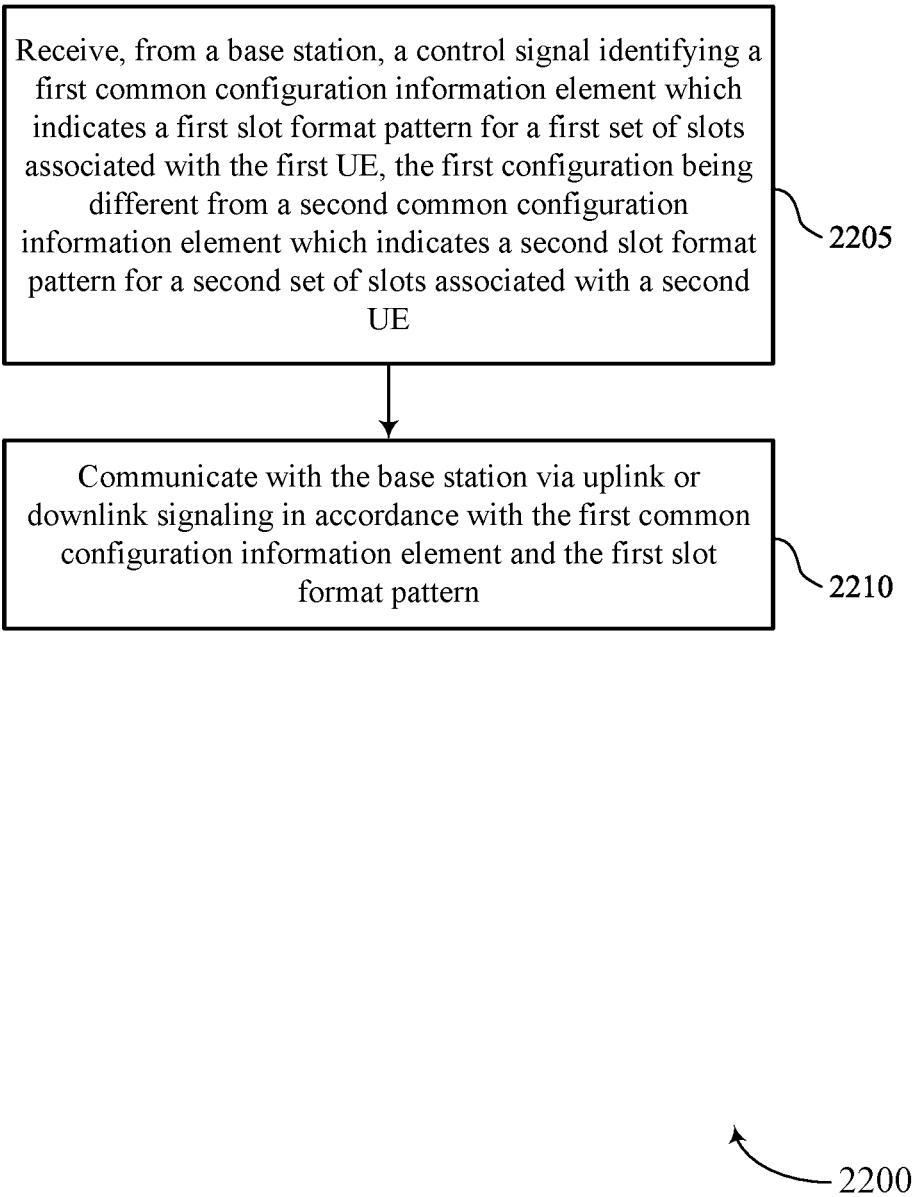

FIG. 22 shows a flowchart illustrating a method 2200 that supports configuration common signaling for full duplex operation in accordance with aspects of the present disclosure. The operations of the method 2200 may be implemented by a UE or its components as described herein. For example, the operations of the method 2200 may be performed by a UE 115 as described with reference to FIGS. 1 through 12 and 17 through 20. In some examples, a UE may execute a set of instructions to control the functional elements of the UE to perform the described functions. Additionally or alternatively, the UE may perform aspects of the described functions using special-purpose hardware.

At 2205, the method may include receiving, from a base station, a control signal identifying a first common configuration information element which indicates a first slot format pattern for a first set of slots associated with the first UE, the first configuration being different from a second common configuration information element which indicates a second slot format pattern for a second set of slots associated with a second UE. The operations of 2205 may be performed in accordance with examples as disclosed herein. In some examples, aspects of the operations of 2205 may be performed by a common configuration receive component 1925 as described with reference to FIG. 19.

At 2210, the method may include communicating with the base station via uplink or downlink signaling in accordance with the first common configuration information element and the first slot format pattern. The operations of 2210 may be performed in accordance with examples as disclosed herein. In some examples, aspects of the operations of 2210 may be performed by a duplexing communication component 1930 as described with reference to FIG. 19.

Figure 23:
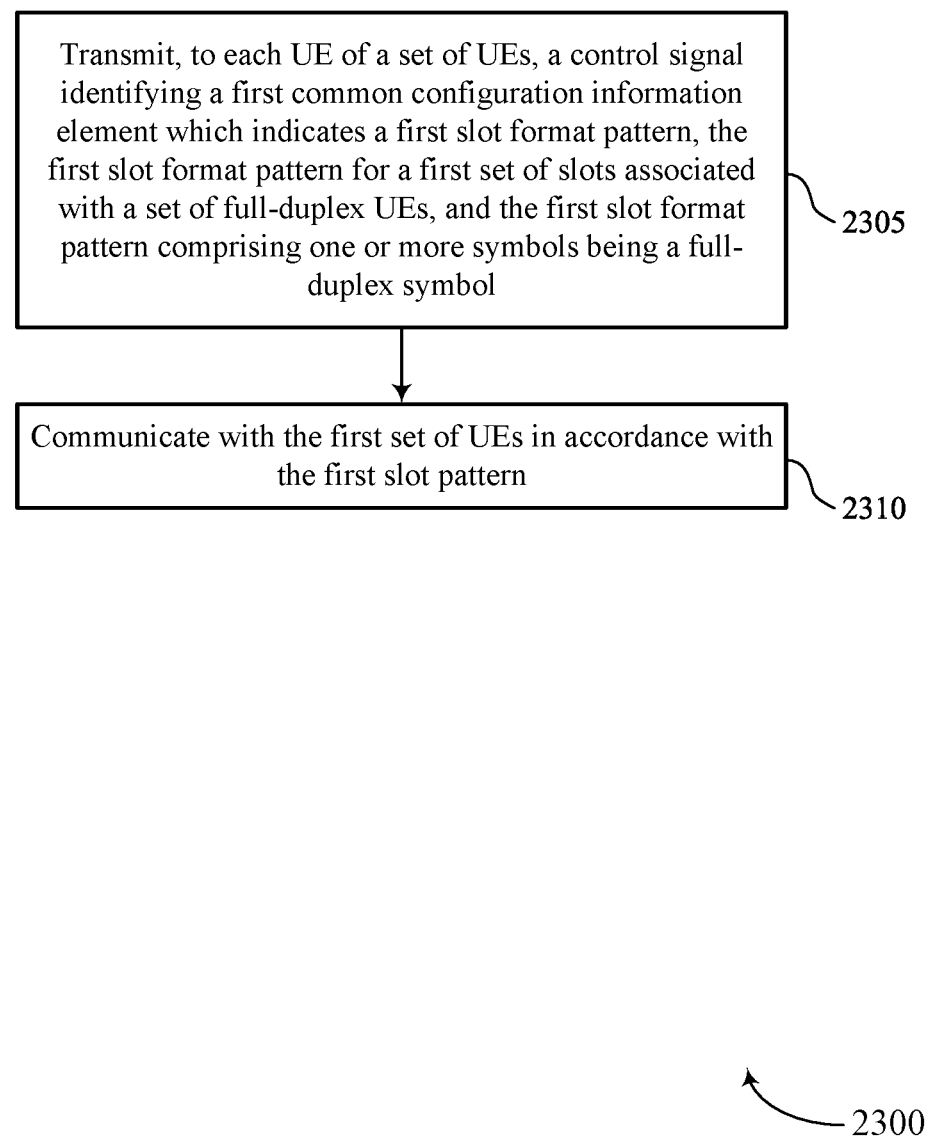

FIG. 23 shows a flowchart illustrating a method 2300 that supports configuration common signaling for full duplex operation in accordance with aspects of the present disclosure. The operations of the method 2300 may be implemented by a base station or its components as described herein. For example, the operations of the method 2300 may be performed by a base station 105 as described with reference to FIGS. 1 through 16. In some examples, a base station may execute a set of instructions to control the functional elements of the base station to perform the described functions. Additionally or alternatively, the base station may perform aspects of the described functions using special-purpose hardware.

At 2305, the method may include transmitting, to each UE of a set of UEs, a control signal identifying a first common configuration information element which indicates a first slot format pattern, the first slot format pattern for a first set of slots associated with a set of full-duplex UEs, and the first slot format pattern including one or more symbols being a full-duplex symbol. The operations of 2305 may be performed in accordance with examples as disclosed herein. In some examples, aspects of the operations of 2305 may be performed by a common configuration signaling component 1525 as described with reference to FIG. 15.

At 2310, the method may include communicating with the first set of UEs in accordance with the first slot pattern. The operations of 2310 may be performed in accordance with examples as disclosed herein. In some examples, aspects of the operations of 2310 may be performed by a duplexing communication component 1530 as described with reference to FIG. 15.

Figure 24:
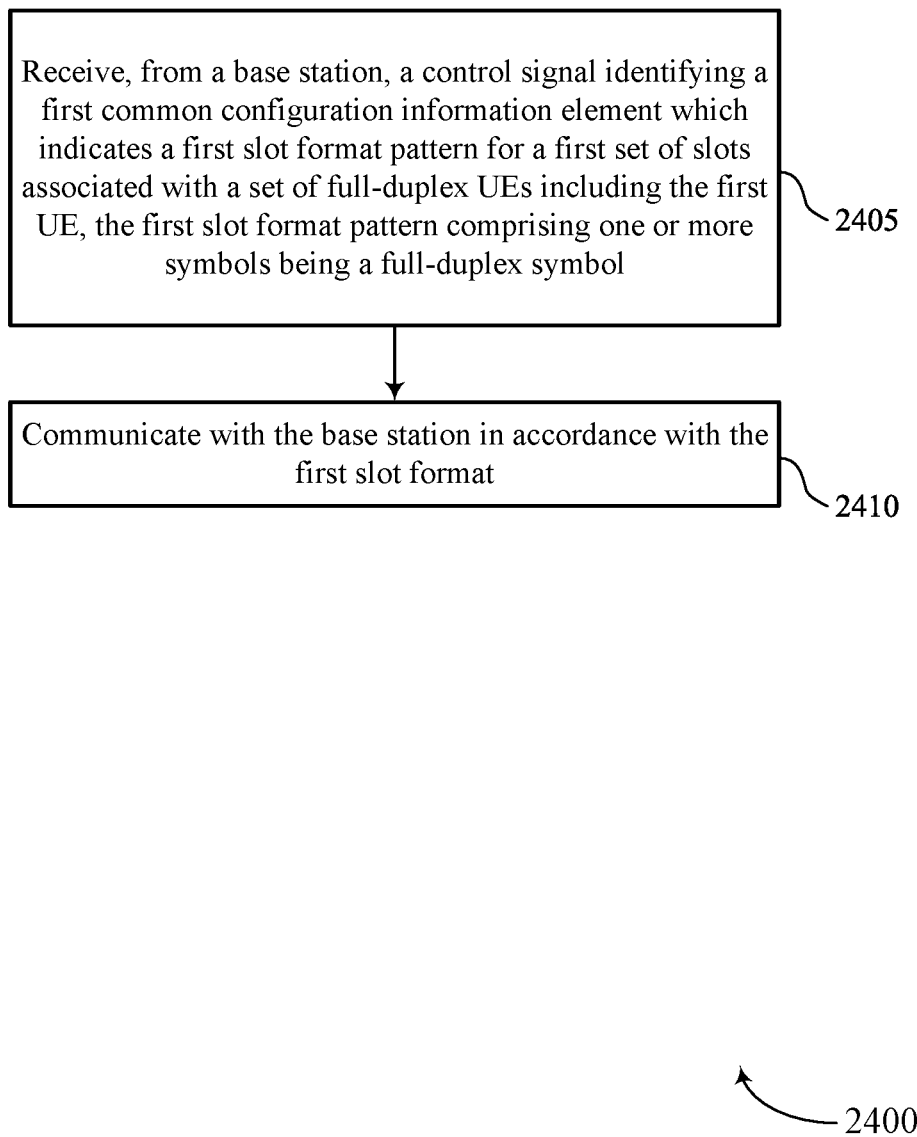

FIG. 24 shows a flowchart illustrating a method 2400 that supports configuration common signaling for full duplex operation in accordance with aspects of the present disclosure. The operations of the method 2400 may be implemented by a UE or its components as described herein. For example, the operations of the method 2400 may be performed by a UE 115 as described with reference to FIGS. 1 through 12 and 17 through 20. In some examples, a UE may execute a set of instructions to control the functional elements of the UE to perform the described functions. Additionally or alternatively, the UE may perform aspects of the described functions using special-purpose hardware.

At 2405, the method may include receiving, from a base station, a control signal identifying a first common configuration information element which indicates a first slot format pattern for a first set of slots associated with a set of full-duplex capable UE including the first UE, the first slot format pattern including one or more symbols being a full-duplex symbol. The operations of 2405 may be performed in accordance with examples as disclosed herein. In some examples, aspects of the operations of 2405 may be performed by a common configuration receive component 1925 as described with reference to FIG. 19.

At 2410, the method may include communicating with the base station in accordance with the first slot format. The operations of 2410 may be performed in accordance with examples as disclosed herein. In some examples, aspects of the operations of 2410 may be performed by a duplexing communication component 1930 as described with reference to FIG. 19.

Figure 25:
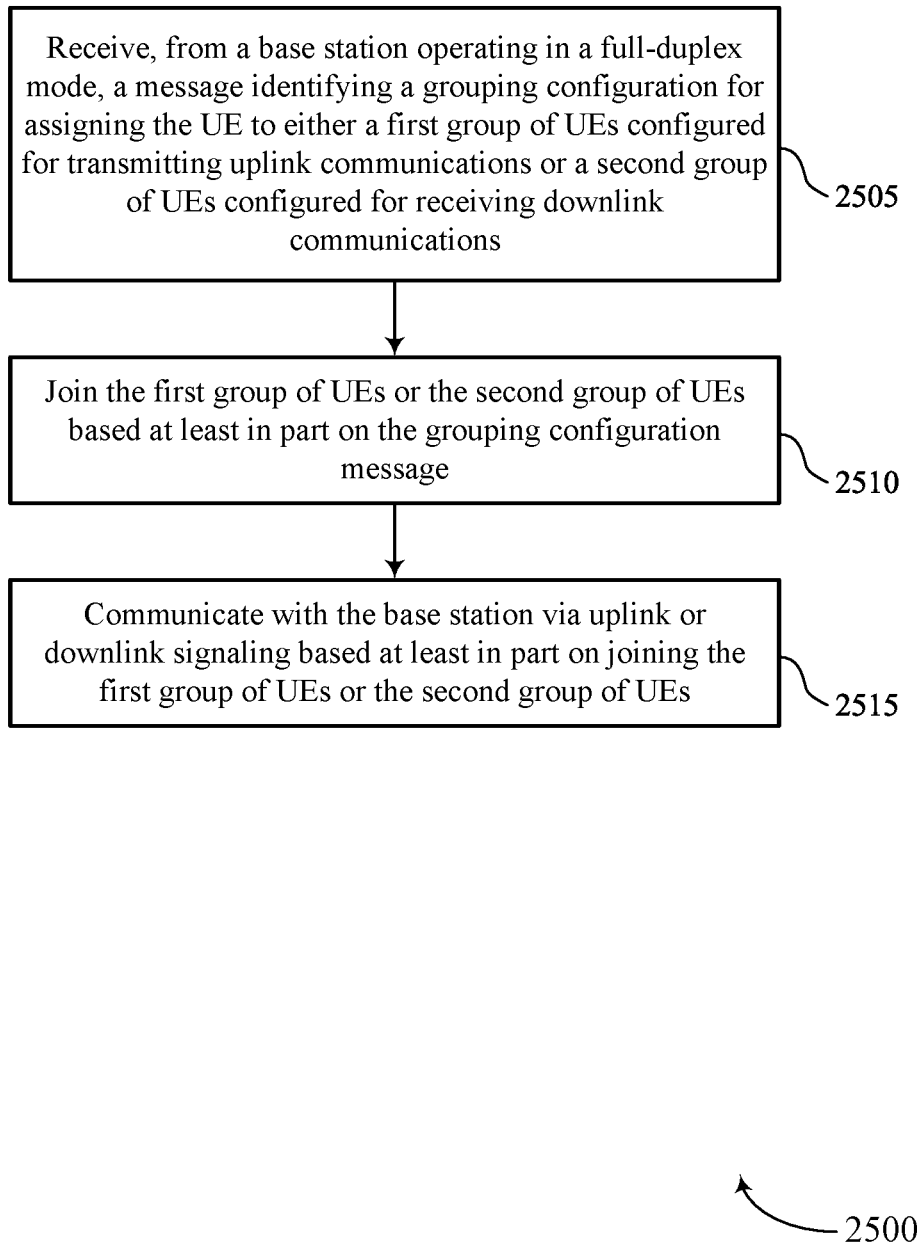

FIG. 25 shows a flowchart illustrating a method 2500 that supports configuration common signaling for full duplex operation in accordance with aspects of the present disclosure. The operations of the method 2500 may be implemented by a UE or its components as described herein. For example, the operations of the method 2500 may be performed by a UE 115 as described with reference to FIGS. 1 through 12 and 17 through 20. In some examples, a UE may execute a set of instructions to control the functional elements of the UE to perform the described functions. Additionally or alternatively, the UE may perform aspects of the described functions using special-purpose hardware.

At 2505, the method may include receiving, from a base station operating in a full-duplex mode, a message identifying a grouping configuration for assigning the UE to either a first group of UEs configured for transmitting uplink communications or a second group of UEs configured for receiving downlink communications. The operations of 2505 may be performed in accordance with examples as disclosed herein. In some examples, aspects of the operations of 2505 may be performed by a grouping configuration receive component 1935 as described with reference to FIG. 19.

At 2510, the method may include joining the first group of UEs or the second group of UEs based on the grouping configuration message. The operations of 2510 may be performed in accordance with examples as disclosed herein.

In some examples, aspects of the operations of 2510 may be performed by a grouping determination component 1940 as described with reference to FIG. 19.

At 2515, the method may include communicating with the base station via uplink or downlink signaling based on joining the first group of UEs or the second group of UEs. The operations of 2515 may be performed in accordance with examples as disclosed herein. In some examples, aspects of the operations of 2515 may be performed by a duplexing communication component 1930 as described with reference to FIG. 19.

Figure 26:
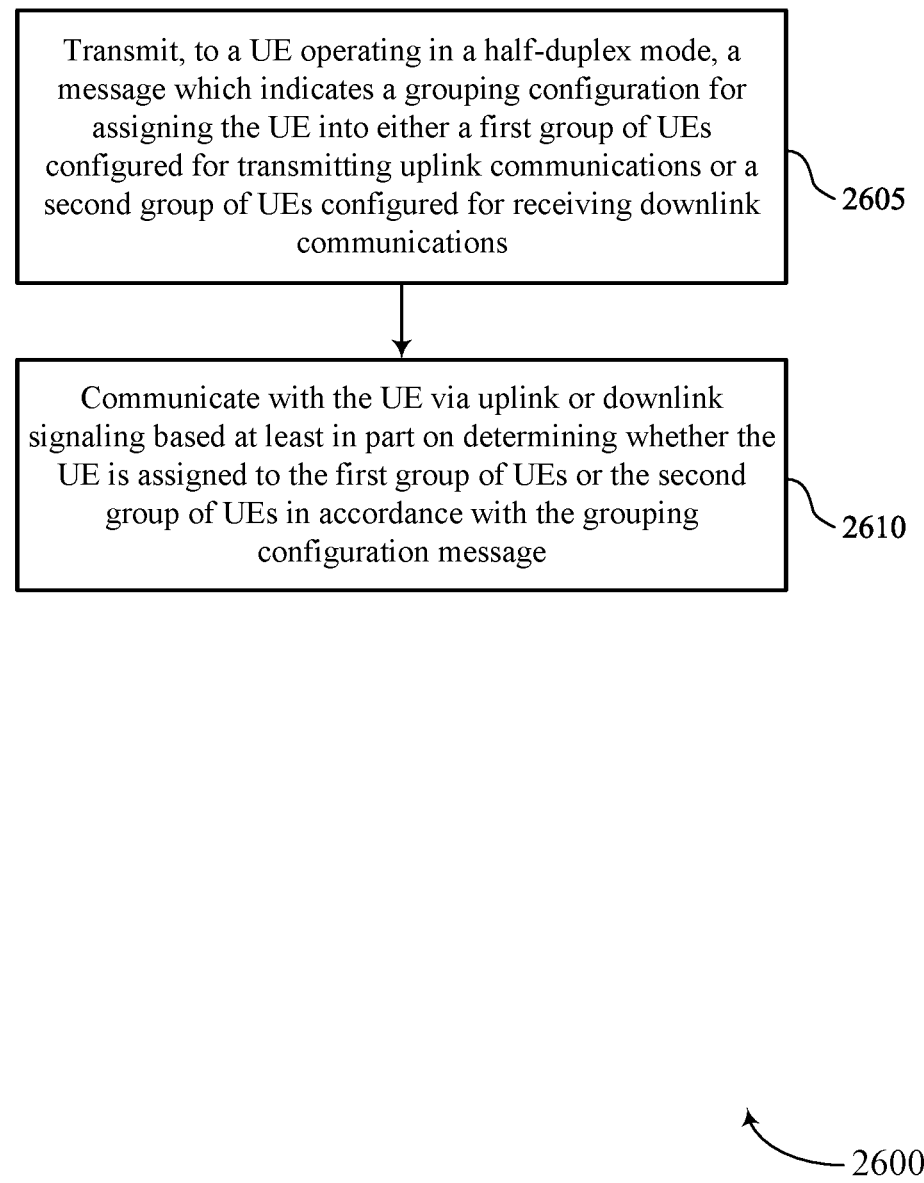

FIG. 26 shows a flowchart illustrating a method 2600 that supports configuration common signaling for full duplex operation in accordance with aspects of the present disclosure. The operations of the method 2600 may be implemented by a base station or its components as described herein. For example, the operations of the method 2600 may be performed by a base station 105 as described with reference to FIGS. 1 through 16. In some examples, a base station may execute a set of instructions to control the functional elements of the base station to perform the described functions. Additionally or alternatively, the base station may perform aspects of the described functions using special-purpose hardware.

At 2605, the method may include transmitting, to a UE operating in a half-duplex mode, a message which indicates a grouping configuration for assigning the UE into either a first group of UEs configured for transmitting uplink communications or a second group of UEs configured for receiving downlink communications. The operations of 2605 may be performed in accordance with examples as disclosed herein. In some examples, aspects of the operations of 2605 may be performed by a grouping configuration transmission component 1535 as described with reference to FIG. 15.

At 2610, the method may include communicating with the UE via uplink or downlink signaling based on determining whether the UE is assigned to the first group of UEs or the second group of UEs in accordance with the grouping configuration message. The operations of 2610 may be performed in accordance with examples as disclosed herein. In some examples, aspects of the operations of 2610 may be performed by a duplexing communication component 1530 as described with reference to FIG. 15.

The following provides an overview of aspects of the present disclosure:

Aspect 1: A method for wireless communications at a base station, comprising: transmitting, to a first set of user equipments (UEs), first control signaling identifying a first common configuration information element which indicates a first slot format pattern for a first set of slots associated with the first set of UEs; transmitting, to a second set of UEs, second control signaling identifying a second common configuration information element which indicates a second slot format pattern for a second set of slots associated with the second set of UEs; and communicating with the first set of UEs and the second set of UEs in accordance with the first slot format pattern and the second slot format pattern.

Aspect 2: The method of aspect 1, wherein the first control signaling comprises a first radio resource control message and the second control signaling comprises a second radio resource control message, the first and second radio resource control messages indicating the respective first and second slot format patterns.

Aspect 3: The method of any of aspects 1 through 2, wherein the first set of UEs and the second set of UEs comprise half-duplex mode UEs, the method further comprising: configuring the first slot format pattern as a number of downlink symbols, followed by a number of flexible symbols, followed by a number of uplink symbols; and configuring the second slot format pattern as a number of uplink symbols, followed by a number of flexible symbols, followed by a number of downlink symbols.

Aspect 4: The method of any of aspects 1 through 3, further comprising: overwriting the first slot format pattern, the overwriting spanning a range of the first set of slots, wherein respective uplink symbols of the first slot format pattern correspond to downlink symbols of the second slot format pattern, and respective downlink symbols of the first slot format pattern correspond to uplink symbols of the second slot format pattern.

Aspect 5: The method of any of aspects 1 through 4, wherein the base station operates in a half-duplex mode, the first set of UEs comprise half-duplex mode UEs, and the second set of UEs comprise full-duplex mode UEs, the method further comprising: configuring the first slot format pattern as a number of downlink symbols, followed by a number of flexible symbols, followed by a number of uplink symbols; and configuring the second slot format pattern as a number of downlink symbols, followed by a number of flexible symbols, followed by a number of full-duplex symbols.

Aspect 6: The method of any of aspects 1 through 5, wherein the base station comprises two transmission reception points operating in a half-duplex mode, the first set of UEs comprise half-duplex mode UEs, and the second set of UEs comprise full-duplex mode UEs, the method further comprising: configuring the first slot format pattern as a number of downlink symbols, followed by a number of flexible symbols, followed by a number of uplink symbols; and configuring the second slot format pattern as a number of full-duplex symbols, followed by a number of flexible symbols, followed by a number of downlink symbols.

Aspect 7: The method of any of aspects 1 through 6, wherein the base station comprises two transmission reception points operating in a half-duplex mode, the first set of UEs comprise half-duplex mode UEs, and the second set of UEs comprise full-duplex mode UEs, the method further comprising: determining a rule to modify the first slot format pattern, wherein the rule generates the second slot format pattern by replacing a number of uplink symbols, a number of flexible symbols, a number of downlink symbols, or a combination thereof of the first slot format pattern, with a corresponding number of full duplex slots; and transmitting, via the second control signaling, the determined rule to the second set of UEs.

Aspect 8: The method of aspect 7, further comprising: transmitting an indication of a slot index range assigned to the number of full duplex slots based at least in part on the rule.

Aspect 9: The method of any of aspects 1 through 8, wherein the base station operates in a full-duplex mode, the first set of UEs comprise half-duplex mode UEs, and the second set of UEs comprise full-duplex mode UEs, the method further comprising: configuring the first slot format pattern as a number of downlink symbols, followed by a number of flexible symbols, followed by a number of uplink symbols; and configuring the second slot format pattern as a number of downlink symbols, followed by a number of flexible symbols, followed by a number of full-duplex symbols.

Aspect 10: The method of any of aspects 1 through 9, wherein the base station operates in a full-duplex mode, the first set of UEs comprise half-duplex mode UEs, and the second set of UEs comprise full-duplex mode UEs, the method further comprising: configuring the first slot format pattern as a number of downlink symbols, followed by a number of flexible symbols, followed by a number of uplink symbols; and configuring the second slot format pattern as a number of full-duplex symbols, followed by a number of flexible symbols, followed by a number of uplink symbols.

Aspect 11: A method for wireless communications at a first UE, comprising: receiving, from a base station, a control signal identifying a first common configuration information element which indicates a first slot format pattern for a first set of slots associated with the first UE, the first configuration being different from a second common configuration information element which indicates a second slot format pattern for a second set of slots associated with a second UE; and communicating with the base station via uplink or downlink signaling in accordance with the first common configuration information element and the first slot format pattern.

Aspect 12: The method of aspect 11, wherein the control signal comprises a radio resource control message indicating the first slot format pattern.

Aspect 13: The method of any of aspects 11 through 12, wherein the first UE is a half-duplex mode UE, the first slot format pattern comprising a number of downlink symbols, followed by a number of flexible symbols, followed by a number of uplink symbols, and the second slot format pattern comprising a number of uplink symbols, followed by a number of flexible symbols, followed by a number of downlink symbols.

Aspect 14: The method of any of aspects 11 through 13, wherein the base station operates in a half-duplex mode, and the first UE is a half-duplex mode UE, and the second UE is a full-duplex mode UE, the first slot format pattern comprising a number of downlink symbols, followed by a number of flexible symbols, followed by a number of uplink symbols and the second slot format pattern comprising a number of downlink symbols, followed by a number of flexible symbols, followed by a number of full-duplex symbols.

Aspect 15: The method of any of aspects 11 through 14, wherein the base station operates in a half-duplex mode, and the first UE is a half-duplex mode UE, and the second UE is a full-duplex mode UE, the first slot format pattern comprising a number of downlink symbols, followed by a number of flexible symbols, followed by a number of uplink symbols, and the second slot format pattern comprising a number of full-duplex symbols, followed by a number of flexible symbols, followed by a number of downlink symbols.

Aspect 16: The method of any of aspects 11 through 15, wherein the base station operates in a half-duplex mode, the first UE is a half-duplex mode UE, and the second UE is a full-duplex mode UE, the method further comprising: receiving, from the base station, a rule to modify the first slot format pattern for a duration spanning a range of the first set of slots, wherein the rule generates the second slot format pattern by replacing a number of uplink symbols, a number of flexible symbols, a number of downlink symbols, or a combination thereof of the first slot format pattern, with a corresponding number of full duplex slots.

Aspect 17: The method of aspect 16, further comprising: receiving, from the base station, an indication of a slot index range assigned to the number of full duplex slots based at least in part on the rule.

Aspect 18: The method of any of aspects 11 through 17, wherein the base station comprises two transmission reception points operating in a half-duplex mode, the first UE comprises a half-duplex mode UE, and the second UE comprises a full-duplex mode UE, the first slot format pattern comprising a number of downlink symbols, followed by a number of flexible symbols, followed by a number of uplink symbols, and the second slot format pattern comprising a number of downlink symbols, followed by a number of flexible symbols, followed by a number of full-duplex symbols.

Aspect 19: The method of any of aspects 11 through 18, wherein the base station comprises two transmission reception points operating in a half-duplex mode, the first UE comprises a half-duplex mode UE, and the second UE comprises a full-duplex mode UE, the first slot format pattern comprising a number of downlink symbols, followed by a number of flexible symbols, followed by a number of uplink symbols, and the second slot format pattern comprising a number of full-duplex symbols, followed by a number of flexible symbols, followed by a number of uplink symbols.

Aspect 20: A method for wireless communications at a base station, comprising: transmitting, to each UE of a set of UEs, a control signal identifying a first common configuration information element which indicates a first slot format pattern, the first slot format pattern for a first set of slots associated with a set of full-duplex UEs, and the first slot format pattern comprising one or more symbols being a full-duplex symbol; and communicating with the first set of UEs in accordance with the first slot pattern.

Aspect 21: The method of aspect 20, wherein the first slot format pattern comprises any combination of a number of uplink symbols, a number of downlink symbols, a number of flexible symbols, and a number of full-duplex symbols.

Aspect 22: The method of any of aspects 20 through 21, wherein the first common configuration information element comprises an overwriting rule, the method further comprising: overwriting a second slot format pattern to determine the first slot format pattern, wherein one or more uplink symbols, downlink symbols, or flexible symbols are overwritten as one or more full duplex slots based at least in part on the overwriting rule.

Aspect 23: The method of aspect 22, wherein the overwriting rule further comprises an indication of a slot index range to apply the overwriting rule.

Aspect 24: The method of any of aspects 20 through 23, wherein the first common configuration information element is a cell specific configuration for a cell associated with the first set of UEs.

Aspect 25: A method for wireless communications at a first UE, comprising: receiving, from a base station, a control signal identifying a first common configuration information element which indicates a first slot format pattern for a first set of slots associated with a set of full-duplex capable UE including the first UE, the first slot format pattern comprising one or more symbols being a full-duplex symbol; and communicating with the base station in accordance with the first slot format.

Aspect 26: The method of aspect 25, wherein the first slot format pattern comprises any combination of a number of uplink symbols, a number of downlink symbols, a number of flexible symbols, and a number of full-duplex symbols.

Aspect 27: The method of any of aspects 25 through 26, wherein the first common configuration information element comprises an overwriting rule, the method further comprising: overwriting a second slot format pattern to determine the first slot format pattern, wherein one or more uplink symbols, downlink symbols, or flexible symbols are overwritten as one or more full duplex slots based at least in part on the overwriting rule.

Aspect 28: The method of aspect 27, wherein the overwriting rule further comprises an indication of a slot index range to apply the overwriting rule.

Aspect 29: The method of any of aspects 25 through 28, wherein the first common configuration information element includes a cell specific configuration for a cell associated with the first set of UEs.

Aspect 30: A method for wireless communications at a UE operating in a half-duplex mode, comprising: receiving, from a base station operating in a full-duplex mode, a message identifying a grouping configuration for assigning the UE to either a first group of UEs configured for transmitting uplink communications or a second group of UEs configured for receiving downlink communications; joining the first group of UEs or the second group of UEs based at least in part on the grouping configuration message; and communicating with the base station via uplink or downlink signaling based at least in part on joining the first group of UEs or the second group of UEs.

Aspect 31: The method of aspect 30, further comprising: determining whether to join the first group of UEs or the second group of UEs based at least in part on a global identifier associated with the UE.

Aspect 32: The method of any of aspects 30 through 31, further comprising: determining whether to join the first group of UEs or the second group of UEs based at least in part on a random selection of the first group of UEs or the second group of UEs.

Aspect 33: The method of any of aspects 30 through 32, further comprising: receiving, from the base station, a reference signal receive power (RSRP) threshold value; and determining whether to join to first group of UEs or the second group of UEs based at least in part on a RSRP measurement at the UE.

Aspect 34: The method of aspect 33, wherein the first group of UEs are associated with RSRP values which exceed a threshold RSRP value, and the second group of UEs are associated with RSRP values which are less than the threshold RSRP value.

Aspect 35: The method of any of aspects 30 through 34, wherein the grouping configuration message comprises an indication of one or more synchronization signal blocks for reception by the first group of UEs, the method further comprising: receiving, from the base station, the first set of synchronization signal blocks associated the first set of UEs and a second set of synchronization signal blocks associated with the second set of UEs, wherein the first set of synchronization signal blocks and the second set of synchronization signal blocks are used for an initial access procedure during respective first and second time resources.

Aspect 36: The method of any of aspects 30 through 35, wherein the grouping configuration message comprises an indication of a first set of random access channel occasions configured for the first group of UEs and a second set of random access channel occasions configured for the second group of UEs, the method further comprising: performing an initial access procedure with the base station using a random access channel occasion of the first set of random access channel occasions or a random access channel occasion of the second set of random access channel occasions based at least in part on joining the first group of UEs or the second group of UEs, wherein the first set of random access channel occasions are associated with a first time resource and the second set of random access channel occasions are associated with a second time resource.

Aspect 37: The method of any of aspects 30 through 36, further comprising: receiving a control message which indicates an update to apply to the grouping configuration; and updating the grouping configuration based at least in part on the received control message.

Aspect 38: The method of aspect 37, wherein the control message comprises a downlink control information message, the method further comprising: receiving the downlink control information message from the base station, the downlink control information comprising a radio network temporary identifier associated with the first group of UEs or the second group of UEs.

Aspect 39: The method of any of aspects 37 through 38, further comprising: receiving the control message based at least in part on a location change of the UE, a beam change at the UE, one or more signal quality measurements at the UE, or any combination thereof.

Aspect 40: The method of any of aspects 37 through 39, wherein the control message comprises a downlink control information message or a medium access control-control element.

Aspect 41: A method for wireless communications at a base station operating in a full-duplex mode, comprising: transmitting, to a UE operating in a half-duplex mode, a message which indicates a grouping configuration for assigning the UE into either a first group of UEs configured for transmitting uplink communications or a second group of UEs configured for receiving downlink communications; communicating with the UE via uplink or downlink signaling based at least in part on determining whether the UE is assigned to the first group of UEs or the second group of UEs in accordance with the grouping configuration message.

Aspect 42: The method of aspect 41, wherein the grouping configuration is based at least in part on a global identifier associated with the UE, and the first group of UEs comprises even identifiers and the second group of UEs comprises odd identifiers.

Aspect 43: The method of any of aspects 41 through 42, wherein the grouping configuration is based at least in part on a random selection of the first group of UEs or the second group of UEs.

Aspect 44: The method of any of aspects 41 through 43, further comprising: transmitting, to the UE, a reference signal receive power (RSRP) threshold value, wherein the grouping configuration is based at least in part on the RSRP threshold value.

Aspect 45: The method of aspect 44, wherein the first group of UEs are associated with RSRP values which exceed a threshold RSRP value, and the second group of UEs are associated with RSRP values which are less than the threshold RSRP value.

Aspect 46: The method of any of aspects 41 through 45, wherein the grouping configuration comprises an indication of one or more synchronization signal blocks for reception by the first group of UEs, the method further comprising: transmitting, to the first group of UEs, the one or more synchronization signal blocks associated with a first initial access procedure during a first time resource; and transmitting, to the second group of UEs, one or more synchronization signal blocks associated with a second initial access procedure during a second time resource.

Aspect 47: The method of any of aspects 41 through 46, the grouping configuration comprises an indication of one or more random access channel occasions configured for the second group of UEs, the method further comprising: communicating with the second group of UEs using the one or more random access channel occasions during a third time resource; and communicating with the first group of UEs using the one or more random access channel occasions during a fourth time resource.

Aspect 48: The method of any of aspects 41 through 47, further comprising: transmitting a control message which indicates an update to apply to the grouping configuration; and receiving communications from the first group of UEs, the second group of UEs, or both, based at least in part on the update to the grouping configuration.

Aspect 49: The method of aspect 48, wherein the control message comprises a downlink control information message, the method further comprising: transmitting the downlink control information message, the downlink control information comprising a radio network temporary identifier associated with the first group of UEs or the second group of UEs.

Aspect 50: The method of any of aspects 48 through 49, further comprising: transmitting the control message based at least in part on a location change of the UE, a beam change at the UE, one or more signal quality measurements at the UE, or any combination thereof.

Aspect 51: The method of any of aspects 48 through 50, wherein the control message comprises a downlink control information message or a medium access control-control element.

Aspect 52: An apparatus for wireless communications at a base station, comprising a processor; memory coupled with the processor; and instructions stored in the memory and executable by the processor to cause the apparatus to perform a method of any of aspects 1 through 10.

Aspect 53: An apparatus for wireless communications at a base station, comprising at least one means for performing a method of any of aspects 1 through 10.

Aspect 54: A non-transitory computer-readable medium storing code for wireless communications at a base station, the code comprising instructions executable by a processor to perform a method of any of aspects 1 through 10.

Aspect 55: An apparatus for wireless communications at a first UE, comprising a processor; memory coupled with the processor; and instructions stored in the memory and executable by the processor to cause the apparatus to perform a method of any of aspects 11 through 19.

Aspect 56: An apparatus for wireless communications at a first UE, comprising at least one means for performing a method of any of aspects 11 through 19.

Aspect 57: A non-transitory computer-readable medium storing code for wireless communications at a first UE, the code comprising instructions executable by a processor to perform a method of any of aspects 11 through 19.

Aspect 58: An apparatus for wireless communications at a base station, comprising a processor; memory coupled with the processor; and instructions stored in the memory and executable by the processor to cause the apparatus to perform a method of any of aspects 20 through 24.

Aspect 59: An apparatus for wireless communications at a base station, comprising at least one means for performing a method of any of aspects 20 through 24.

Aspect 60: A non-transitory computer-readable medium storing code for wireless communications at a base station, the code comprising instructions executable by a processor to perform a method of any of aspects 20 through 24.

Aspect 61: An apparatus for wireless communications at a first user equipment (UE), comprising a processor; memory coupled with the processor; and instructions stored in the memory and executable by the processor to cause the apparatus to perform a method of any of aspects 25 through 29.

Aspect 62: An apparatus for wireless communications at a first user equipment (UE), comprising at least one means for performing a method of any of aspects 25 through 29.

Aspect 63: A non-transitory computer-readable medium storing code for wireless communications at a first user equipment (UE), the code comprising instructions executable by a processor to perform a method of any of aspects 25 through 29.

Aspect 64: An apparatus for wireless communications at a UE operating in a half-duplex mode, comprising a processor; memory coupled with the processor; and instructions stored in the memory and executable by the processor to cause the apparatus to perform a method of any of aspects 30 through 40.

Aspect 65: An apparatus for wireless communications at a UE operating in a half-duplex mode, comprising at least one means for performing a method of any of aspects 30 through 40.

Aspect 66: A non-transitory computer-readable medium storing code for wireless communications at a UE operating in a half-duplex mode, the code comprising instructions executable by a processor to perform a method of any of aspects 30 through 40.

Aspect 67: An apparatus for wireless communications at a base station operating in a full-duplex mode, comprising a processor; memory coupled with the processor; and instructions stored in the memory and executable by the processor to cause the apparatus to perform a method of any of aspects 41 through 51.

Aspect 68: An apparatus for wireless communications at a base station operating in a full-duplex mode, comprising at least one means for performing a method of any of aspects 41 through 51.

Aspect 69: A non-transitory computer-readable medium storing code for wireless communications at a base station operating in a full-duplex mode, the code comprising instructions executable by a processor to perform a method of any of aspects 41 through 51.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE) operating in a half-duplex mode, comprising:
   receiving, from a network device operating in a full-duplex mode, a grouping configuration message that assigns the UE to either an uplink UE group configured for transmitting uplink communications in accordance with the half-duplex mode or a downlink UE group configured for receiving downlink communications in accordance with the half-duplex mode, wherein the grouping configuration message includes group-specific configuration parameters for the uplink UE group and the downlink UE group;
   joining the uplink UE group or the downlink UE group based at least in part on the grouping configuration message; and
   communicating with the network device via uplink signaling or downlink signaling based at least in part on joining the uplink UE group or the downlink UE group.

2. The method of claim 1, wherein joining the uplink UE group or the downlink UE group comprises:
 joining the uplink UE group or the downlink UE group based at least in part on a global identifier associated with the UE.

3. The method of claim 1, wherein joining the uplink UE group or the downlink UE group comprises:
 joining the uplink UE group or the downlink UE group based at least in part on a random selection of the uplink UE group or the downlink UE group.

4. The method of claim 1, wherein joining the uplink UE group or the downlink UE group comprises:
 receiving, from the network device, a reference signal receive power (RSRP) threshold value; and
 joining the uplink UE group or the downlink UE group based at least in part on a RSRP measurement at the UE.

5. The method of claim 4, wherein the uplink UE group are associated with RSRP values which exceed a threshold RSRP value, and the downlink UE group are associated with RSRP values which are less than the threshold RSRP value.

6. The method of claim 1, wherein the grouping configuration message comprises an indication of one or more synchronization signal blocks for reception by the uplink UE group, the method further comprising:
 receiving, from the network device, a first set of synchronization signal blocks associated the uplink UE group and a second set of synchronization signal blocks associated with the downlink UE group, wherein the first set of synchronization signal blocks and the second set of synchronization signal blocks are used for an initial access procedure during respective first and second time resources.

7. The method of claim 1, wherein the grouping configuration message comprises an indication of a first set of random access channel occasions configured for the uplink UE group and a second set of random access channel occasions configured for the downlink UE group, the method further comprising:
 performing an initial access procedure with the network device using a random access channel occasion of the first set of random access channel occasions or a random access channel occasion of the second set of random access channel occasions based at least in part on joining the uplink UE group or the downlink UE group, wherein the first set of random access channel occasions are associated with a first time resource and the second set of random access channel occasions are associated with a second time resource.

8. The method of claim 1, further comprising:
 receiving a control message which indicates an update to apply to the grouping configuration message; and
 updating the grouping configuration message based at least in part on the control message.

9. The method of claim 8, wherein the control message comprises a downlink control information message, the method further comprising:
 receiving the downlink control information message from the network device, the downlink control information message comprising a radio network temporary identifier associated with the uplink UE group or the downlink UE group.

10. The method of claim 8, further comprising:
 receiving the control message based at least in part on a location change of the UE, a beam change at the UE, one or more signal quality measurements at the UE, or any combination thereof.

11. The method of claim 8, wherein the control message comprises a downlink control information message or a medium access control-control element.

12. A user equipment (UE) operating in a half-duplex mode, comprising:
 one or more memories storing code; and
 one or more processors coupled with the one or more memories and operable to execute the code to cause the UE to:
  receive, from a network device operating in a full-duplex mode, a grouping configuration message that assigns the UE to either an uplink UE group configured for transmitting uplink communications in accordance with the half-duplex mode or a downlink UE group configured for receiving downlink communications in accordance with the half-duplex mode, wherein the grouping configuration message includes group-specific configuration parameters for the uplink UE group and the downlink UE group;
  join the uplink UE group or the downlink UE group based at least in part on the grouping configuration message; and
  communicate with the network device via uplink signaling or downlink signaling based at least in part on joining the uplink UE group or the downlink UE group.

13. The UE of claim 12, wherein, to join the uplink UE group or the downlink UE group, the one or more processors are further operable to execute the code to cause the UE to:
 join the uplink UE group or the downlink UE group based at least in part on a global identifier associated with the UE.

14. The UE of claim 12, wherein, to join the uplink UE group or the downlink UE group, the one or more processors are further operable to execute the code to cause the UE to:
 join the uplink UE group or the downlink UE group based at least in part on a random selection of the uplink UE group or the downlink UE group.

15. The UE of claim 12, wherein, to join the uplink UE group or the downlink UE group, the one or more processors are further operable to execute the code to cause the UE to:
 receive, from the network device, a reference signal receive power (RSRP) threshold value; and
 join the uplink UE group or the downlink UE group based at least in part on a RSRP measurement at the UE.

16. The UE of claim 15, wherein the uplink UE group are associated with RSRP values which exceed a threshold RSRP value, and the downlink UE group are associated with RSRP values which are less than the threshold RSRP value.

17. The UE of claim 12, wherein the grouping configuration message comprises an indication of one or more synchronization signal blocks for reception by the uplink UE group, and the one or more processors are further operable to execute the code to cause the UE to:
 receive, from the network device, a first set of synchronization signal blocks associated the uplink UE group and a second set of synchronization signal blocks associated with the downlink UE group, wherein the first set of synchronization signal blocks and the second set of synchronization signal blocks are used for an initial access procedure during respective first and second time resources.

18. The UE of claim 12, wherein the grouping configuration message comprises an indication of a first set of random access channel occasions configured for the uplink UE group and a second set of random access channel occasions configured for the downlink UE group, and the one or more processors are further operable to execute the code to cause the UE to:

perform an initial access procedure with the network device using a random access channel occasion of the first set of random access channel occasions or a random access channel occasion of the second set of random access channel occasions based at least in part on joining the uplink UE group or the downlink UE group, wherein the first set of random access channel occasions are associated with a first time resource and the second set of random access channel occasions are associated with a second time resource.

19. The UE of claim 12, wherein the one or more processors are further operable to execute the code to cause the UE to:

receive a control message which indicates an update to apply to the grouping configuration message; and update the grouping configuration message based at least in part on the control message.

20. The UE of claim 19, wherein the control message comprises a downlink control information message, and the one or more processors are further operable to execute the code to cause the UE to:

receive the downlink control information message from the network device, the downlink control information message comprising a radio network temporary identifier associated with the uplink UE group or the downlink UE group.

21. The UE of claim 19, wherein the one or more processors are further operable to execute the code to cause the UE to:

receive the control message based at least in part on a location change of the UE, a beam change at the UE, one or more signal quality measurements at the UE, or any combination thereof.

22. The UE of claim 19, wherein the control message comprises a downlink control information message or a medium access control-control element.

23. A user equipment (UE) for wireless communications in a half-duplex mode, comprising:

means for receiving, from a network device operating in a full-duplex mode, a grouping configuration message that assigns the UE to either an uplink UE group configured for transmitting uplink communications in accordance with the half-duplex mode or a downlink UE group configured for receiving downlink communications in accordance with the half-duplex mode, wherein the grouping configuration message includes group-specific configuration parameters for the uplink UE group and the downlink UE group;

means for joining the uplink UE group or the downlink UE group based at least in part on the grouping configuration message; and means for communicating with the network device via uplink signaling or downlink signaling based at least in part on joining the uplink UE group or the downlink UE group.

24. The UE of claim 23, wherein the means for joining the uplink UE group or the downlink UE group comprise:

means for joining the uplink UE group or the downlink UE group based at least in part on a global identifier associated with the UE.

25. The UE of claim 23, wherein the means for joining the uplink UE group or the downlink UE group comprise:

means for joining the uplink UE group or the downlink UE group based at least in part on a random selection of the uplink UE group or the downlink UE group.

26. The UE of claim 23, wherein the means for joining the uplink UE group or the downlink UE group comprise:

means for receiving, from the network device, a reference signal receive power (RSRP) threshold value; and means for joining the uplink UE group or the downlink UE group based at least in part on a RSRP measurement at the UE.

27. The UE of claim 26, wherein the uplink UE group are associated with RSRP values which exceed a threshold RSRP value, and the downlink UE group are associated with RSRP values which are less than the threshold RSRP value.

28. The UE of claim 23, wherein the grouping configuration message comprises an indication of one or more synchronization signal blocks for reception by the uplink UE group, the UE further comprising:

means for receiving, from the network device, a first set of synchronization signal blocks associated the uplink UE group and a second set of synchronization signal blocks associated with the downlink UE group, wherein the first set of synchronization signal blocks and the second set of synchronization signal blocks are used for an initial access procedure during respective first and second time resources.

29. The UE of claim 23, wherein the grouping configuration message comprises an indication of a first set of random access channel occasions configured for the uplink UE group and a second set of random access channel occasions configured for the downlink UE group, the UE further comprising:

means for performing an initial access procedure with the network device using a random access channel occasion of the first set of random access channel occasions or a random access channel occasion of the second set of random access channel occasions based at least in part on joining the uplink UE group or the downlink UE group, wherein the first set of random access channel occasions are associated with a first time resource and the second set of random access channel occasions are associated with a second time resource.

30. A non-transitory computer-readable medium storing code for wireless communications, the code comprising instructions executable by one or more processors to:

receive, from a network device operating in a full-duplex mode, a grouping configuration message that assigns a user equipment (UE) operating in a half-duplex mode to either an uplink UE group configured for transmitting uplink communications in accordance with the half-duplex mode or a downlink UE group configured for receiving downlink communications in accordance with the half-duplex mode, wherein the grouping configuration message includes group-specific configuration parameters for the uplink UE group and the downlink UE group;

join the uplink UE group or the downlink UE group based at least in part on the grouping configuration message; and communicate with the network device via uplink signaling or downlink signaling based at least in part on joining the uplink UE group or the downlink UE group.

* * * * *